(12) United States Patent
Helmick et al.

(10) Patent No.: US 11,332,339 B2
(45) Date of Patent: May 17, 2022

(54) METHOD OF PROCESSING WIRE BUNDLES

(71) Applicant: The Boeing Company, Chicago, IL (US)

(72) Inventors: Eerik J. Helmick, San Francisco, CA (US); Bradley J. Mitchell, Snohomish, WA (US); Nick S. Evans, Lynnwood, WA (US); Damien O. Martin, Lynnwood, WA (US); Aphea Ann Thornton, Issaquah, WA (US)

(73) Assignee: The Boeing Company

( * ) Notice: Subject to any disclaimer, the term of this patent is extended or adjusted under 35 U.S.C. 154(b) by 261 days.

(21) Appl. No.: 16/655,053

(22) Filed: Oct. 16, 2019

(65) Prior Publication Data

US 2020/0048028 A1 Feb. 13, 2020

Related U.S. Application Data

(62) Division of application No. 15/190,124, filed on Jun. 22, 2016, now Pat. No. 10,501,284.

(51) Int. Cl.
*H01F 7/06* (2006.01)
*B65H 59/10* (2006.01)
(Continued)

(52) U.S. Cl.
CPC ............ *B65H 59/10* (2013.01); *B65H 51/005* (2013.01); *H01R 43/048* (2013.01); *H01R 43/28* (2013.01);
(Continued)

(58) Field of Classification Search
CPC .... H01R 43/048; H01R 43/052; H01R 43/20; H01R 43/28; H02G 1/06; H02G 1/1256;
(Continued)

(56) References Cited

U.S. PATENT DOCUMENTS 5,594,980 A * 1/1997 Tamura .............. G05B 19/4183
29/33 M
6,612,516 B1 9/2003 Haines
(Continued)

FOREIGN PATENT DOCUMENTS

DE 202009007626 10/2009
EP 0806820 11/1997
(Continued)

OTHER PUBLICATIONS

JPO, Japanese Office Action, App. No. 2017-117541, dated Mar. 2, 2021.
(Continued)

*Primary Examiner* — Paul D Kim

(57) ABSTRACT

A method of reducing entanglement of wires includes receiving, at a tray, one or more first wires of a first wire group from a wire feed system of a wire processing machine. In addition, the method includes receiving, at the tray, one or more second wires of a second wire group from the wire feed system after receiving the first wire group at the tray. The method further includes physically separating, using a separator device associated with the tray, at least a portion of the first wire group from the second wire group. The method also includes moving the second wire group relative to the first wire group, reducing movement of at least a portion of the first wire group relative to a tray surface during movement of the second wire group relative to the first wire group.

20 Claims, 42 Drawing Sheets

(51) Int. Cl.
  H01R 43/048 (2006.01)
  H02G 1/12 (2006.01)
  H01R 43/28 (2006.01)
  B65H 51/005 (2006.01)
  *H01R 43/20* (2006.01)
  *H02G 1/06* (2006.01)
  *H01R 43/052* (2006.01)
  *H02G 3/04* (2006.01)

(52) U.S. Cl.
  CPC ....... *H02G 1/1256* (2013.01); *B65H 2701/36* (2013.01); *H01R 43/052* (2013.01); *H01R 43/20* (2013.01); *H02G 1/06* (2013.01); *H02G 3/0437* (2013.01)

(58) Field of Classification Search
  CPC .............. H02G 3/0437; B65H 2701/36; B65H 51/005; B65H 59/10
  See application file for complete search history.

(56) References Cited

U.S. PATENT DOCUMENTS

| | | | |
|---|---|---|---|
| 6,877,688 B2* | 4/2005 | Jordan | B28B 23/022 242/128 |
| 8,695,929 B2 | 4/2014 | Cox | |
| 8,801,296 B2* | 8/2014 | LeBlanc | G02B 6/403 385/54 |
| 2005/0115739 A1 | 6/2005 | Brockman et al. | |
| 2012/0090723 A1 | 4/2012 | Fischer | |
| 2015/0260935 A1 | 9/2015 | Williams | |
| 2016/0134089 A1 | 5/2016 | Peterson | |

FOREIGN PATENT DOCUMENTS

| | | |
|---|---|---|
| EP | 2871737 | 5/2005 |
| EP | 2871737 | 5/2015 |
| FR | 2338622 | 8/1977 |
| JP | A S53-111487 | 9/1978 |
| JP | A H7-320566 | 12/1995 |
| JP | H08-018252 | 1/1996 |
| WO | WO2014156587 | 2/2014 |

OTHER PUBLICATIONS

Canadian Patent Office, Office Action, Appl. No. 2,965,979, dated Apr. 16, 2020.
European Patent Office, European Search Report, Appl. No. 20155035, dated Oct. 5, 2020.
European Patent Office, Office Action, Appl. No. 120155035, dated May 18, 2020.
EPO, Search Report, Appl. No. EP17177415, dated Jan. 17, 2020.
European Patent Office, European Search Report, Appl. No. 17177415.1, dated May 21, 2021.
JPO, Japanese Office Action, App. No. 2017-118005, dated Mar. 2, 2021.
Canadian Patent Office, Office Action, Appl. No. 2,965,979, dated Jan. 18, 2021.
EPO, Search Report, Appl. No. EP17177415, dated Nov. 15, 2017.
KOMAX, "Automatic harness production," retrieved Jun. 21, 2016.
EPO, Extended Search Report, Appl. No. 17177411.0, dated Nov. 17, 2017.
JPO, Japanese Office Action, App. No. 2017-118005, dated Nov. 30, 2021.
European Patent Office, Examination Report, Appl. No. 20155035.7, dated Nov. 29, 2021.

* cited by examiner

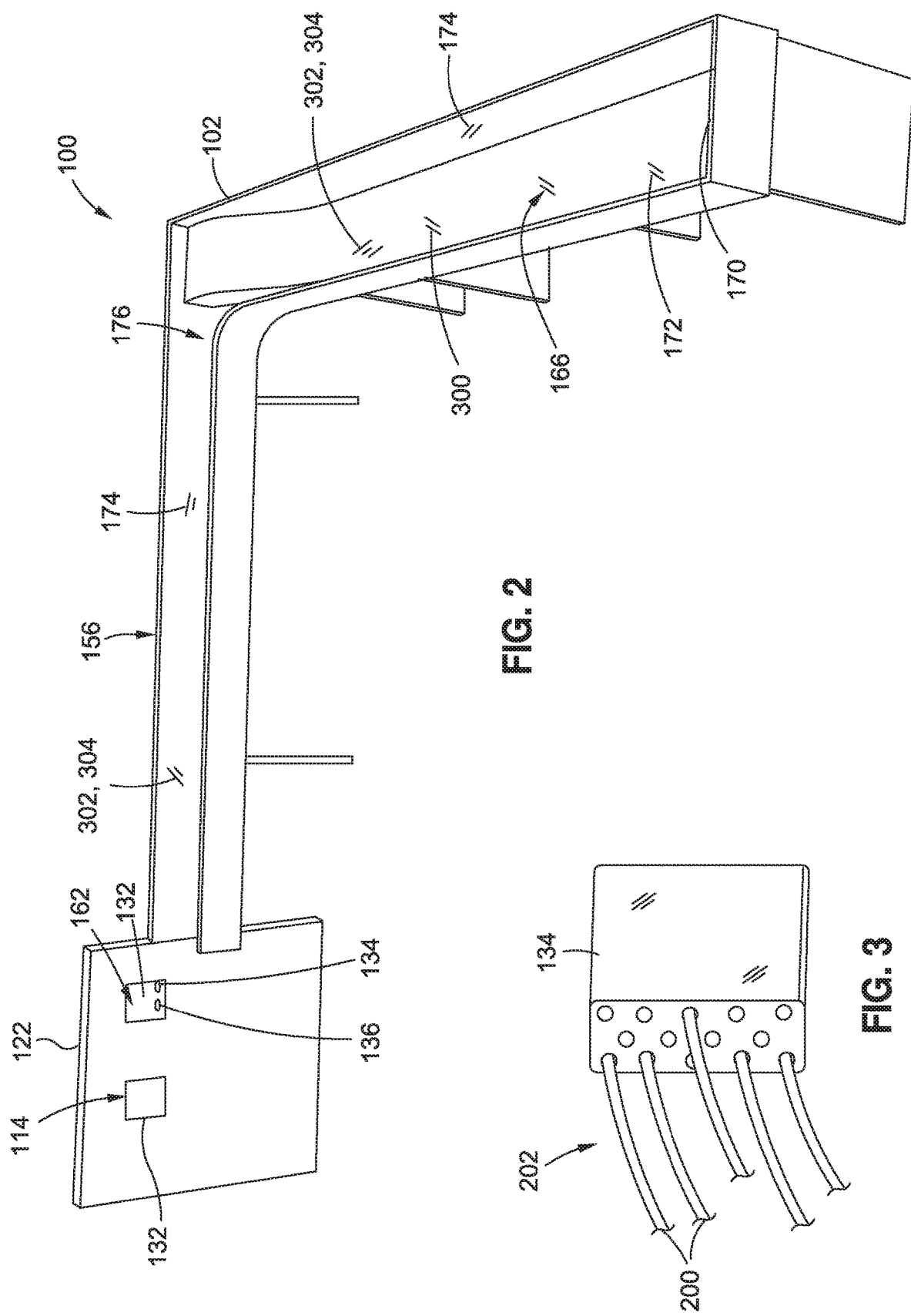

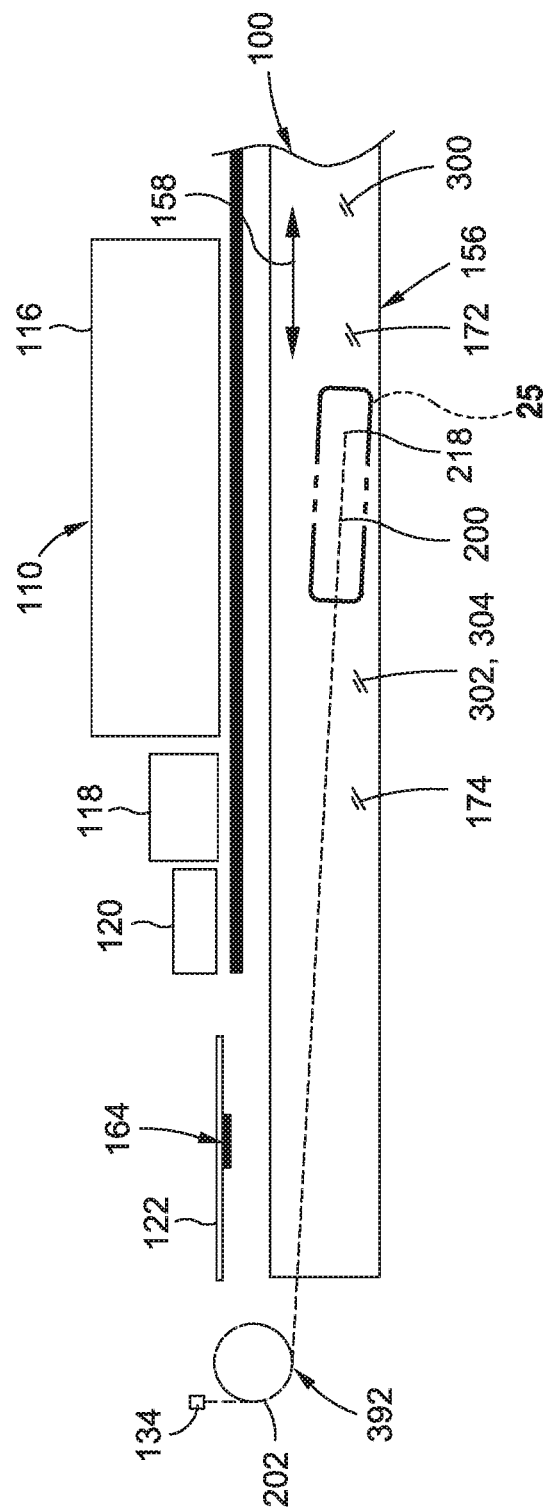
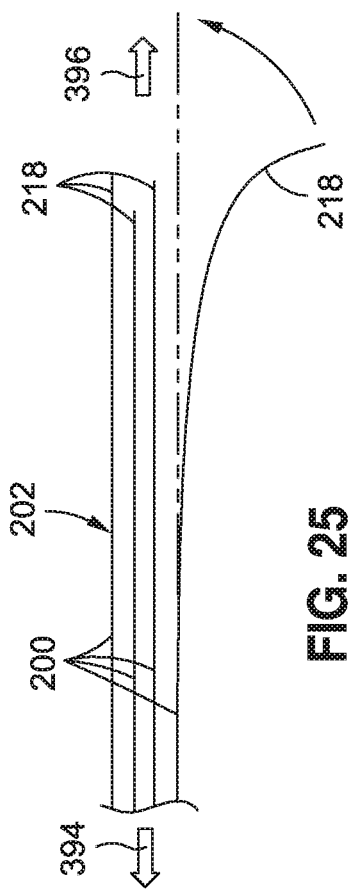
FIG. 24
FIG. 25

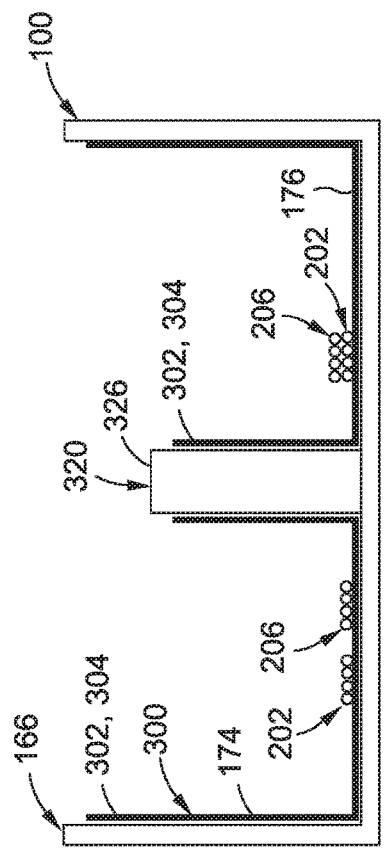
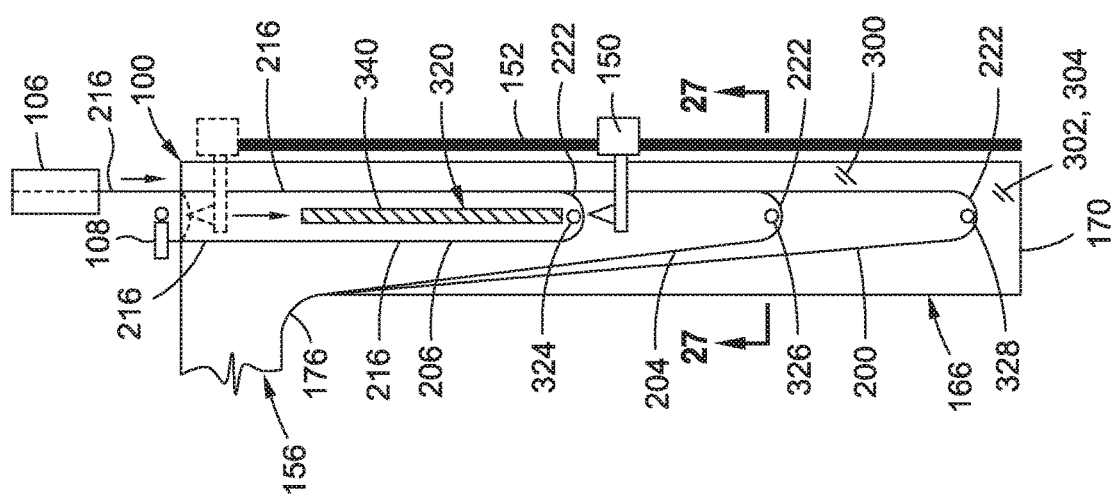

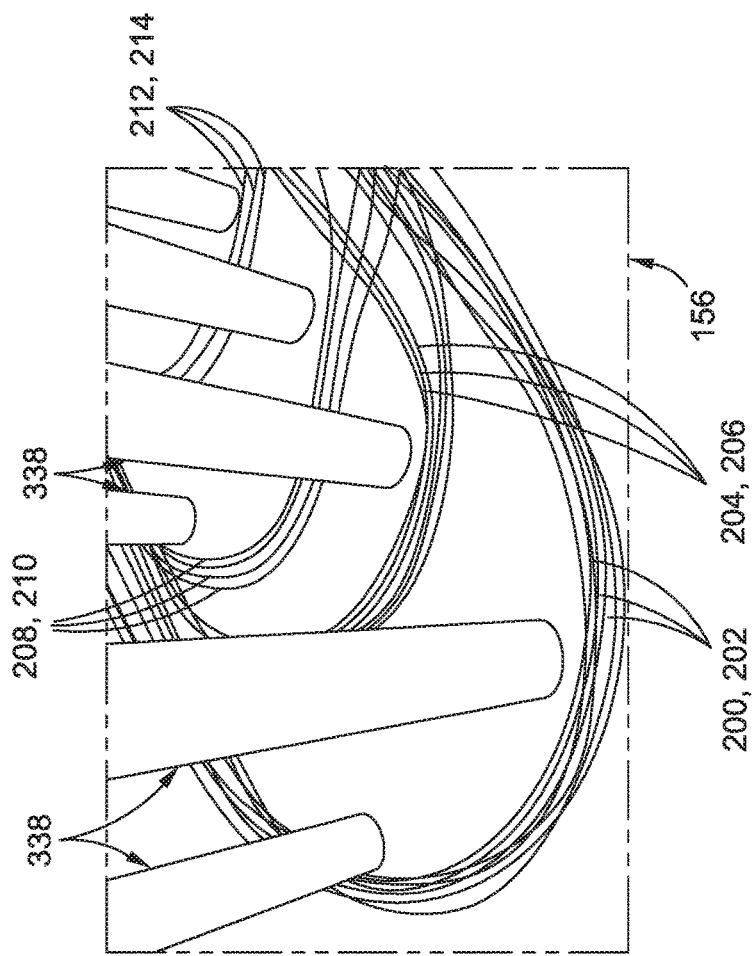
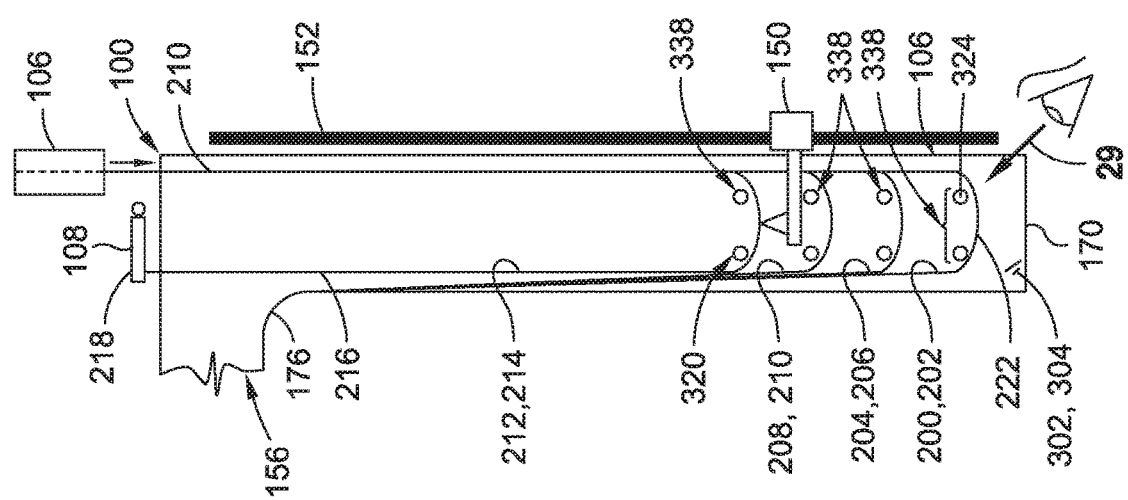

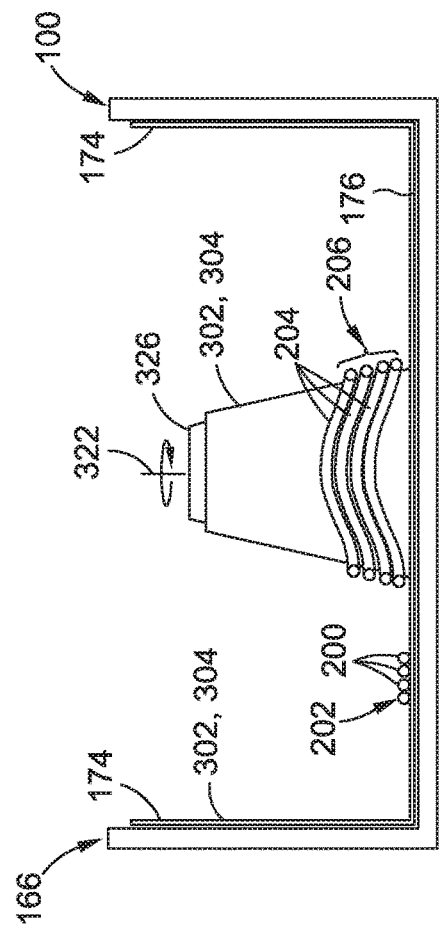
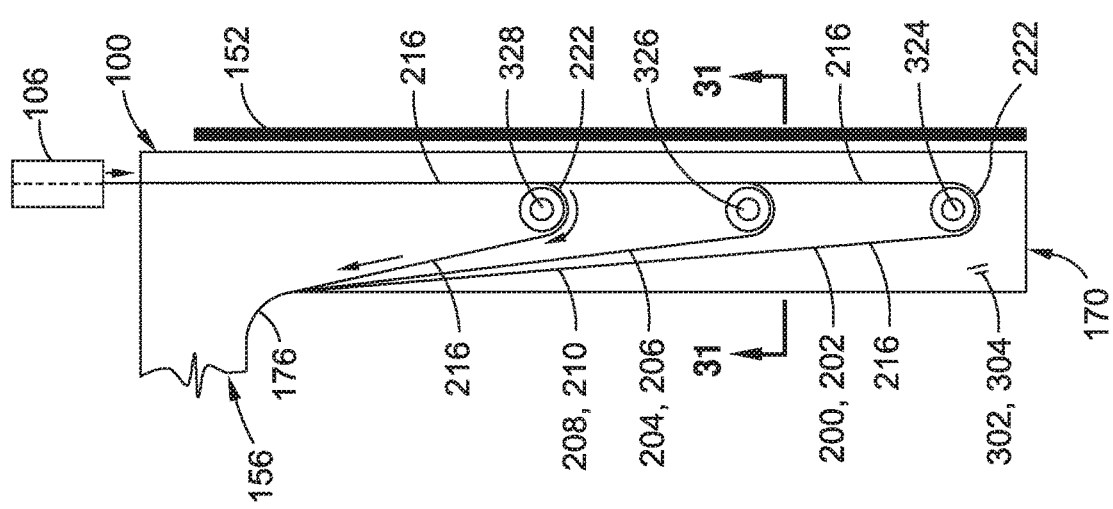
FIG. 31
FIG. 30

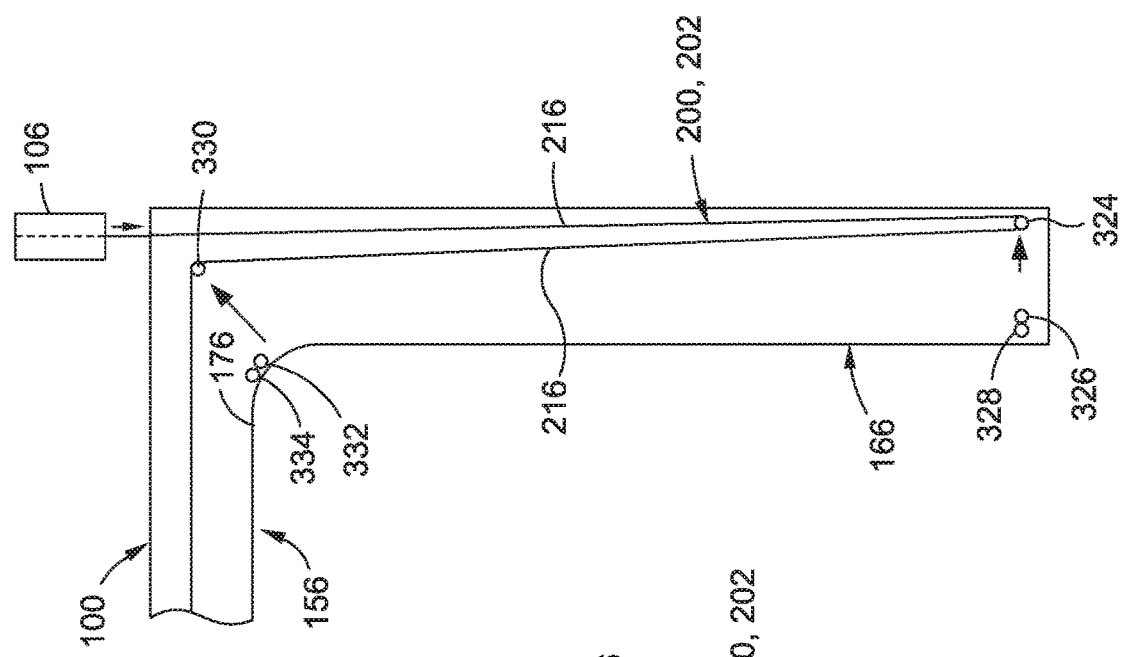
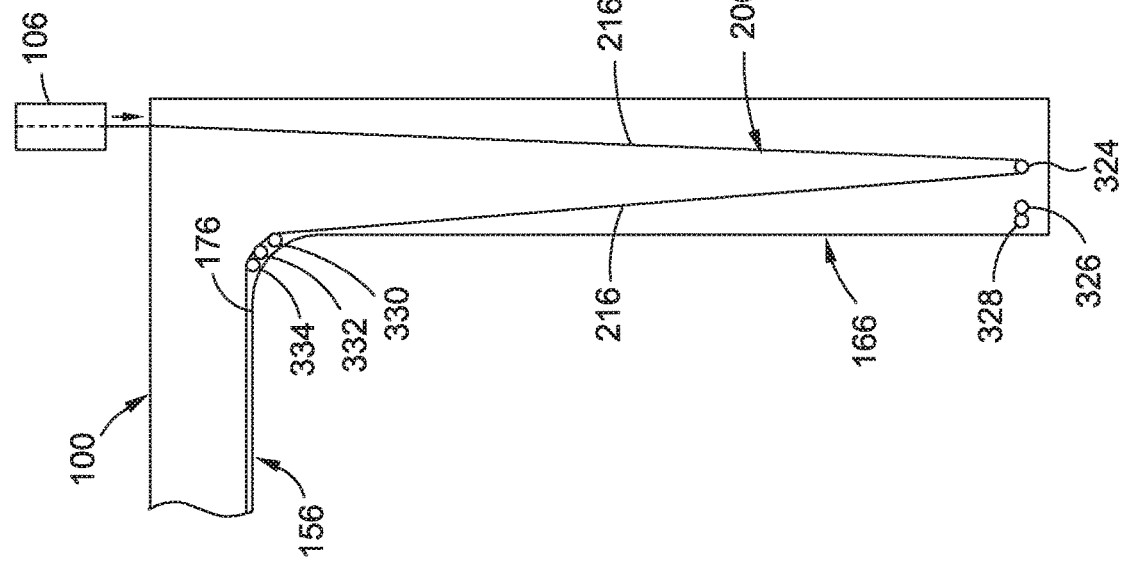
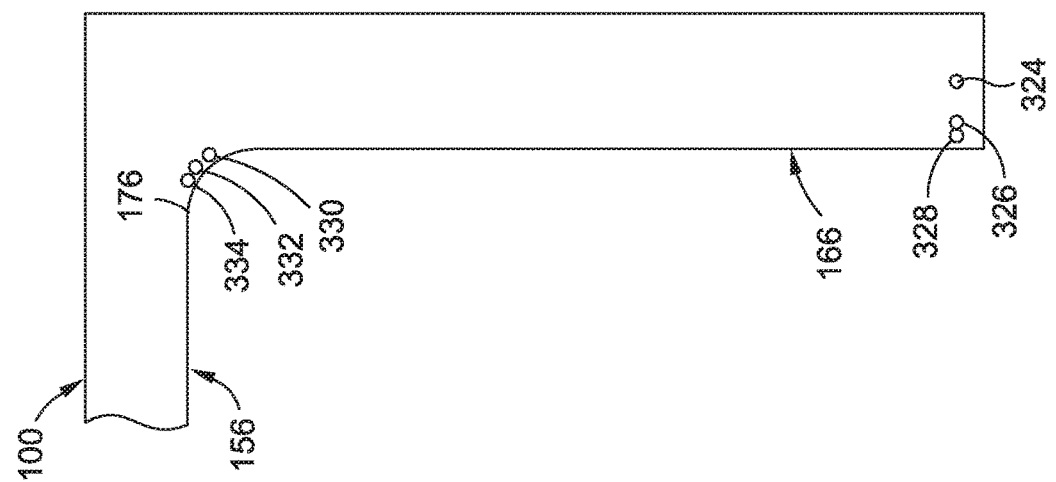

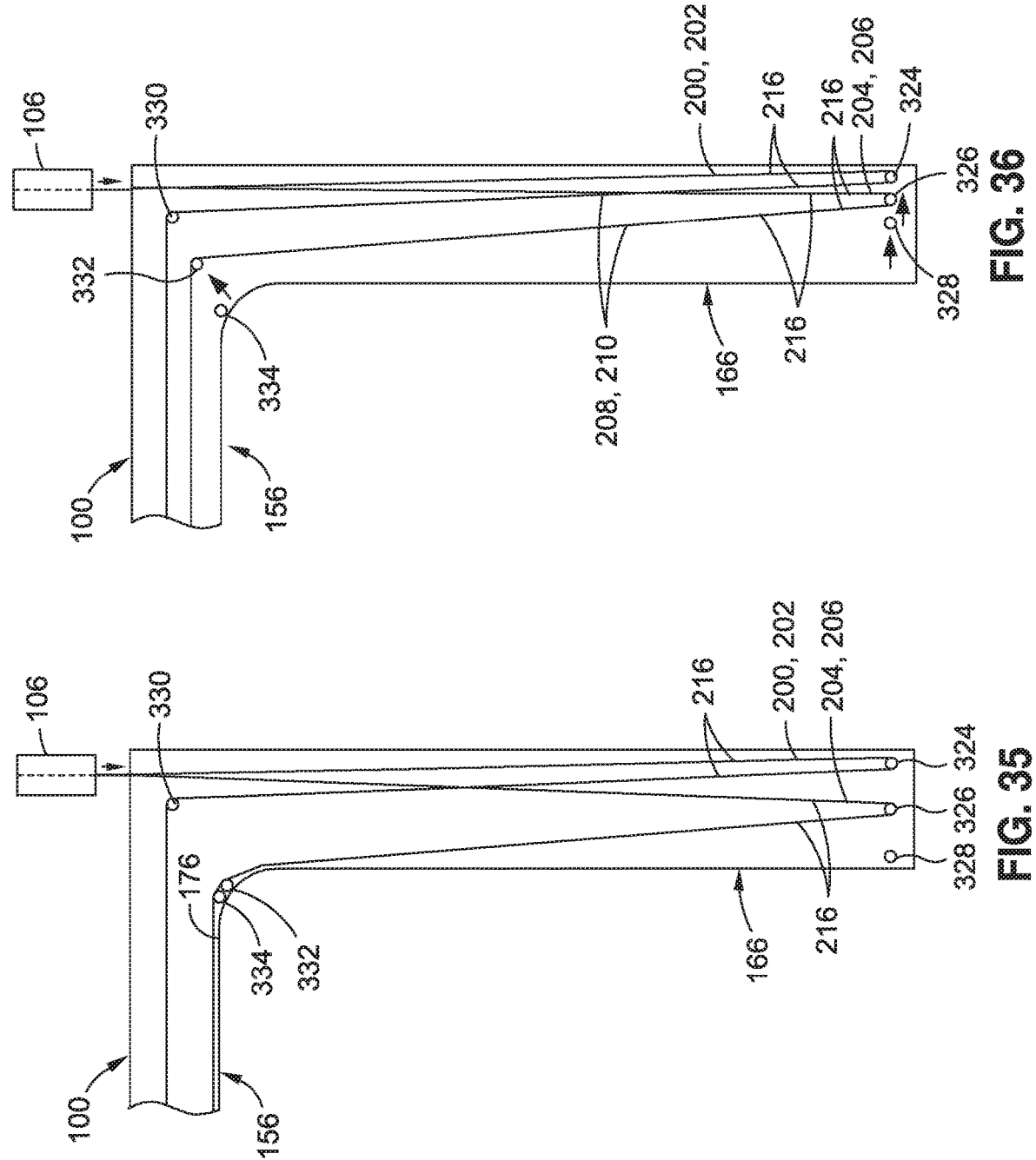

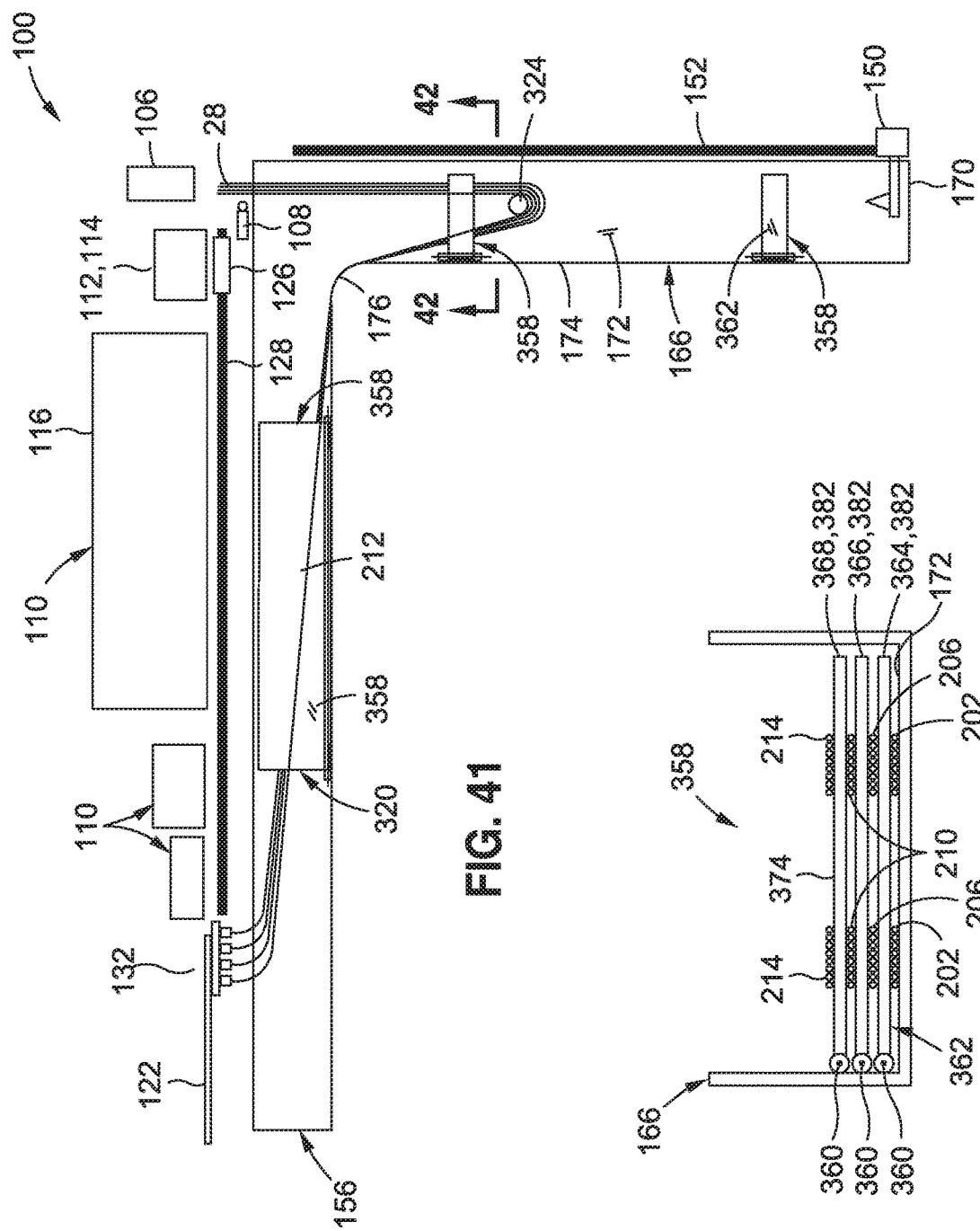

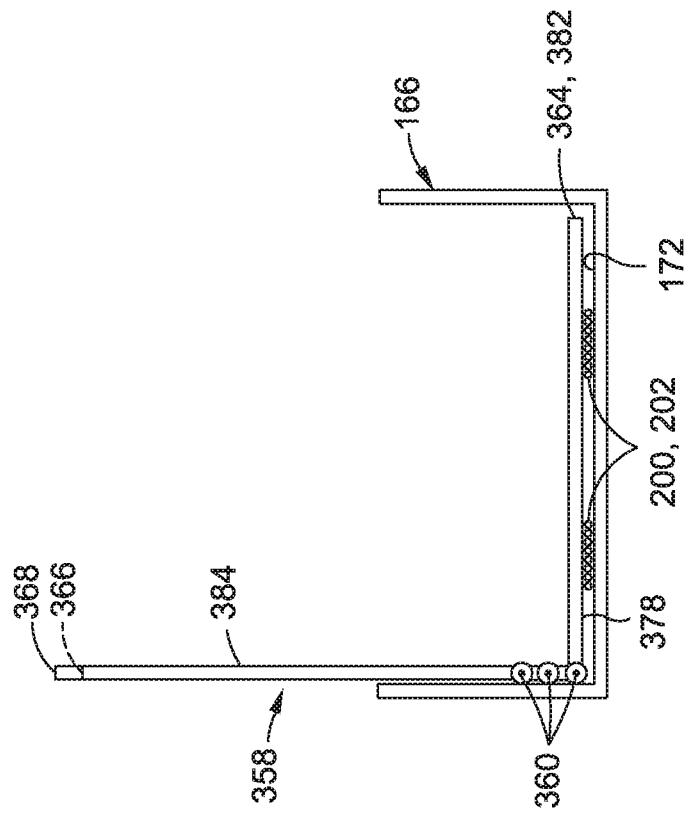
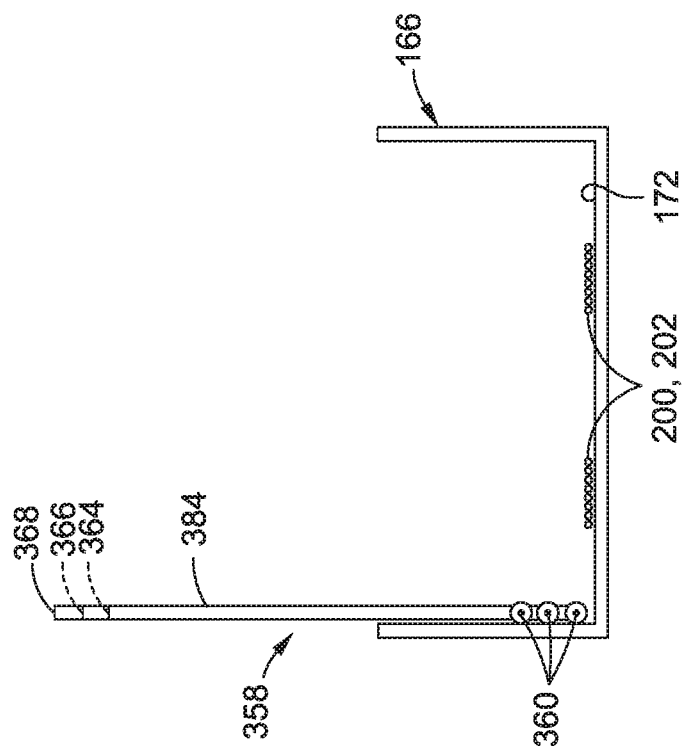

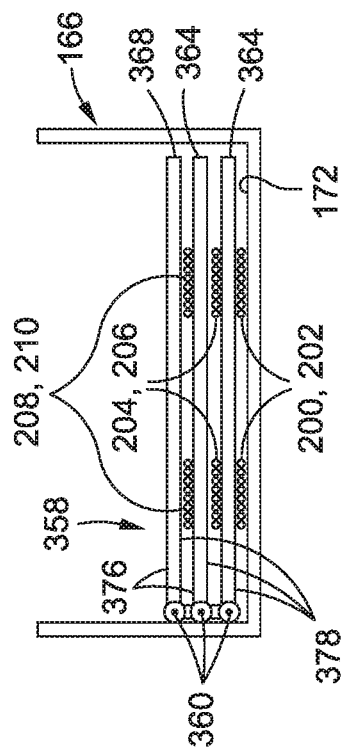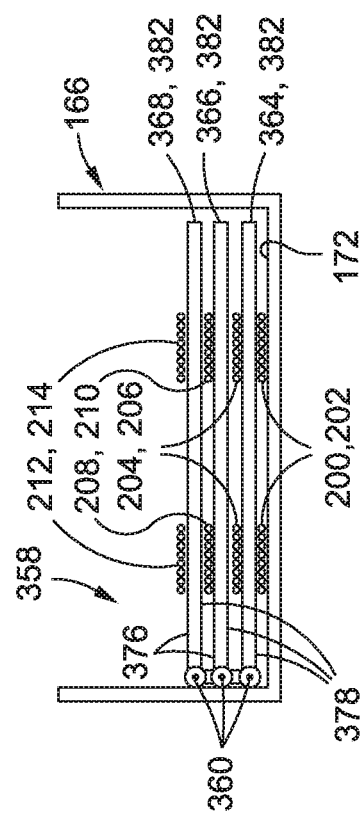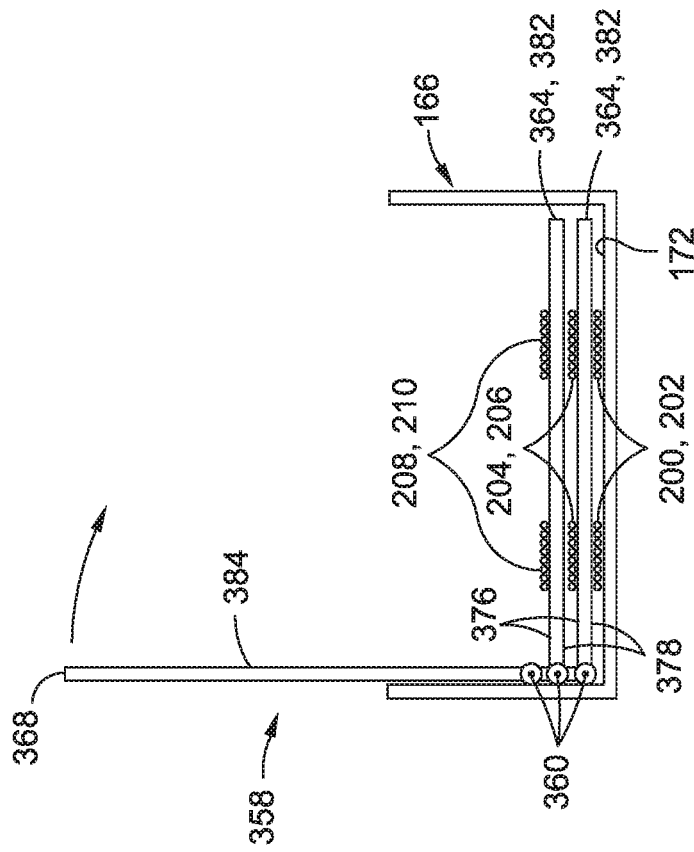

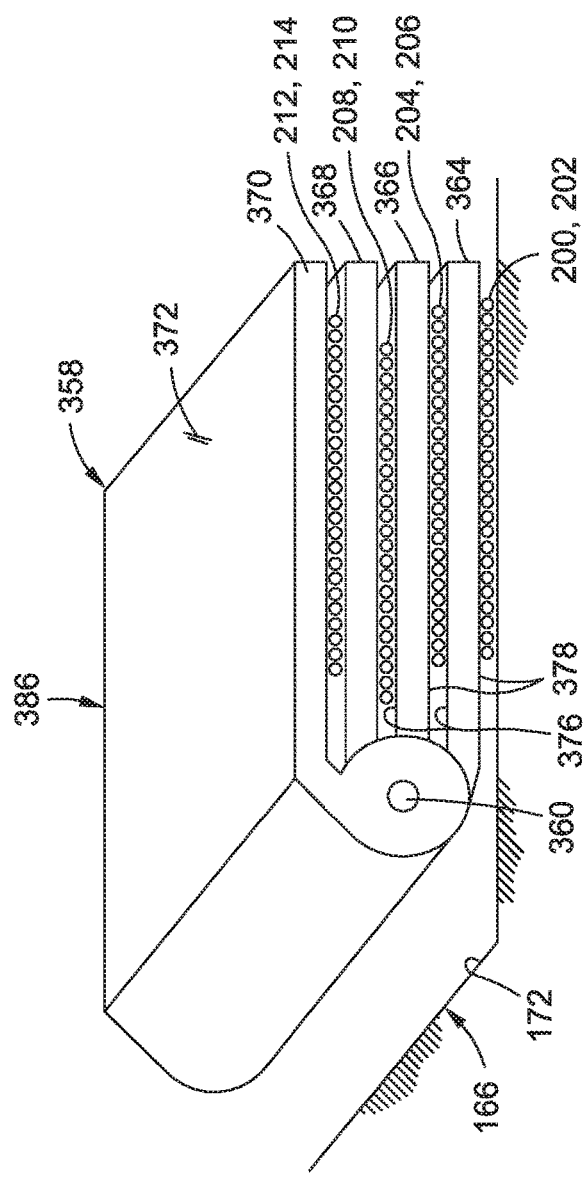
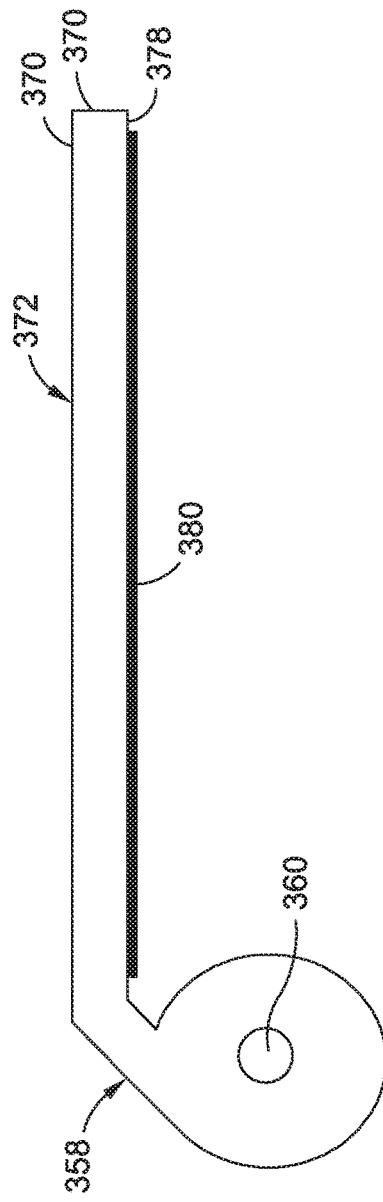
FIG. 50
FIG. 51

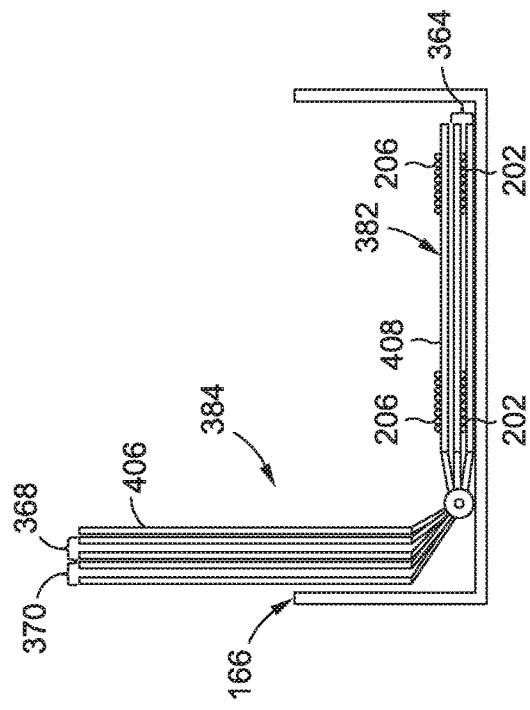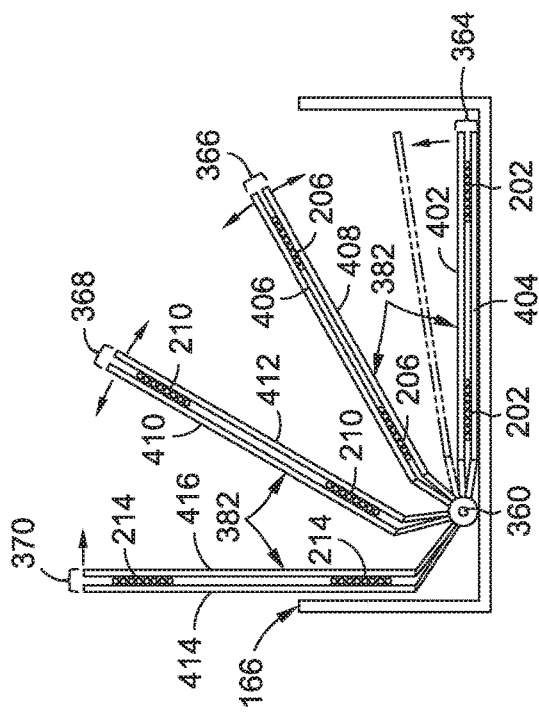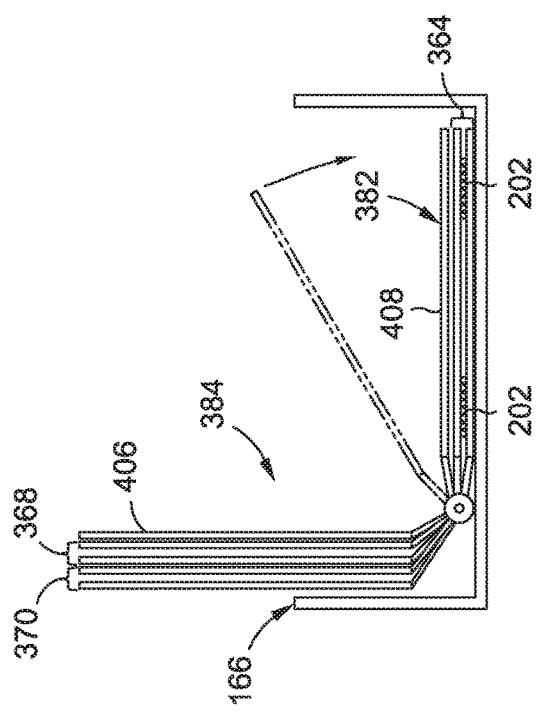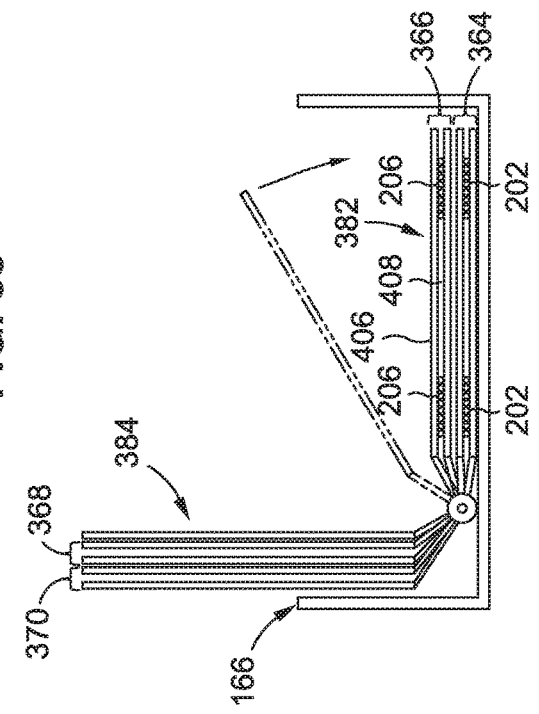

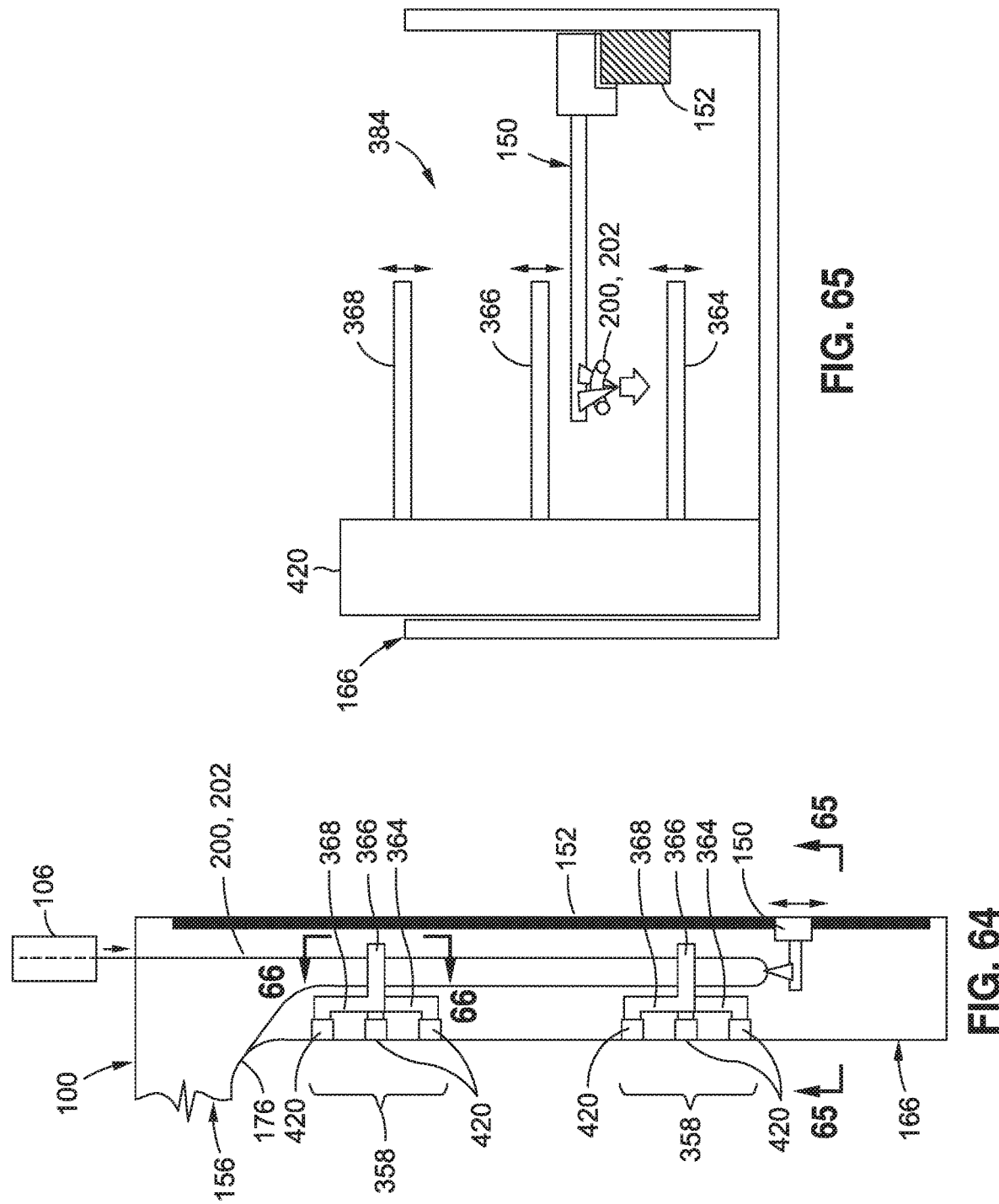

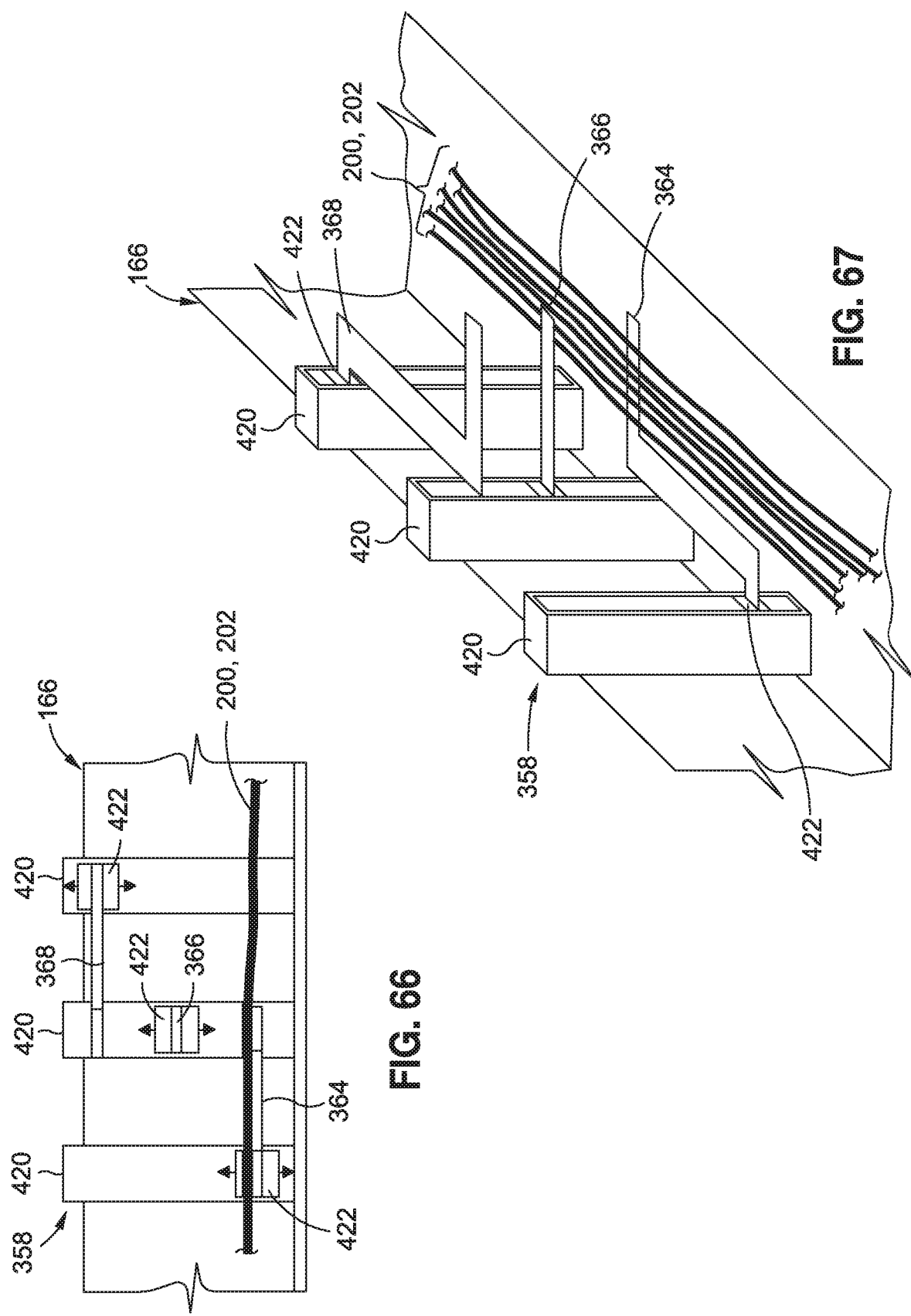

METHOD OF PROCESSING WIRE BUNDLES

CROSS-REFERENCE TO RELATED APPLICATIONS

The present application is a divisional application of and claims priority to U.S. application Ser. No. 15/190,124 filed on Jun. 22, 2016, now U.S. Pat. No. 10,501,284, and entitled SYSTEM AND METHOD FOR PROCESSING WIRE BUNDLES, the entire contents of which is expressly incorporated by reference herein.

FIELD

The present disclosure relates to wire bundle manufacturing and, more particularly, to a wire processing system and method for separating wires to reduce wire entanglement during processing.

BACKGROUND

Electrical wiring is used in a wide variety of products. For example, a commercial transport aircraft may have many wire bundles extending through various parts of the aircraft structure. Each wire bundle may include multiple wires of the same or different length. In some examples, wire bundles in an aircraft may exceed 15 feet in length. The process of forming a wire bundle is labor intensive and may involve several process steps such as selecting wires of the appropriate gauge (e.g., diameter) and color (e.g., marking), and cutting each wire to the appropriate length. The process may additionally include taping together the wires on one or both ends of a wire bundle, or crimping an electrical contact on the wire ends and inserting each electrical contact into the appropriate opening in the body of an electrical connector.

For products having a large quantity of wire bundles, wire processing represents a significant portion of the overall production effort. In an attempt to reduce the amount of time required for forming wire bundles, automated wire processing machines have been developed to sequentially perform the above-mentioned steps. Although wire processing machines are effective in processing wire bundles of relatively short length (e.g., less than 3 feet), the processing of wire bundles of long length presents challenges. For example, long-length wires in a wire bundle may become entangled during processing and/or during removal of the wire bundle from the wire processing machine.

As can be seen, there exists a need in the art for a system and method for reducing wire entanglement of wires during automated wire processing.

SUMMARY

The above-noted needs associated with automated wire processing are specifically addressed and alleviated by the present disclosure which provides a wire processing system including a tray having at least one tray surface configured to sequentially receive a first wire and a second wire from a wire feed system of a wire processing machine. The tray surface has a surface feature configured to provide a wire-to-surface coefficient of friction between the tray surface and the first wire higher than a wire-to-wire coefficient of friction between the first wire and the second wire laying on top of the first wire. The wire-to-surface coefficient of friction reduces movement of at least a portion of the first wire relative to the tray surface during movement of the second wire relative to the first wire.

In a further embodiment, disclosed is a wire processing system including a long-wire supporting tray of a wire processing machine having a loop puller mechanism configured to sequentially pull a first wire and a second from a wire feed system along a lengthwise direction of the long-wire supporting tray and form a loop in the first wire and the second wire on the long-wire supporting tray. The long-wire supporting tray has a tray surface including a surface feature configured to provide a wire-to-surface coefficient of friction between the tray surface and the first wire higher than a wire-to-wire coefficient of friction between the first wire and the second wire laying on top of the first wire. The wire-to-surface coefficient of friction reducing movement of at least a portion of the first wire relative to the tray surface during movement of the second wire relative to the first wire.

Also disclosed is a wire processing system having a tray configured to sequentially receive one or more first wires of a first wire group and one or more second wires of a second wire group from a wire feed system of a wire processing machine. The wire processing system further includes a separator device associated with the tray and configured to promote physical separation of the first wire group from the second wire group and thereby reduce wire entanglement.

In a further embodiment, disclosed is a wire processing system including a long-wire supporting tray and a wire processing tray oriented non-parallel to one another and configured to sequentially receive one or more first wires of a first wire group and one or more second wires of a second wire group from a wire feed system of a wire processing machine. The wire processing system further includes at least one separator device mounted to the long-wire supporting tray and configured to physically separate at least a portion of the first wire group from the second wire group and thereby reduce wire entanglement.

In addition, disclosed is a method of reducing entanglement of wires, including the step of receiving from a wire feed system of a wire processing machine a first wire on a tray providing a wire-to-surface coefficient of friction between a tray surface and the first wire. The method additionally includes receiving from the wire feed system a second wire at least partially on top of the first wire, the wire-to-surface coefficient of friction being higher than a wire-to-wire coefficient of friction between the first wire and the second wire. The method also includes moving the second wire relative to the first wire, and reducing movement of at least a portion of the first wire relative to the tray surface during movement of the second wire relative to the first wire due to the wire-to-surface coefficient of friction being higher than the wire-to-wire coefficient of friction.

In a further embodiment, disclosed is a method of reducing entanglement of wires including the step of receiving, at a tray, one or more first wires of a first wire group from a wire feed system of a wire processing machine, and receiving, at the tray, one or more second wires of a second wire group from the wire feed system after receiving the first wire group at the tray. The method additionally includes physically separating, using a separator device associated with the tray, at least a portion of the first wire group from the second wire group. The method also includes moving the second wire group relative to the first wire group, and reducing movement of at least a portion of the first wire group relative to a tray surface during movement of the second wire group relative to the first wire group.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numbers refer to like parts throughout and wherein:

FIG. 2 is a simplified view of an example of a wire processing machine having a long-wire supporting tray and a wire processing tray each configured to support a plurality of wires of one or more wire bundles;

FIG. 3 is a perspective view of an example of an end portion of a wire bundle and illustrating a plurality of wires terminating at a connector;

FIG. 24 is a top view of a portion of the wire processing tray illustrating the coiling of a wire group into a wire coil as part of the process of removing the wire group from the wire processing tray;

FIG. 25 is a magnified top view of the first wires taken along line 25 of FIG. 24 and illustrating a frictional force generated between the first wires and the tray bottom surface along a direction opposite a pulling force exerted by an operator on the first wires during removal from the wire processing tray and showing the frictional force tending to straighten the wire ends of the first wires as a means to minimize entanglement;

FIG. 26 is a top view of the long-wire supporting tray having a plurality of separator posts located at spaced intervals along a lengthwise direction of the long-wire supporting tray;

FIG. 27 is a sectional view of the long-wire supporting tray taken along line 27 of FIG. 26 and illustrating a separator post separating the wire lengths on opposite sides of the separator post;

FIG. 28 is a top view of a long-wire supporting tray having a plurality of post sets located at spaced intervals along a lengthwise direction of the long-wire supporting tray;

FIG. 29 is a perspective view of different wire groups wrapped around the post sets;

FIG. 30 is a top view of a long-wire supporting tray having rotating separator posts;

FIG. 31 is a sectional view of the long-wire supporting tray taken along line 31 of FIG. 30 and illustrating a wire group wrapped around a rotatable cone-shaped separator post;

FIG. 32 is a top view of an example of a long-wire supporting tray having separator posts that are individually laterally movable relative to one another to facilitate separation of different wire groups;

FIG. 33 is a top view of the long-wire supporting tray showing a first wire group wrapped around a first separator post;

FIG. 34 is a top view of the long-wire supporting tray showing the first separator post laterally moved toward a tray side and further illustrating a fourth separator post located near the junction of the long-wire supporting tray and the wire processing tray and showing the fourth separator post laterally moved toward the wire feed system;

FIG. 35 is a top view of the long-wire supporting tray showing a second wire group wrapped around a second separator post;

FIG. 36 is a top view of the long-wire supporting tray showing the second separator post laterally moved toward the tray side and further illustrating a fifth separator post laterally moved toward the wire feed system after the second wire group is wrapped around the second and fifth separator posts;

FIG. 41 is a top view of an example of a wire processing machine having wire clamping systems installed in the long-wire supporting tray and in the wire processing tray;

FIG. 42 is a sectional view of the long-wire supporting tray taken along line 42 of FIG. 41 and illustrating an example of a wire clamping system having a plurality of clamping members for separating different wire groups;

FIGS. 43-49 are sectional views of a wire clamping system illustrating a sequence of steps of a process of sequentially clamping wire groups between the clamping members;

FIG. 50 is perspective of an example of a wire clamping system having a plurality of clamping panels arranged in a stacked configuration;

FIG. 51 is a sectional view of a clamping member having a resiliently compliant elastomeric material applied to a lower surface of the clamping member for reducing damage to the wires during clamping;

FIGS. 56-62 are sectional views of a wire clamping system illustrating a sequence of steps of a process of sequentially clamping wire groups between top and bottom arms of two-arm clamping members;

FIG. 63 is a sectional view showing the independently pivotable nature of the clamping members of FIGS. 55-62;

FIG. 64 is a top view of a further example of a wire clamping system having linear actuators;

FIG. 65 is a sectional view of the installation of the wire clamping system of FIG. 64 and illustrating first, second, and third clamping members being vertically movable via the respective linear actuators;

FIG. 66 is a side view of the wire clamping system of FIG. 65 and illustrating the first, second, and third clamping members respectively coupled to linear actuators;

FIG. 67 is a perspective view of the wire clamping system of FIG. 66 illustrating a first wire group supported on the first clamping member prior to clamping;

DETAILED DESCRIPTION

Figure 1:
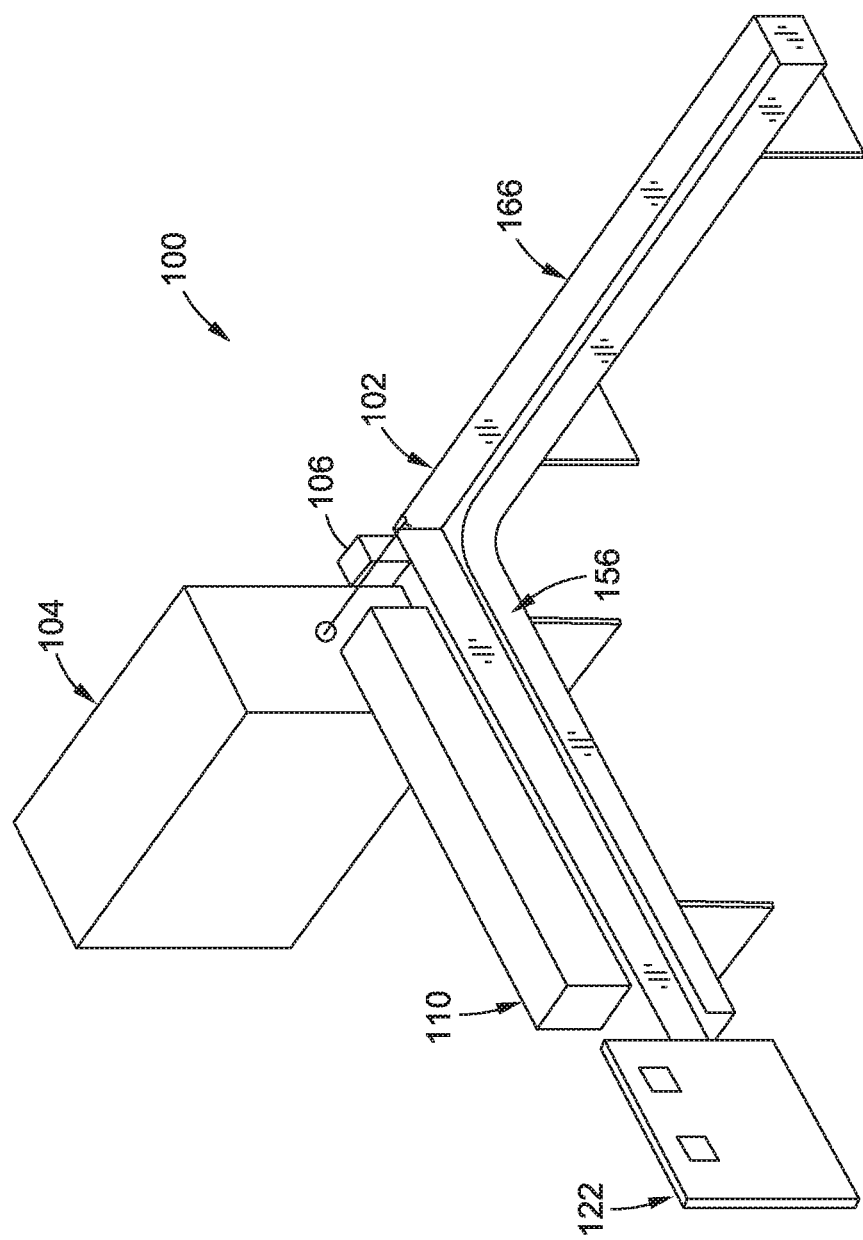
FIG. 1 is a perspective view of an example of a wire processing machine as may be implemented for processing electrical wires and forming wire bundles (e.g., wire groups)

Referring now to the drawings wherein the showings are for purposes of illustrating various embodiments of the present disclosure, shown in FIG. 1 is an example of a wire processing machine 102 for automated processing of electrical wires to form wire bundles, interchangeably referred to herein as wire groups. Advantageously, the systems and methods disclosed herein incorporate the use of friction and/or one or more separation devices in a manner which sequences, separates, and/or promotes linearity of the wires as a means to minimize entanglement of the wires during wire processing and/or wire bundle removal, as described in greater detail below. In some examples, the presently-disclosed systems and methods minimize coiling in individual wires and/or minimize cross-over of adjacent wires which may minimize wire entanglement as different wire groups (e.g., wire bundles) are moved relative to one another during wire processing and/or during wire bundle removal. By minimizing wire entanglement, the presently-disclosed systems and methods advantageously allow for the assembly of wire bundles of relatively long length (e.g., greater than 3 feet) such as by automated means using a wire processing machine.

In one example of the systems and methods described below, one or more trays of a wire processing machine 102 include a surface feature 300 such as a material layer 302 and/or a material coating 304 (e.g., FIGS. 1-2, 4-9, 14-49, and 55-74) providing a wire-to-surface coefficient of friction between the tray surface and a first wire 200 that is higher than a wire-to-wire coefficient of friction between the first wire 200 and a second wire 204 laying on top of the first wire 200. The relatively higher wire-to-surface coefficient of friction restricts, reduces, and/or inhibits movement of the first wire 200 relative to the tray surface during movement of the second wire 204 relative to the first wire 200, and thereby reduces wire entanglement such as between the first wire 200 with the second wire 204, and promotes linearity of the first wire 200 and/or the second wire 204 during movement of the wires. In another example of the systems and methods described below, one or more of the trays of a wire processing machine 102 include one or more separator devices 320 (e.g., FIGS. 27-74) configured to promote physical separation of at least portions of the wire lengths 216 of wires in one or more wire groups, and thereby reduce entanglement of the wires in the same wire groups and/or in different wire groups. In any one of the presently-disclosed embodiments, the aspect of a relatively high-friction surface feature 300 (e.g., material layer 302) and the aspect of separator devices 320 may be implemented in combination with one another in a wire processing machine 102.

In FIG. 1, shown is an example of a wire processing machine 102 having a spool holder 104 supporting a plurality of spools of electrical wire (e.g., first wires 200, second wires 204, etc.). An electrical wire may have a metallic core formed of one or more wire filaments, and may include an insulation layer extending along the length of the wire and covering the metallic core. The spools supported by the spool holder 104 may contain electrical wires of the same or different gauge (e.g., diameter), core material, insulation material, and/or color or marking. The wire processing machine 102 may include a wire feed system 106 for drawing wire from one or more of the spools. In addition, the wire processing machine 102 may include a long-wire supporting tray 166 (shown covered) and a wire processing tray 156 for supporting lengths of the wires after being drawn from the wire feed system 106.

FIG. 2 is a simplified view of an example of a wire processing machine 102 showing a long-wire supporting tray 166 and a wire processing tray 156 each configured to support a plurality of wires during wire processing. The long-wire supporting tray 166 is shown oriented along a direction generally parallel to a wire feed direction of the wire feed system 106. However, the long-wire supporting tray 166 may be oriented in any direction relative to the wire feed direction. The long-wire supporting tray 166 may receive wire drawn from the wire feed system 106. The wire processing tray 156 may be oriented along a direction non-parallel to the long-wire supporting tray 166, and may support the wire during processing of the wire ends 218 by one or more wire processing modules 110 (FIG. 4) that may be included with the wire processing machine 102. The wire processing machine 102 may include a connector insertion module 122 having one or more connector pallets 132, each supporting one or more electrical connectors into which wire ends 218 may be inserted. The wire processing machine 102 may include an operator interface (not shown—e.g., a computer with a monitor or graphical user interface) to allow an operator 390 to manually control, adjust, and/or monitor the operation of the wire processing machine 102.

FIG. 3 is a perspective view of an example of an end portion of a wire bundle having a plurality of wires terminating at a connector 134. As indicated above, a wire processing machine 102 may be configured to sequentially insert the wire ends 218 of one or more wires into the appropriate openings of a connector. As an alternative to assembling the wires into a connector, the wire processing machine 102 may include a wire tape bundler module 120 for taping together the wire ends 218 of a plurality of wires of a wire group (e.g., a wire bundle). After the wire ends 218 are taped together or inserted into a connector, the assembled wire bundle (e.g., wire group) may be removed from the wire processing machine 102, as described in greater detail below. For example, a wire group may be manually removed by an operator 390 from the wire processing machine 102 during which the wires in the wire group may be manually coiled into a wire coil 392 (e.g., FIGS. 18-19).

Figure 4:
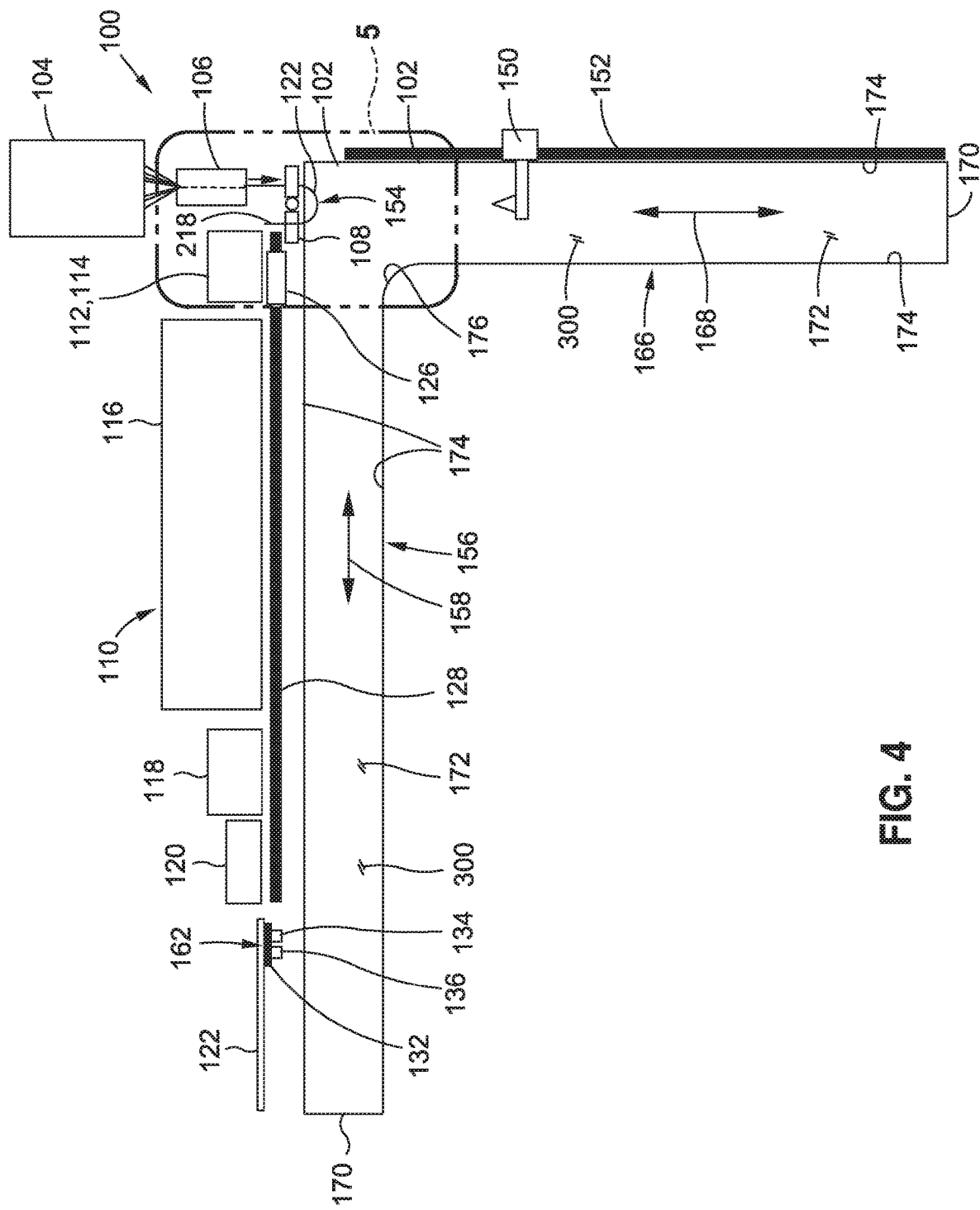
FIG. 4 is a top view of an example of a wire processing machine illustrating a plurality of wire processing modules located along the length of the wire processing tray and further illustrating the long-wire supporting tray configured to receive wire drawn from a wire feed system.

FIG. 4 is a top view of an example of a wire processing machine 102 having a loop puller mechanism 150 movable along a track 152 oriented parallel to the long-wire supporting tray 166. The long-wire supporting tray 166 is configured to receive wire drawn from the wire feed system 106 by the loop puller mechanism 150. Also shown in FIG. 4 is a schematic representation of a plurality of wire processing modules 110 arranged along a lengthwise direction 158 of the wire processing tray 156. The wire processing machine 102 may include a shuttle 126 movable along a rail 128 extending parallel to the wire processing tray 156 lengthwise direction 158. The shuttle 126 may be configured to take each wire end 218 from the end gripper 108, and transport the wire end 218 to one or more of the wire processing modules 110. The long-wire supporting tray 166 and the wire processing tray 156 may support each wire during the processing of one or both wire ends 218 of the wire.

Referring still to FIG. 4, the wire processing modules 110 may include, but are not limited to, an insulation stripper module 112, a stripper inspection module 114, a wire marker module, a crimping module 116, a crimp inspection module 118, a wire tape bundler module 120, and/or a connector insertion module 122. The insulation stripper module 112 may remove a short length (e.g., less than 1 inch) of insulation from the wire end 218 of each wire. The insulation stripper module 112 may be configured as a laser stripper module, a blade stripper module, or other insulation stripper configuration. A stripper inspection module 114 such as a wire strip quality-assurance camera may inspect each wire end 218 for appropriate removal of the insulation layer. The wire marker module (not shown) such as a laser wire marker may apply a label or marking to each individual wire. The wire marker module may be located near the wire feed system 106 to mark each wire as the wire is being fed through the wire feed system 106.

In FIG. 4, the crimping module 116 may crimp an end fitting 220 (e.g., an electrical contact, a terminal, a lug, or other end fitting) onto one or both of the opposing wire ends 218 of a wire. The crimp inspection module 118 (e.g., a crimp quality-assurance camera) may inspect the quality and integrity of the crimp on each wire end 218. The wire tape bundler module 120 may bundle together the wire ends 218 of the wires in a wire group using adhesive tape. Alternatively, the connector insertion module 122 may sequentially insert the wire ends 218 of a wire group into a connector. Each connector may be releasably coupled to a connector pallet 132 to allow for removal of the connector and coiling of the wires during removal from the wire processing machine 102.

Figure 5:
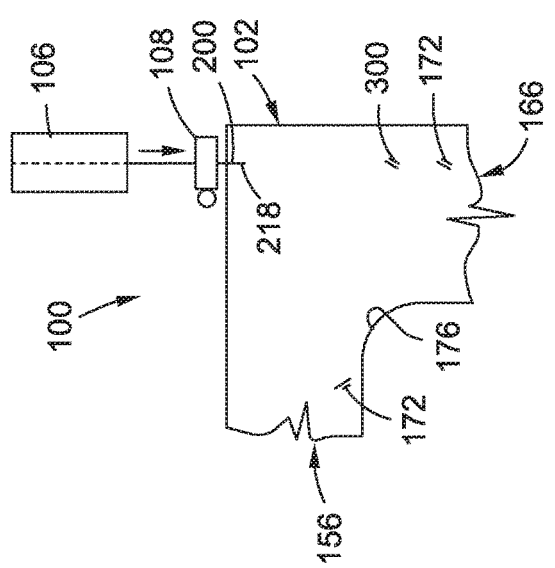
FIG. 5 is a top view of a portion of the wire processing machine showing the wire feed system feeding a first wire to an end gripper.

FIG. 5 is a top view of a portion of the wire processing machine 102 showing the juncture of the wire processing tray 156 with the long-wire supporting tray 166. As indicated above, the lengthwise direction 158 of the wire processing tray 156 may be oriented non-parallel (e.g., orthogonal) to the lengthwise direction 168 of the long-wire supporting tray 166. As mentioned above, the long-wire supporting tray 166 lengthwise direction 168 may be parallel to the wire feed direction of the wire feed system 106.

Figure 7:
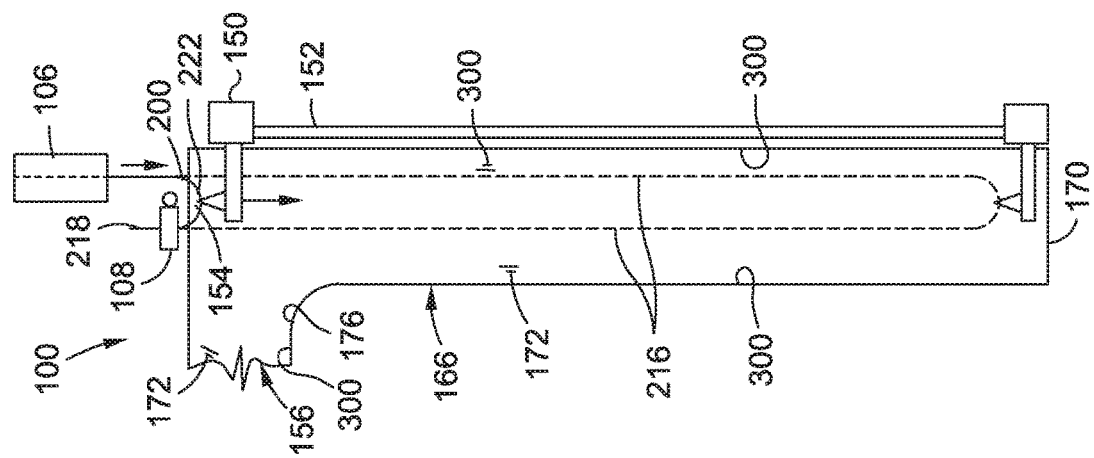
FIG. 7 is a top view of the wire processing machine showing a loop puller mechanism configured to temporarily grip and pull the wire loop along a lengthwise direction of the long-wire supporting tray until a predetermined length of the first wire is reached.
Figure 6:
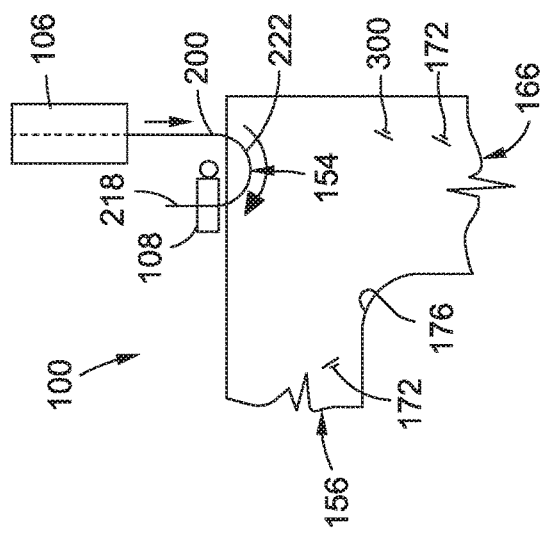
FIG. 6 is a top view of the portion of the wire processing machine showing an end gripper rotating 180° to form a wire loop in the first wire.
Figure 8:
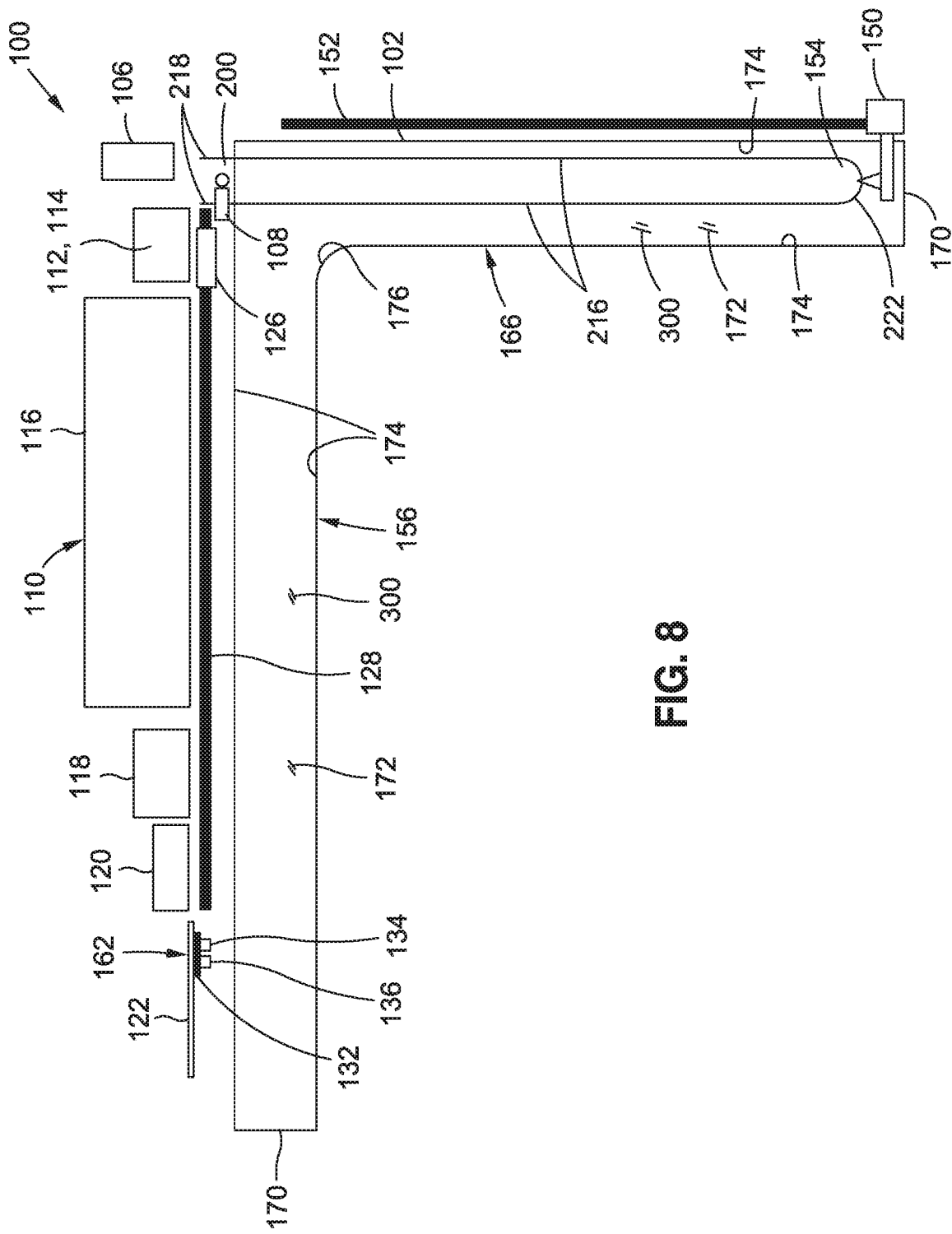
FIG. 8 is a top view of an example of the wire processing machine of FIG. 4 showing the first wire after being pulled to a predetermined length along the lengthwise direction of the long-wire supporting tray.

FIGS. 5-7 illustrate a sequence of initial steps during the processing of a wire. FIG. 5 shows a first wire 200 drawn from the wire feed system 106 and gripped by an end gripper 108. FIG. 6 shows the end gripper 108 after rotation 180° about a vertical axis to form a wire loop 222 in the first wire 200. In the present disclosure, the terms "loop" and "wire loop" may be described as an approximate 180-degree U-shaped arc formed in a wire. FIG. 7 shows an example of a loop puller mechanism 150 configured to grip and pull the wire loop 222 along a lengthwise direction 168 of the long-wire supporting tray 166 until a predetermined length of the wire is reached. The loop puller mechanism 150 is configured to move along the track 152 and pull an individual wire along the long-wire supporting tray 166 lengthwise direction 168 while opposing ends of the wire are held in fixed position by the end gripper 108 and the wire feed system 106. FIG. 8 shows the first wire 200 after being pulled to the appropriate length along the long-wire supporting tray 166, after which the loop puller mechanism 150 releases the first wire 200 onto the tray bottom surface 172 of the long-wire supporting tray 166.

Figure 9:
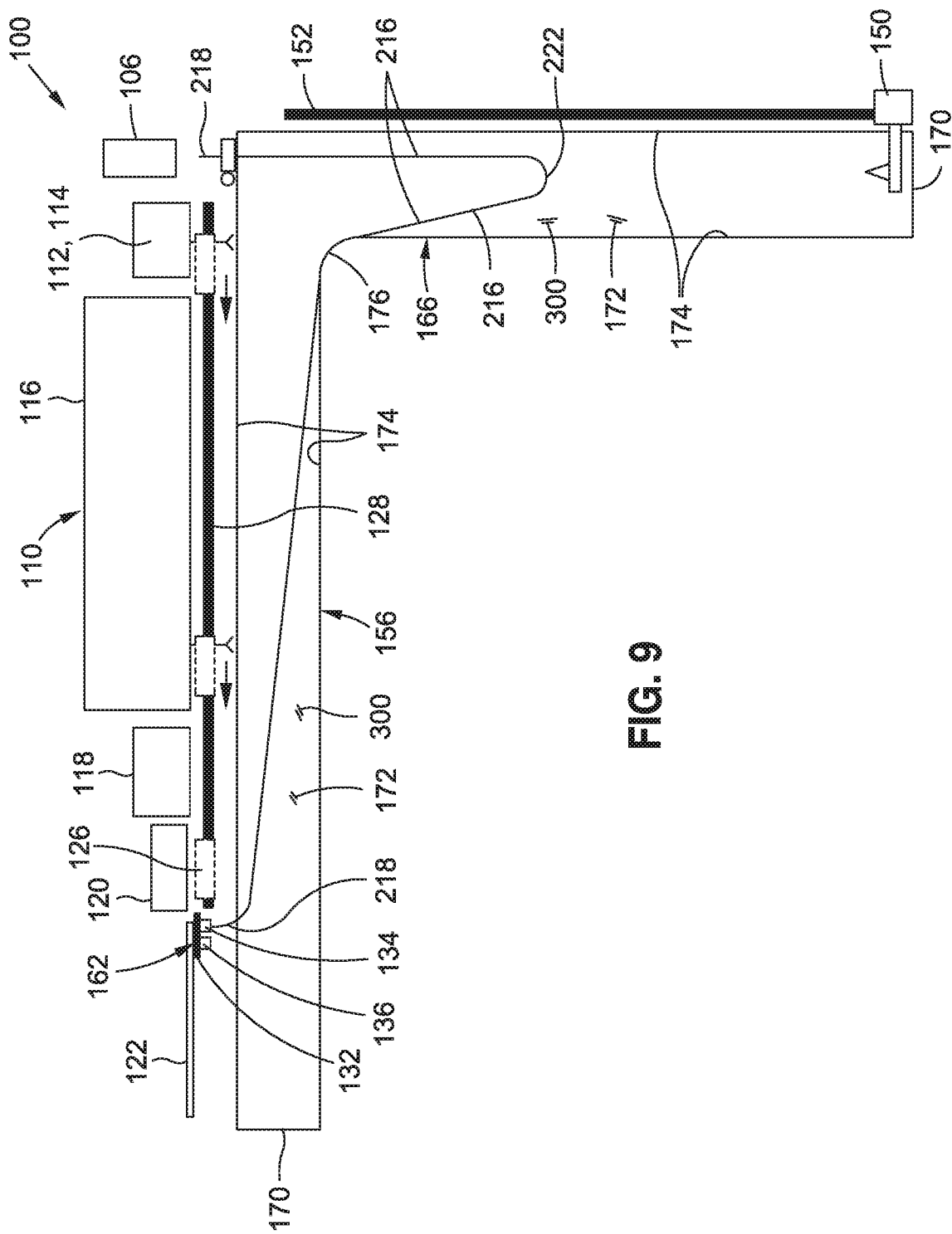
FIG. 9 is a top view of the wire processing machine of FIG. 4 showing the first wire after being moved by a shuttle to different wire processing modules along the lengthwise direction of the wire processing tray and inserted into a first connector mounted to a connector pallet.

FIG. 9 is a top view of the wire processing machine 102 of FIG. 4 showing the position of the first wire 200 after the wire end 218 is handed off to the shuttle 126 and moved by the shuttle 126 to one or more of the different wire processing modules 110. For example, after stripping off a portion of the insulation layer and after inspection of the wire end 218, the shuttle 126 may move the wire end 218 to the crimping module 116 where an electrical contact (not shown) may be crimped onto the wire end 218 followed by inspection at a crimp inspection module 118. The shuttle 126 may then hand off the wire end 218 with crimped end fitting 220 to a connector insertion mechanism 124 located at the connector insertion module 122. As the wire end 218 is moved from module to module, the trailing portion of the first wire 200 is pulled along the tray bottom surfaces 172 of the long-wire supporting tray 166 and the wire processing tray 156.

Figure 10:
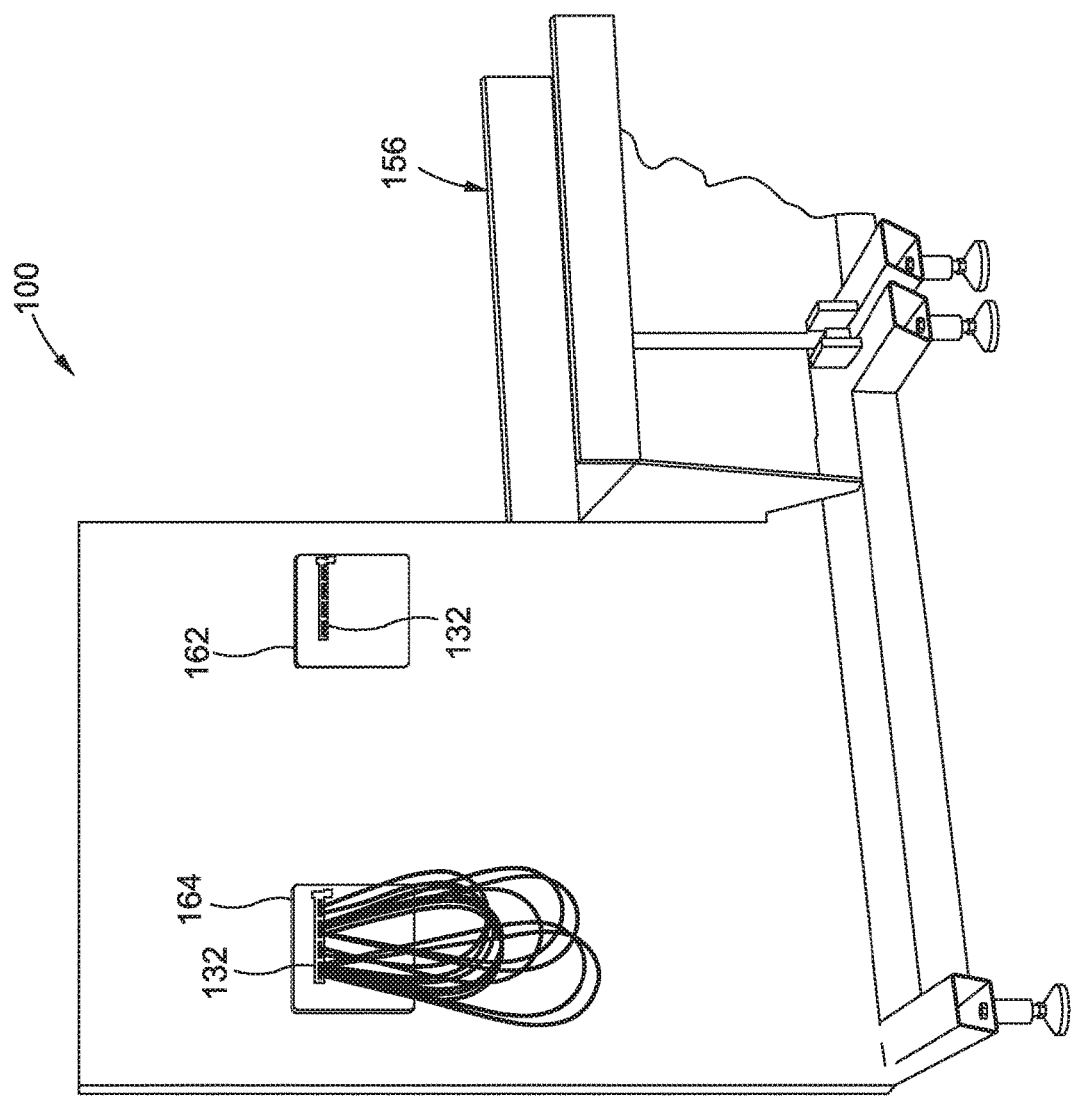
FIG. 10 is a perspective view of an example of a connector insertion module having a connector pallet located in a connector insertion position and another connector pallet containing completed wire bundles located in a connector unloading position.
Figure 11:
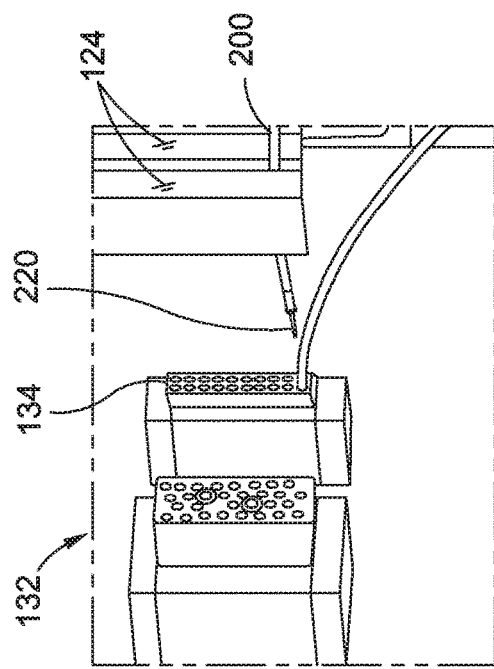
FIG. 11 is a perspective view of an example of a connector insertion mechanism gripping a wire end prior to insertion of the wire end into an electrical connector temporarily mounted to a connector pallet.
Figure 13:
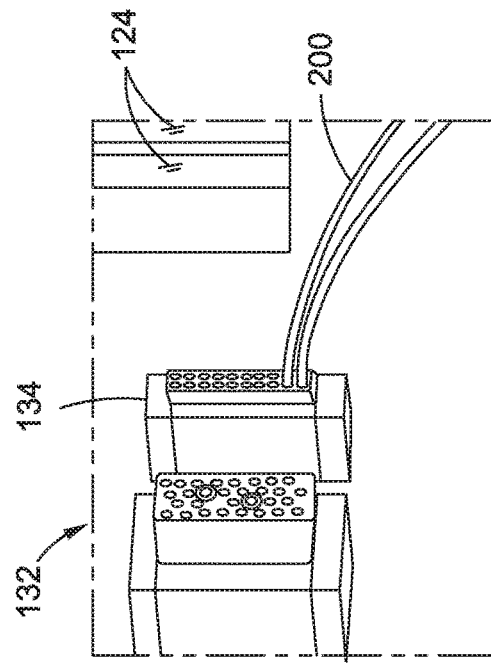
FIG. 13 is a perspective view of the connector of FIG. 12 after insertion of the wire end into the connector.
Figure 12:
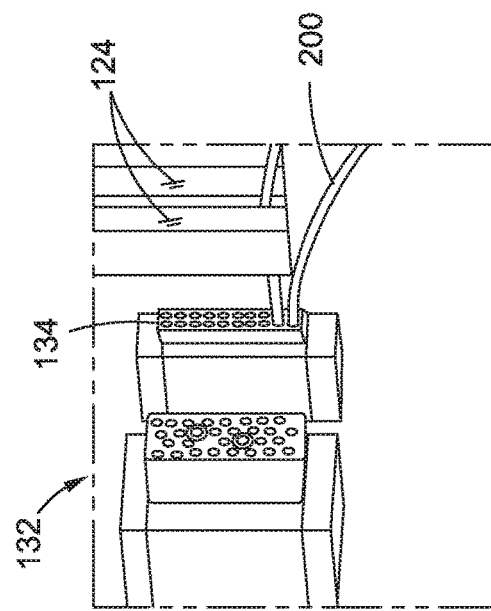
FIG. 12 is a perspective view of the connector insertion mechanism of FIG. 11 during insertion of the wire end into one of the openings in the connector.
Figure 14:
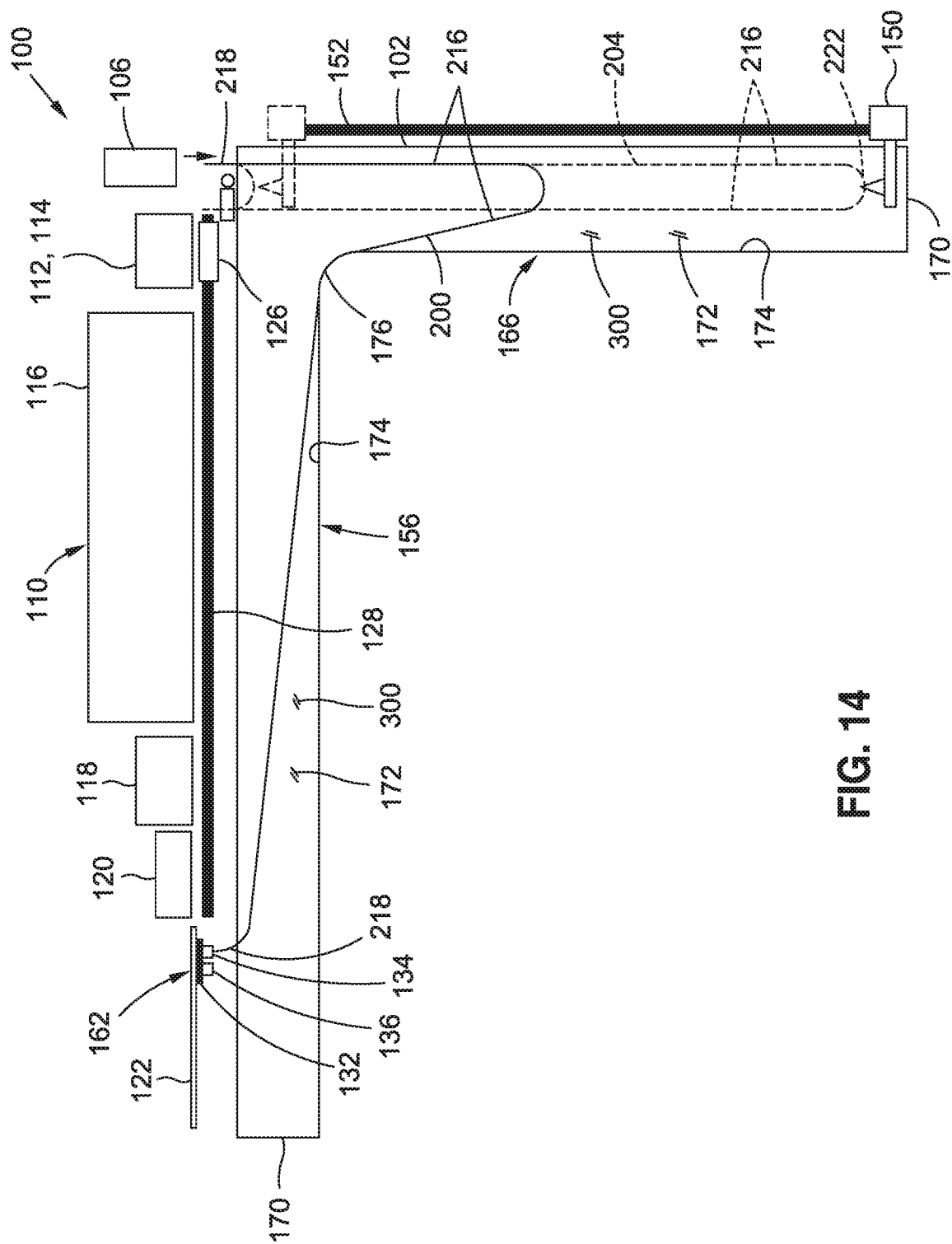
FIG. 14 is a top view of the wire processing machine of FIG. 4 showing a second wire partially overlapping the first wire after the second wire is pulled to a predetermined length by the loop puller mechanism along a lengthwise direction of the wire processing tray.

FIG. 10 is a perspective view of an example of a connector insertion module 122 showing a connector pallet 132 held in a connector insertion position 162 as the end fitting 220 of the wire end 218 of the first wire 200 is inserted into a first connector 134. Also shown is another connector pallet 132 located in a connector unloading position 164 and containing a plurality of connectors with assembled wires representing completed wire bundles ready for removal from the wire processing machine 102. FIGS. 11-13 illustrate the process of a wire end 218 inserted into a connector 134. For example, FIG. 11 shows a connector insertion mechanism 124 gripping a wire end 218 prior to insertion into a connector 134 mounted to a connector pallet 132. FIG. 14 shows the connector insertion mechanism 124 of FIG. 12 during insertion of the wire end 218 into one of the openings of the connector 134. FIG. 13 shows the connector of FIG. 14 after insertion of the wire end 218 into the connector 134.

Figure 15:
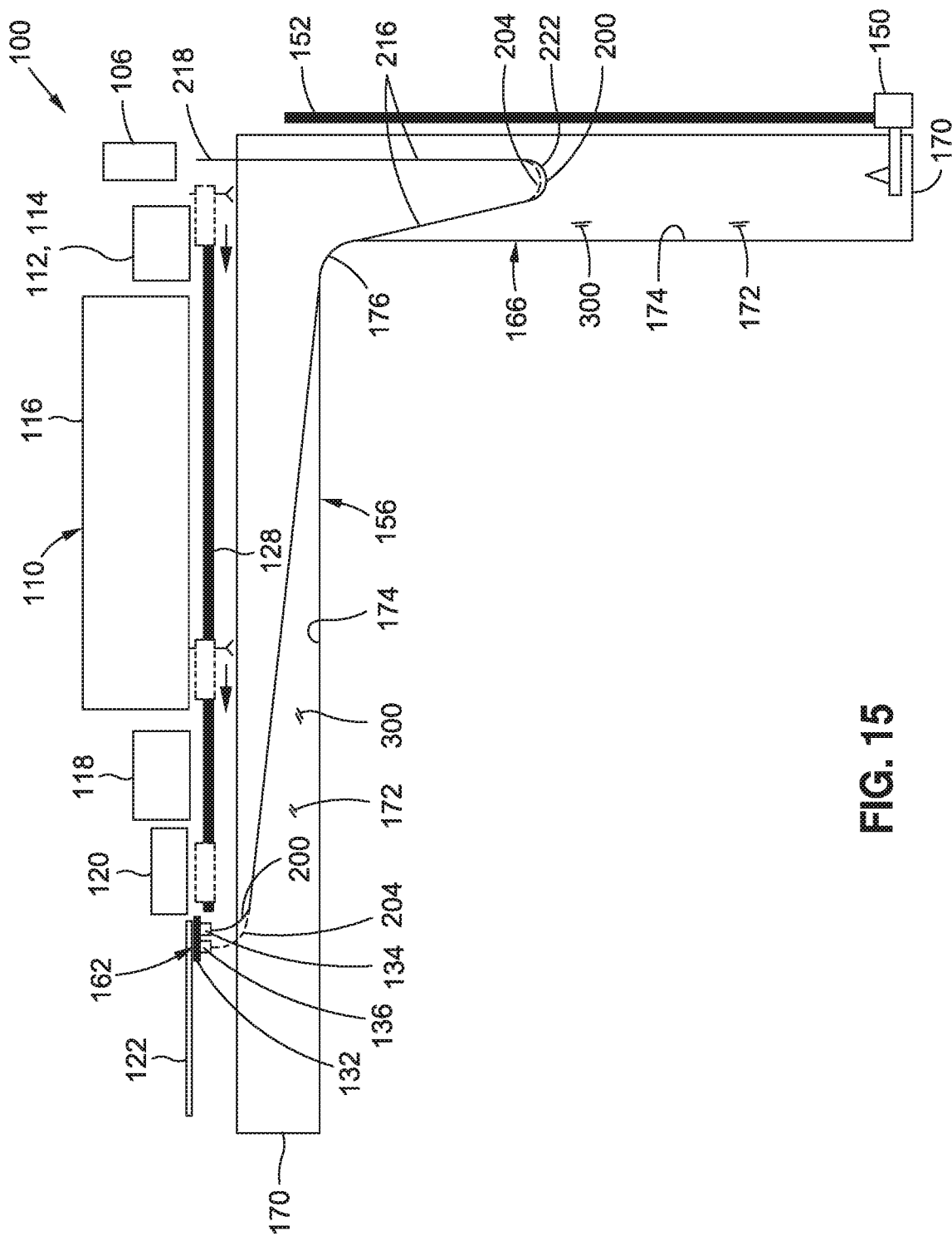
FIG. 15 is a top view of the wire processing machine of FIG. 4 showing the second wire overlapping the first wire after being pulled by the shuttle along the lengthwise direction of the wire processing tray and inserted into a second connector mounted to the same connector pallet as the first connector.

FIG. 14 is a top view of the wire processing machine 102 of FIG. 4 showing a second wire 204 partially overlapping the first wire 200 after the second wire 204 has been pulled by the loop puller mechanism 150 along a lengthwise direction 158 of the wire processing tray 156, in a manner similar to the pulling of the first wire 200 by the loop puller mechanism 150. FIG. 15 shows the second wire 204 overlapping the first wire 200 after the second wire 204 is pulled out to an appropriate length by the shuttle 126 along the wire processing tray 156. The wire end 218 of the second wire 204 is gripped by the shuttle 126 and sequentially moved to the wire processing modules 110 in a manner similar to the processing of the first wire 200 as described above. The wire end 218 of the second wire 204 is ultimately inserted into a second connector 136 mounted to the same connector pallet 132 as the first connector 134. During processing of the wire end 218 of the second wire 204, the long-wire supporting tray 166 and/or the wire processing tray 156 have at least one tray surface such as a tray bottom surface 172 supporting the first wire 200 and the second wire 204.

Figure 16:
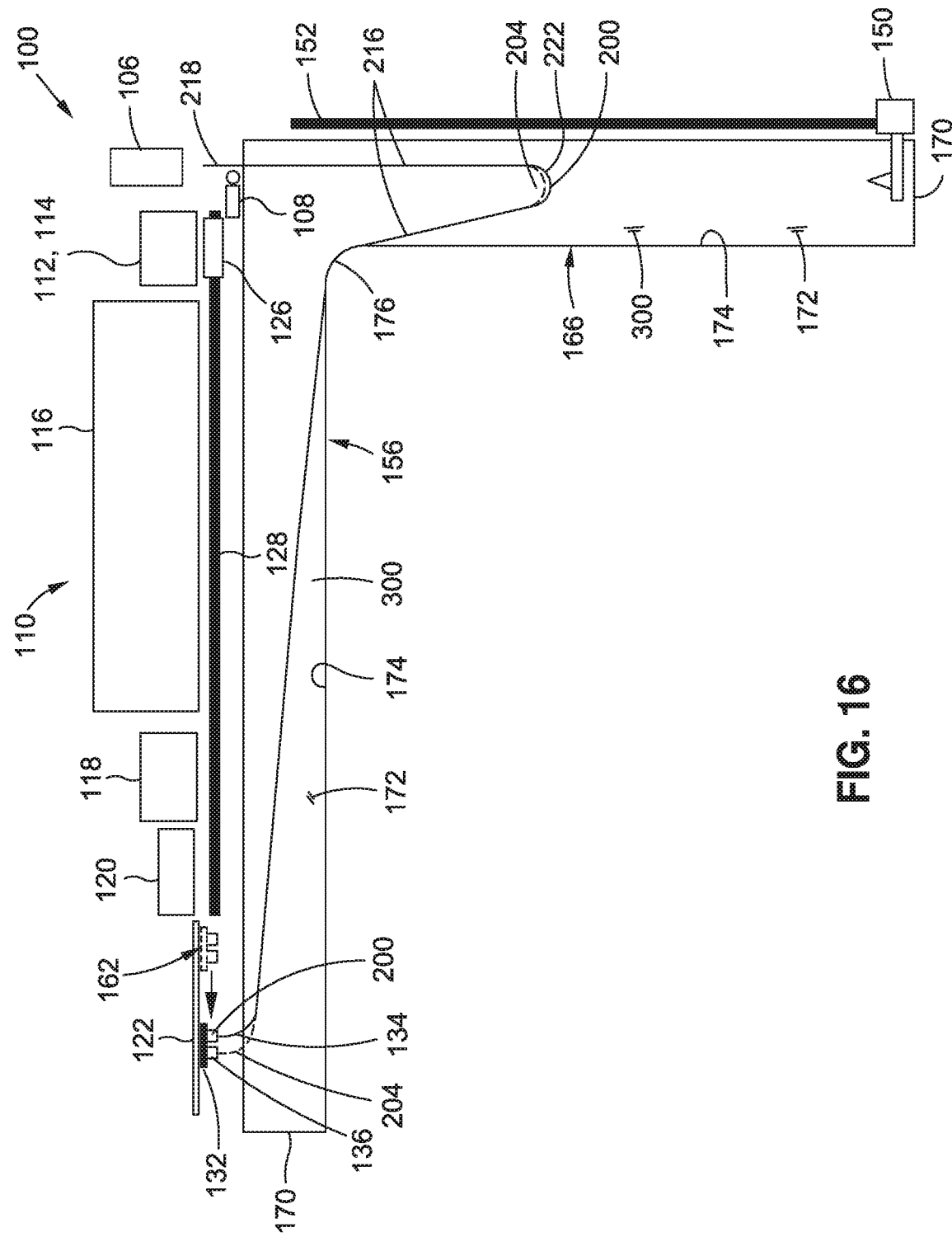
FIG. 16 is a top view of the wire processing machine of FIG. 4 showing the connector pallet moved from the connector insertion position to the connector unloading position.

FIG. 16 shows the connector pallet 132 moved from the connector insertion position 162 to the connector unloading position 164 after the first wire 200 and second wire 204 have been inserted into the respective first connector 134 and second connector 136. It should be noted that although the wire processing operation is described in the context of a single first wire 200 and a single second wire 204, the presently-disclosed system and method may be implemented for processing and installing any number of first wires 200 of a first wire group 202 into a first connector 134, and processing and installing any number of second wires 204 of a second wire group 206 into a second connector 136, and may additionally include processing and installing any number of additional wires of additional wire groups into additional respective connectors mounted to a connector pallet 132. However, as mentioned above, the wires of a wire group may be tape bundled at the wire tape bundler module 120 in lieu of being inserted into a connector.

Figure 17:
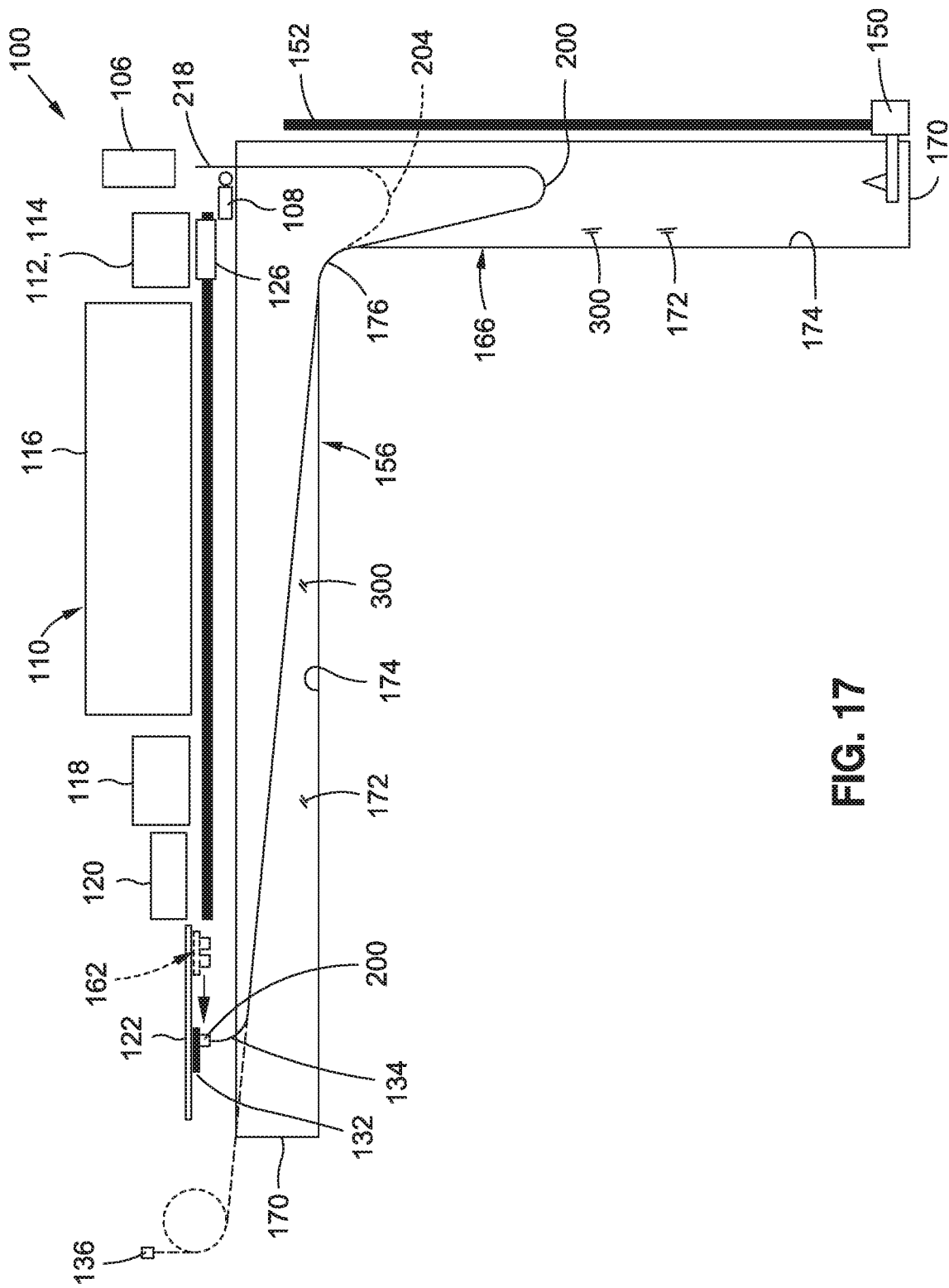
FIG. 17 is a top view of the wire processing machine of FIG. 4 showing the removal of the second connector and the second wire from the wire processing machine.
Figure 18:
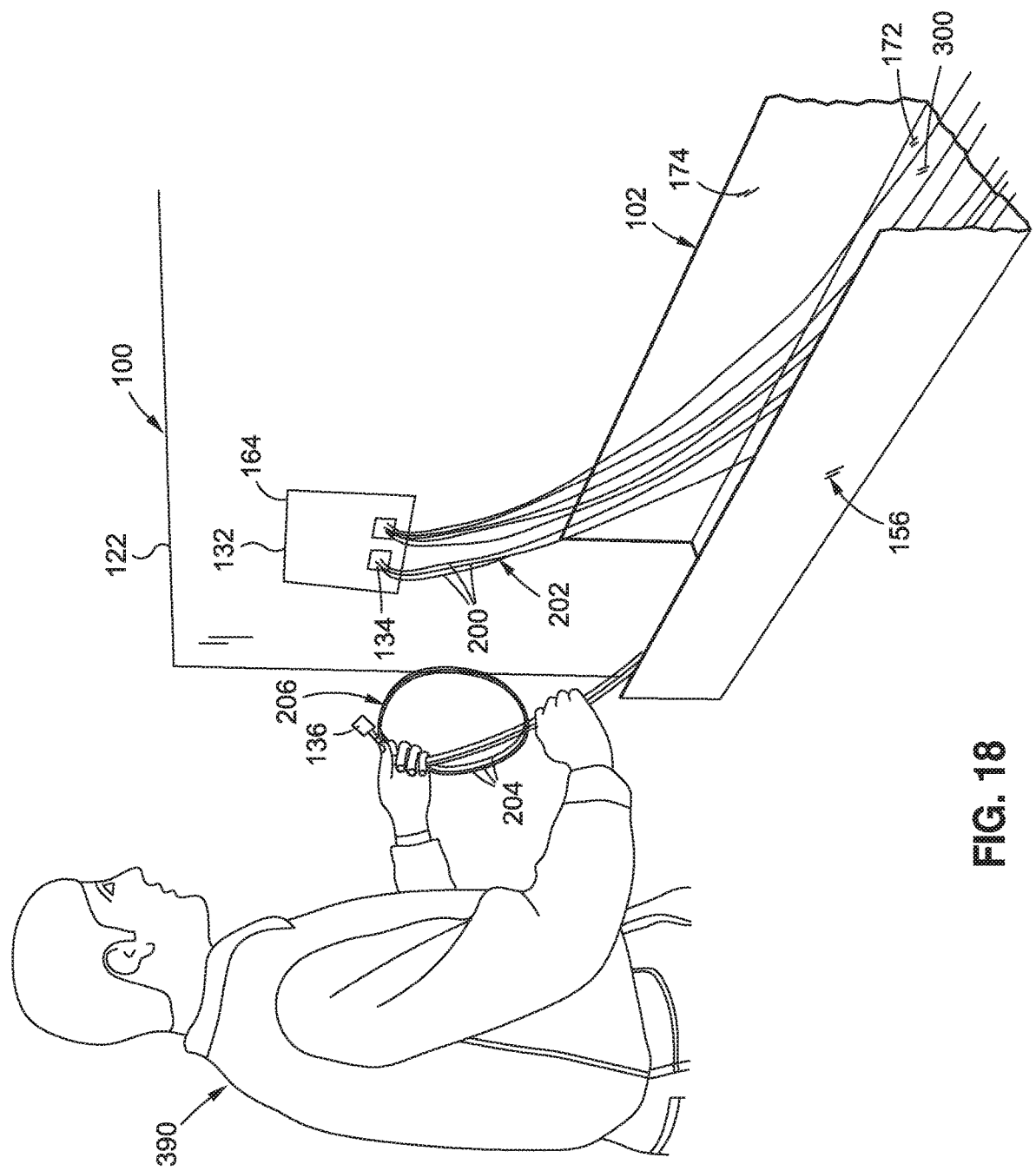
FIG. 18 is a perspective view of an operator coiling a plurality of second wires after removal of the second connector from the connector pallet.
Figure 19:
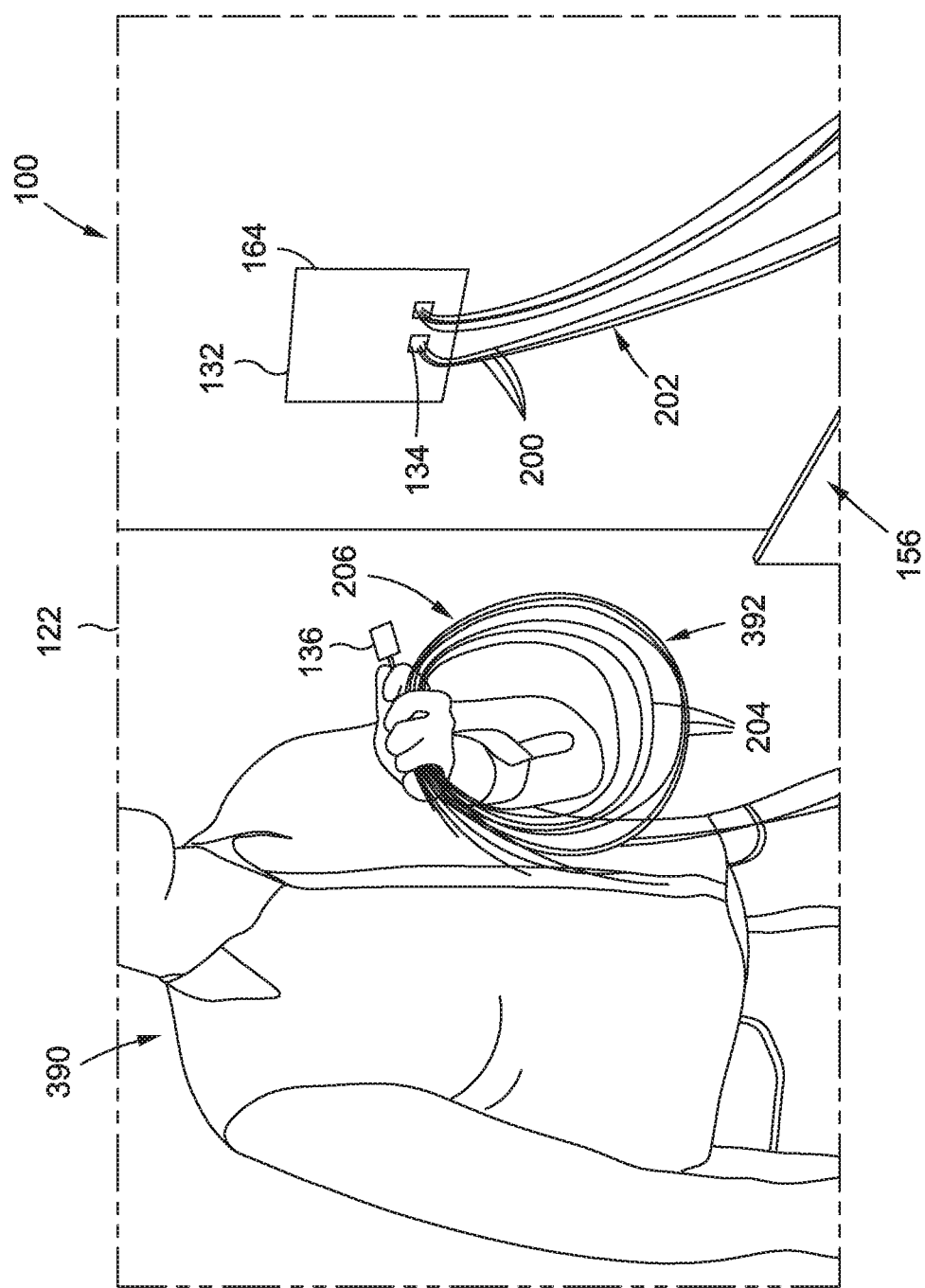
FIG. 19 is a perspective view of the operator holding the coiled second wires after removal from the wire processing machine.

FIG. 17 shows the coiling of the second wire 204 after removal of the second connector 136 from the connector pallet 132 when in the connector unloading position 164. In a preferred example, the wires and associated connectors are removed from the wire processing machine 102 on a last-in/first-out basis. In the present example, the second wire 204 and second connector 136 are removed from the wire processing machine 102 prior to removal of the first wire 200 and first connector 134. The final output of a wire processing operation includes either (1) one or more connectors, each with one or more wires hanging out and preferably coiled, or, (2) one or more bundles of wires, each with their wire ends 218 taped together and preferably coiled. FIG. 18 shows an operator 390 coiling the second wire 204 after removal of the second connector 136 from the connector pallet 132. FIG. 19 shows the operator 390 holding the coiled second wire 204 after removal from the wire processing machine 102.

Advantageously, in the present disclosure, one or more of the tray surfaces of the long-wire supporting tray 166 and/or the wire processing tray 156 may have a surface feature 300 providing a wire-to-surface coefficient of friction between the tray surface and the first wire 200 that is higher than the wire-to-wire coefficient of friction between the first wire 200 and the second wire 204 laying on top of and in direct physical contact with the first wire 200 in at least one location along the length of the wires. As a result of the wire-to-surface coefficient of friction being higher than the wire-to-wire coefficient of friction, movement of the first wire 200 relative to the tray surface is restricted, reduced, or prevented during movement of the second wire 204 relative to (e.g., along the top of) the first wire 200. In addition, the relatively higher wire-to-surface coefficient of friction promotes and/or maintains linearity of the first wire(s) and/or the second wire(s) during lengthwise movement. In this regard, the relatively higher wire-to-surface coefficient of friction aids in providing tension to each wire during wire movement which tends to straighten and promote linearity and parallelism of the wires thereby reducing the tendency of coiling of individual wires, and minimizing cross-over of adjacent wires, all of which reduces wire entanglement as different wire groups (e.g., the first wire group 202 and the second wire group 206) are moved relative to one another during wire processing. By restricting movement of the first wire 200 or first wire group 202 relative to the second wire 204 or second wire group 206, and/or by promoting linearity of the wires, wire entanglement is minimized which allows for the sequential removal and coiling of each wire group from the wire processing tray 156 of the wire processing machine 102.

Figure 20:
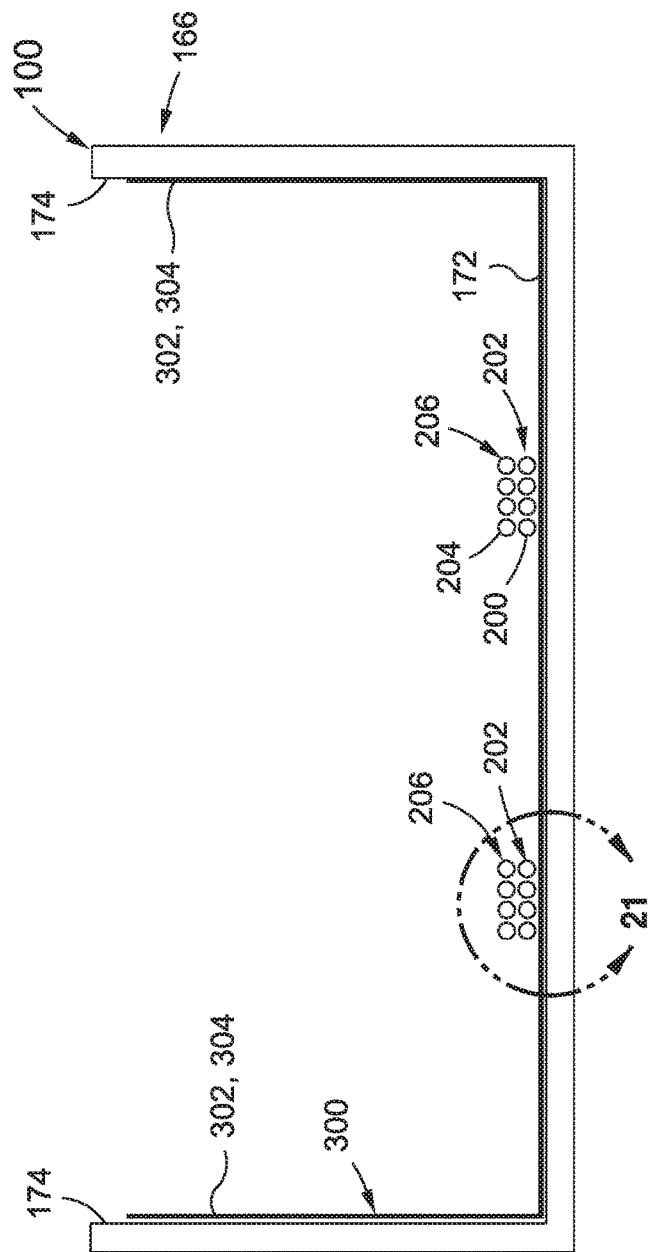
FIG. 20 is a sectional view of the long-wire supporting tray illustrating a second wire group of second wires overlapping a first wire group of first wires and further illustrating a relatively high-friction material layer or material coating on the tray bottom surface and tray side surfaces of the long-wire supporting tray.

FIG. 20 is a sectional view of the long-wire supporting tray 166 illustrating a second wire group 206 of second wires 204 overlapping a first wire group 202 of first wires 200, and further illustrating a relatively high-friction material layer 302 or material coating 304 on the tray bottom surface 172 and the tray side surfaces 174 of the long-wire supporting tray 166. In the example shown, the tray may have a horizontally-oriented planar tray bottom surface 172 and vertically-oriented opposing tray side surfaces 174. In addition, the wire processing machine 102 may include a tray corner surface 176 which may be configured as a radiused or curved tray side wall located at a juncture of the long-wire supporting tray 166 with the wire processing tray 156 as shown in FIG. 17. The tray surface may be configured to support a first wire group 202 laying on and in direct contact with the tray surface such that at least a portion of a length of the one or more first wires 200 extends generally along a tray lengthwise direction.

Figure 21:
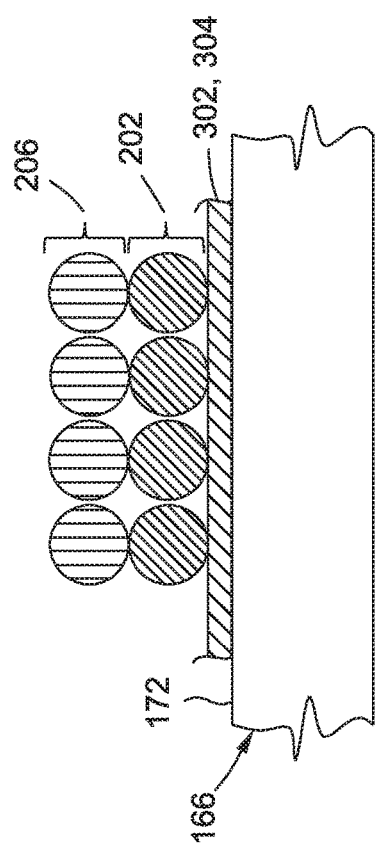
FIG. 21 is a magnified sectional view of a portion of the long-wire supporting tray taken along line 21 of FIG. 20 and illustrating the material layer or material coating on the tray bottom surface providing a wire-to-surface coefficient of friction between the tray surface and the first wires higher than a wire-to-wire coefficient of friction between the first wires and the second wires laying on top of the first wires.

FIG. 21 is a magnified sectional view of a portion of a tray (e.g., the long-wire supporting tray 166 or the wire processing tray 156) illustrating the material layer 302 or material coating 304 applied over the tray surfaces providing a wire-to-surface coefficient of friction between the tray surface and the first wires 200 higher than a wire-to-wire coefficient of friction between the first wires 200 and the second wires 204 laying on top of the first wires 200. In this regard, the material layer 302 or material coating 304 may provide a level of tackiness or stickiness with the first wire group 202 higher than the tackiness between the first wire group 202 and the second wire group 206. In some examples, the material layer 302 or material coating 304 may be formed of bare metal, coated metal, painted metal, rubber, plastic, foam, fabric, cloth, and/or rubber-impregnated cloth (e.g., friction tape). However, the material layer 302 or material coating 304 may be any material composition providing a wire-to surface coefficient of friction that is higher than the wire-to-wire coefficient of friction, as described above. In one embodiment, the material coating 304 may be a polymeric material that is sprayed onto or applied to one or more of the tray surfaces to provide the relatively high wire-to-surface coefficient of friction. In other embodiments, the material layer 302 may be a mat such as a rubber mat or a plastic mat placed in and/or attached to one or more of the tray surfaces.

Figure 23:
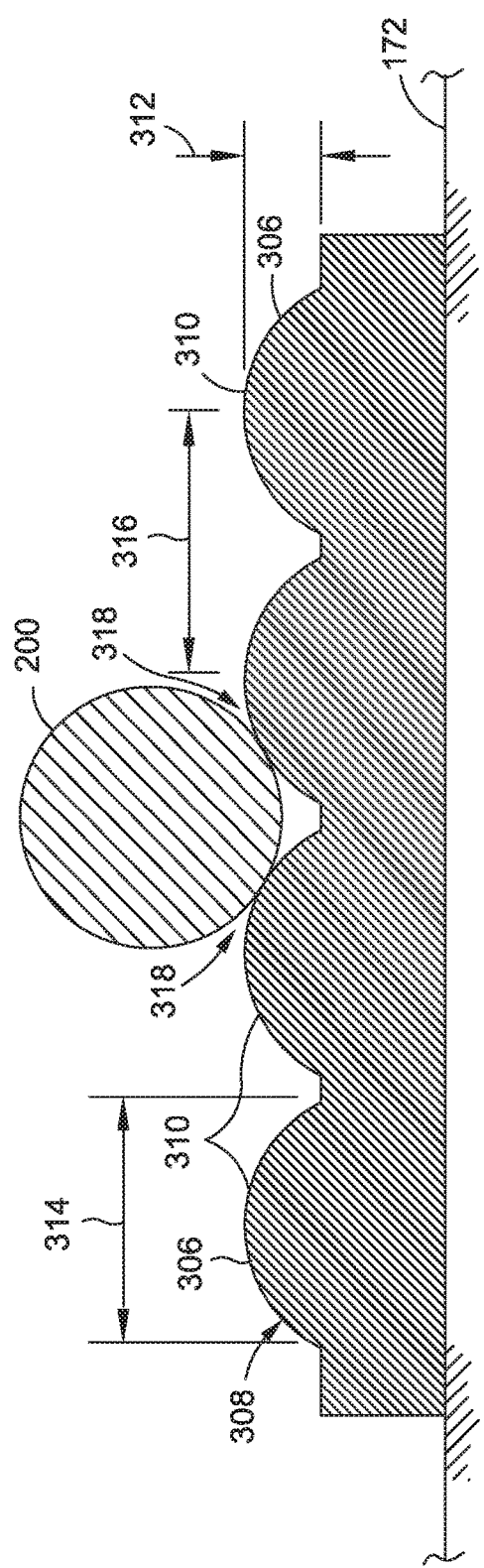
FIG. 23 is a sectional view of a portion of a tray bottom surface having a surface texture in an exemplary embodiment comprising a plurality of concave and/or convex surface features sized and configured to provide two contact patches between the first wire and an adjacent pair of surface features when viewed in cross-section.

In some examples, the surface feature 300 applied to one or more tray surfaces may include a surface texture 306. In an embodiment, the surface texture 306 may be comprised of a plurality of geometric shapes 308 protruding above the tray surface and/or extending below the tray surface (e.g., divots or holes in the tray surface), and configured to provide an increased amount of contact between the first wire 200 and the tray surface relative to the contact between the first wire 200 and the tray surface without the surface texture 306. For example, the plurality of geometric shapes 308 may comprise a pattern of concave and/or convex surface features 310 each having a surface feature height 312 (FIG. 23) and a surface feature width 314 (FIG. 23). In some examples, the surface feature height 312 and/or the surface feature width 314 may be smaller than the diameter of a smallest one of the first wires 200 in contact with the surface features 310. However, in other examples, the surface feature height 312 and/or the surface feature width 314 may be larger than the diameter of the largest one of the wires in contact with the surface features 310. In an embodiment, the surface features 310 may be spaced apart from one another at a feature spacing 316 that is less than the diameter of the smallest one of the first wires 200.

Figure 22:
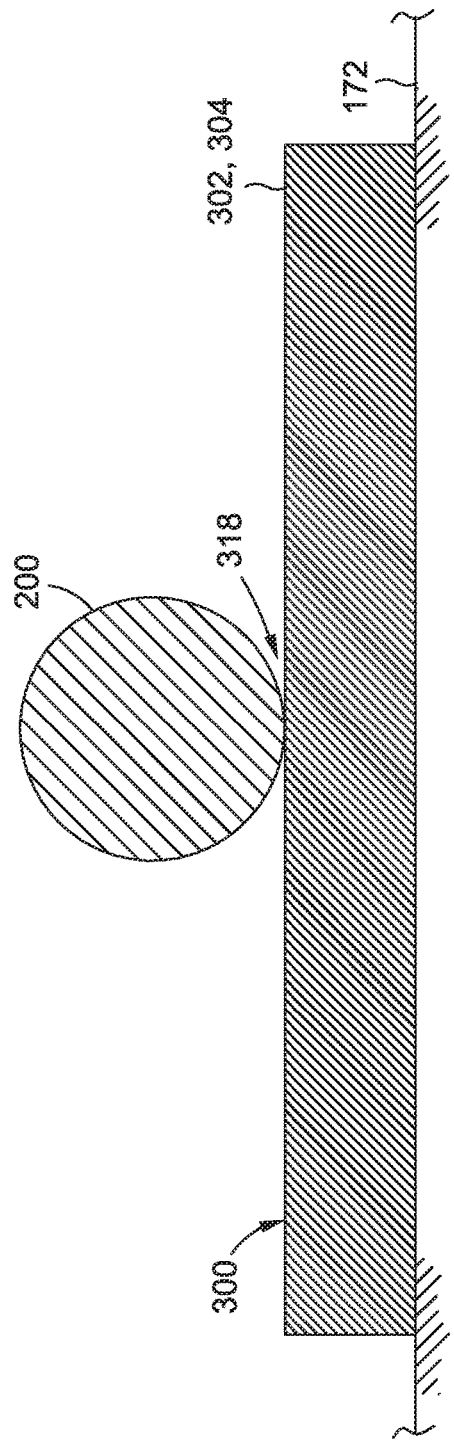
FIG. 22 is a sectional view of a portion of a tray bottom surface supporting a single first wire at a single contact patch between the first wire and a generally planar material layer or material coating when viewed in cross-section.

FIG. 22 is a sectional view of a portion of a tray bottom surface 172 supporting a single first wire 200 at a single contact patch 318 between the first wire 200 and a generally planar material layer 302 or material coating 304 when viewed in cross-section. FIG. 23 shows the tray bottom surface 172 having a surface texture 306 in an exemplary embodiment comprising a plurality of rounded or convex surface features 310 sized and configured to provide two discrete contact patches 318 between the first wire 200 and respectively an adjacent pair of surface features 310 when the first wire 200 is viewed in cross-section. Alternatively or additionally, the geometric shapes may include concave surface features comprising one or more divots or holes (not shown) in the tray surface and providing an increased amount of contact between a wire and the tray surface relative to a tray surface lacking geometric shapes.

Advantageously, a surface texture 306 such as the surface features 310 illustrated in FIG. 23 may increase the contact surface area on each wire thereby increasing alignment forces of the wires. In this regard, the surface texture 306 such as the surface features 310 may aid in straightening the wires by tending to comb out the wires as the wires are pulled along the tray surface. In one example, the surface features 310 may be provided as a cellular material formed of sheets of polymeric material and defining rows of bubble chambers, and commercially known as Bubble Wrap™. However, the surface texture 306 may be provided as any pattern of surface features in any size, spacing, shape, and configuration, and is not limited to the rounded surface features 310 illustrated in FIG. 23. For example, the surface texture may be provided as a pattern of pyramids, truncated pyramids, cones, cylinders, hemispheres, or raised orthogonal shapes such as cubes or rectangular bosses.

FIG. 24 is a top view of a portion of the wire processing tray 156 illustrating the coiling of a first wire group 202 during removal from the wire processing tray 156. Also shown is a pulling force 394 exerted by an operator 390 on the first wire group 202 during removal from the wire processing tray 156. FIG. 25 is a magnified top view of the first wires 200 of the first wire group 202 of FIG. 24 showing a frictional force 396 generated between the first wires 200 and the tray bottom surface 172 along a direction opposite the pulling force 394. As mentioned above, the frictional force 396 between the first wires 200 and the tray bottom surface 172 as a result of the surface feature 300 results in a tendency for the wire(s) 218 to straighten and remain in place and/or to remain straight along the length of the wire(s) 218, and thereby minimizing wire entanglement. Advantageously, the frictional force 396 promotes the wire (s) 218 to stay in place during removal of one of the wire groups. For example, at the completion of processing of five (5) different wire groups laying in a tray and each terminating at a different connector, removal of the uppermost wire group from the tray may be facilitated without pulling the lower four (4) wire groups lengthwise along the tray. In this regard, the lower four (4) wire groups have a tendency to stay in place (on the tray) as a result of the wire-to-surface coefficient of friction between the tray and the lower four (4) wire groups being higher than the wire-to-wire coefficient of friction between the uppermost wire group and the lower four (4) wire groups.

In some examples, the wire processing system 100 includes at least one separator device 320 associated with the tray and configured to promote physical separation of the wire during wire processing and/or wire bundle unloading. For example, one or more separator devices 320 may be supported on (e.g., resting on) or non-attached to one or more of the trays. In other examples, one or more separator devices 320 may be physically mounted or attached to one or more of the trays such as by mechanical fastening and/or adhesively bonding to a tray.

The presently-disclosed separator devices 320 promote physical separation of at least portions of the wire lengths of the first wire(s) of a first wire group 202 from at least portions of the wire lengths of the second wire(s) of a second wire group 206. In some examples, the separator devices 320 physically separate the wire lengths 216 of one or more first wires 200, and/or physically separate the wire lengths 216 of one or more second wires 204. In this regard, the separator devices 320 promote linearity and minimize entanglement of the wires with each other and/or with other wires in one or more wire groups.

FIG. 26 is a top view of an example of a long-wire supporting tray 166 having multiple separator devices 320. The separator devices 320 include a separator wall 340 and a plurality of separator posts 324, 326, 328 located at spaced intervals along a lengthwise direction 168 of the long-wire supporting tray 166. The separator wall 340 may extend at least partially along the tray lengthwise direction 168. In FIG. 26, the separator wall 340 is shown extending from a location adjacent to the wire feed system 106 to the separator post 324 located nearest the wire feed system 106. However, the separator wall 340 may extend along any portion of the lengthwise direction 168 of the long-wire supporting tray 166. In addition, the long-wire supporting tray 166 may include a single separator wall 340 and no separator posts, or the long-wire supporting tray 166 may include a single separator wall 340 extending along a majority of the lengthwise direction 168 of the long-wire supporting tray 166 and a single separator post located at an extreme tray end 170 of the long-wire supporting tray 166. In other examples, a long-wire supporting tray 166 may include two or more separator walls (not shown) arranged end-to-end along a lengthwise direction 168 of the long-wire supporting tray 166.

FIG. 26 also illustrates three separator posts 324, 326, 328 located at spaced intervals along the lengthwise direction 168 of the long-wire supporting tray 166. One of the separator posts 328 is positioned adjacent to a tray end 170. Another one of the separator posts 326 is positioned approximately mid-length of the long-wire supporting tray 166. A further separator post 324 is located between the above-mentioned separator posts. Each one of the separator posts may be approximately laterally centered along a widthwise direction of the long-wire supporting tray 166. However, a long-wire supporting tray 166 may include any number of separator posts in any lengthwise spacing and at any widthwise location in the long-wire supporting tray 166. The loop puller mechanism 150 may be configured to pull each wire to a desired length and drop the wire over a separator post such that the wire loop 222 of each wire at least partially wraps around the separator post.

FIG. 27 is a sectional view of the long-wire supporting tray 166 of FIG. 26 and illustrating a separator post separating and minimizing entanglement of the wire lengths 216 on opposite sides of the separator post. In any of the embodiments disclosed herein, any one of the tray surfaces and/or any one or more of the side surfaces of any one or more of the separator posts may optionally include a surface feature 300 such as a material layer 302, a material coating 304, or a surface texture 306 providing a wire-to-surface coefficient of friction between the tray surface and the first wire(s) higher than the wire-to-wire coefficient of friction between the first wire(s) and other wire(s) laying on top of the first wire(s) to promote linearity and parallelism of the wire and reduce or avoid wire entanglement in a manner as described above. Advantageously, the separator wall 340 and/or the one or more separator posts in a long-wire supporting tray 166 may physically separate the wire lengths 216 on opposite sides of the separator wall 340 and/or separator posts, and thereby minimize entanglement of the wire lengths 216 with each other and with the wire lengths 216 of other wires in the long-wire supporting tray 166 during wire processing and/or wire bundle unloading. In addition, the separator wall 340 and/or the separator posts may promote linearity and parallelism of the wire lengths 216, at least on the opposing sides of the wire loop 222 which may further minimize wire entanglement.

FIG. 28 is a top view of a long-wire supporting tray 166 having a plurality of post sets 338 located at spaced intervals along a lengthwise direction 168 of the long-wire supporting tray 166 according to the corresponding lengths of the wires in the first, second, third and fourth wire groups 202, 206, 210, 214 partially encircling the four different post sets 338. A post set 338 may include at least two separator posts which may be laterally spaced apart from one another and may be located at approximately the same lengthwise position along the long-wire supporting tray 166. FIG. 28 illustrates four different post sets 338 positioned in correspondence with a first wire group 202, a second wire group 206, a third wire group 210, and a fourth wire group 214. FIG. 29 is a perspective view of different wire groups wrapped around the different post sets 338. Advantageously, the post sets 338 may provide increased separation between the wire lengths 216 on each side of the post sets 338 and may thereby further minimize the risk of wire entanglement.

FIG. 30 is a top view of a long-wire supporting tray 166 having three rotating separator posts positioned according to a respective length of a first wire group 202, a second wire group 206, and a third wire group 210. One or more of the separator posts may be rotatable about a vertical post axis 322 to facilitate removal of the wire or wire groups from the long-wire supporting tray 166. A rotatable separator post may be freely rotatable in response to pulling on one end of a wire or wire group that partially wraps around the separator post. The rotatable separator posts may be cylindrical as shown in FIGS. 26-29, cone-shaped as shown in FIGS. 30-31, or a rotatable separator post may have other shapes.

FIG. 31 is a side view of the long-wire supporting tray 166 of FIG. 30 showing the second wire group 206 wrapped around a rotatable cone-shaped separator post. The bottom portion of a cone-shaped separator post may have a larger diameter than a cylindrical separator post as a means for providing further separation of the wire lengths 216 on opposite sides of the wire loop 222. A top portion of a separator post may have a relatively small diameter to facilitate the dropping of each the wire over a top end of the cone-shaped separator post. As indicated above, any one of the rotatable separator posts embodiments may include surface features 300 such as a material layer 302, a material coating 304, or a surface texture 306 to provide a relatively high wire-to-surface coefficient of friction (e.g., higher than the wire-to-wire coefficient of friction) as a means to promote linearity and parallelism of the wire groups and reduce or avoid wire entanglement.

FIGS. 32-36 illustrate an example of separator posts that are laterally movable. In one example, a long-wire supporting tray 166 may include at least two separator posts in a post set 338 which are individually laterally movable relative to one another to facilitate separation of the wire lengths 216 during stringing of a first wire group 202 and a second wire group 206. FIG. 32 is a top view of an example of a long-wire supporting tray 166 having a post set 338 including three (3) separator posts located adjacent to a tray end 170 including a first separator post 324, a second separator post 326, and a third separator post 328. In addition, the long-wire supporting tray 166 includes a post set 338 including three (3) separator posts located adjacent to the juncture of the long-wire supporting tray 166 and the wire processing tray 156, and including a fourth separator post 330, a fifth separator post 334, and a sixth separator post 336. One or more of the separator posts may be individually laterally movable relative to one another to facilitate separation of different wire groups.

For example, FIG. 33 is a top view of the long-wire supporting tray 166 showing a first wire group 202 pulled by the loop puller mechanism 150 over a first separator post 324 positioned in an approximate widthwise center of the long-wire supporting tray 166. FIG. 34 shows the first separator post 324 laterally moved toward a tray side while a fourth separator post 330 located near the radiused corner at the juncture of the long-wire supporting tray 166 and the wire processing tray 156 is laterally moved toward the wire feed system 106 after the first wire group 202 is wrapped around the first separator post 324. The lateral movement of the first separator post 324 and fourth separator post 330 provides a clear path for the loop puller mechanism 150 to pull out one or more second wires 204 from the wire feed system 106.

FIG. 35 shows a second wire group 206 wrapped around a second separator post 326 which has been laterally moved toward the widthwise center of the long-wire supporting tray 166. FIG. 36 shows the second separator post 326 laterally moved toward the tray side and further illustrates a fifth separator post 334 at the juncture of the long-wire supporting tray 166 and wire processing tray 156 laterally moved toward the wire feed system 106 after the second wire group 206 is wrapped around the second separator post 326. FIG. 36 also illustrates the third separator post 328 moving laterally toward the widthwise center of the long-wire supporting tray 166 in preparation for sequentially receiving one or more third wires 208 of the third wire group 210.

As may be appreciated, a post set 338 of laterally movable separation posts may be provided in any quantity and may be positioned at any lengthwise location along the long-wire supporting tray 166 in correspondence with the length of the wire that each separator post supports. In one example, a post set 338 of movable separator posts may be provided at the tray end 170 opposite the wire feeder system (e.g., FIGS. 32-36), at spaced intervals (not shown) along the tray lengthwise direction 168, and/or at the juncture of the long-wire supporting tray 166 and the wire processing tray 156. Advantageously, the movable separator posts allow the loop puller mechanism 150 to operate in a simple, linear path when drawing wires from the wire feed system 106 and releasing the wires over the appropriate separator posts.

Figure 38:
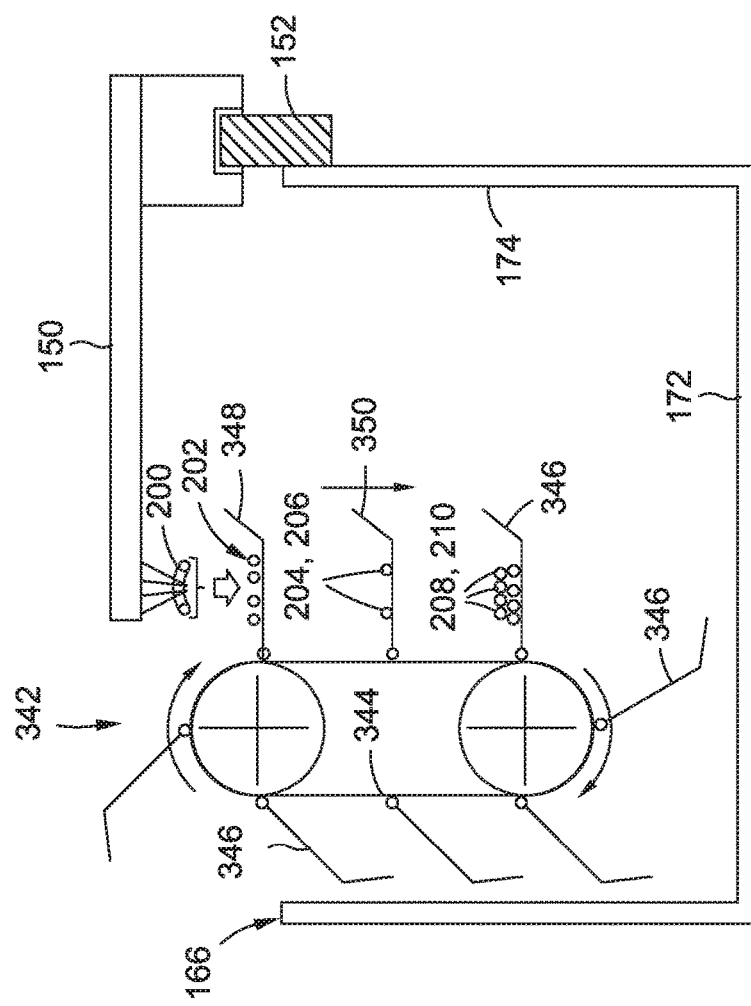
FIG. 38 is a sectional view of the long-wire supporting tray taken along line 38 of FIG. 37 and illustrating a plurality of baskets pivotably coupled to and vertically movable on a conveyor belt of the conveyor system.
Figure 37:
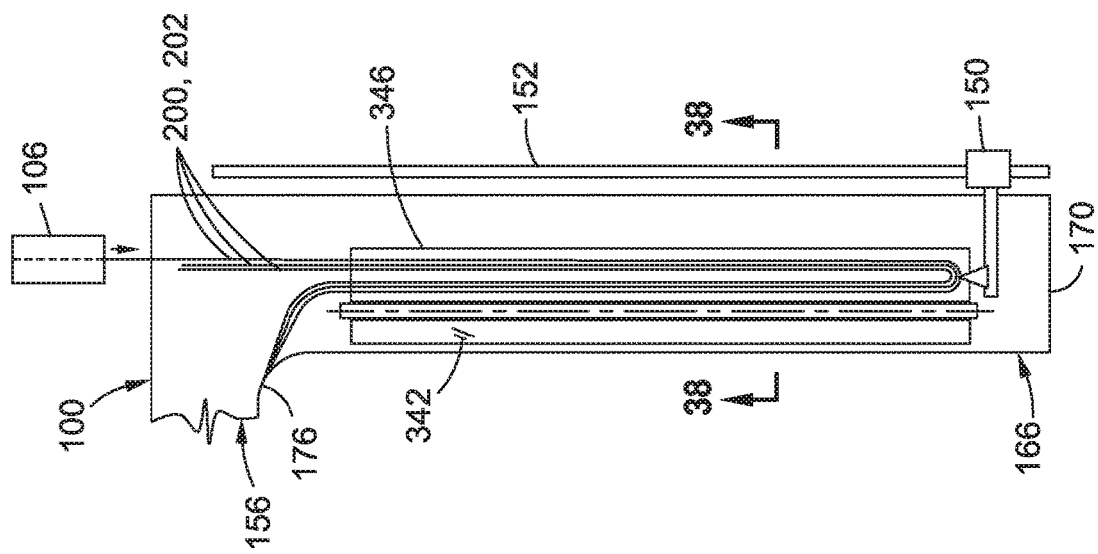
FIG. 37 is a top view of the long-wire supporting tray showing an example of a conveyor system for separating different wire groups.

FIG. 37 is a top view of a long-wire supporting tray 166 having a plurality of separator devices 320 each configured as a vertical conveyor system 342 for separating different wire groups. FIG. 38 is a sectional view of the long-wire supporting tray 166 showing a plurality of baskets 346 pivotably coupled to and vertically movable on the conveyor belt 344 of the vertical conveyor system 342. In the example shown, the conveyor system may extend along a lengthwise direction 168 of the long-wire supporting tray 166 and may be mounted to one side of the long-wire supporting tray 166. The vertical conveyor system 342 may include a plurality of baskets 346 pivotably coupled to a vertically-oriented conveyor belt 344. The conveyor belt 344 may be supported by upper and lower pulleys which may by mounted to the long-wire supporting tray 166 by a support fixture (not shown). In the example shown, the vertical conveyor system 342 includes at least a first basket 348 and a second basket 350 mounted in spaced relation to one another on the conveyor belt 344.

In the example of FIGS. 37-38, the vertical conveyor system 342 may be operated in a pulsing manner in coordination with the operation of the loop puller mechanism 150. For example, the vertical conveyor system 342 may position a first basket 348 at an uppermost position on the conveyor belt 344 in coordination with the sequential feeding or drawing by the loop puller mechanism 150 of one or more first wires 200 from the wire feeder system in a manner allowing the first basket 348 to receive the one or more first wires 200 as such wires are pulled to length and then released by the loop puller mechanism 150. The second basket 350 may then be rotated into the uppermost position (e.g., directly above the first basket 348) in coordination with the sequential feeding or drawing by the loop puller mechanism 150 of one or more second wires 204 from the wire feeder system in a manner allowing the second basket 350 to receive the second wires 204 as released by the loop puller mechanism 150. Each wire may be at least partially supported in a corresponding basket while the wire end 218 is processed in the above-described manner using the wire processing modules 110. The baskets 346 advantageously separate the wire groups during wire processing and thereby minimize wire entanglement between the wires of different wire groups.

Figure 39:
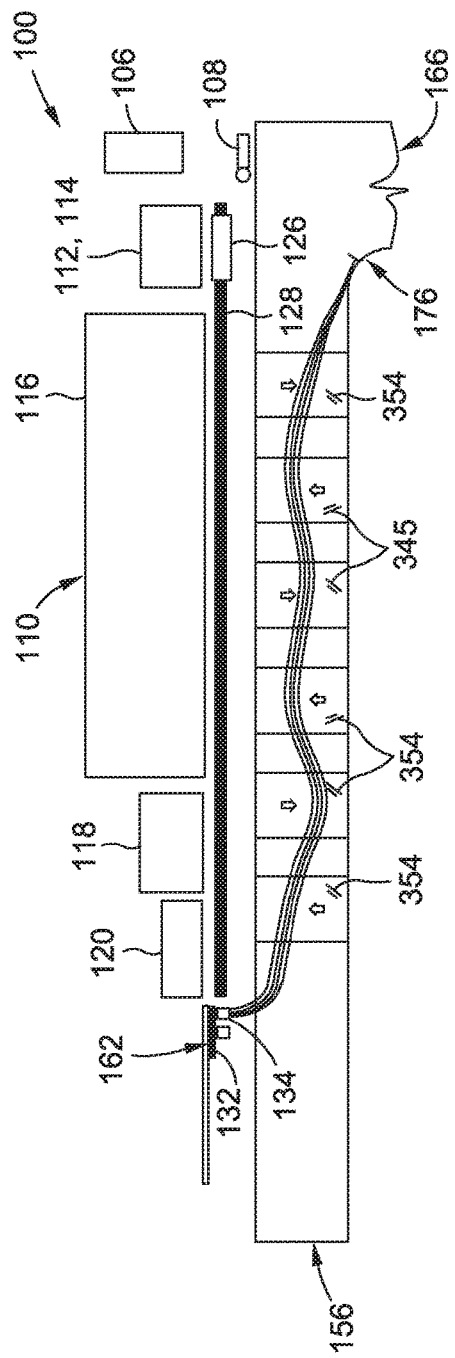
FIG. 39 is a top view of an example of a wire processing tray having a plurality of counter-opposing ramps arranged in series and oriented in alternating opposing angled relation toward one another for aligning wire groups and providing a predictable path for the wires.
Figure 40:
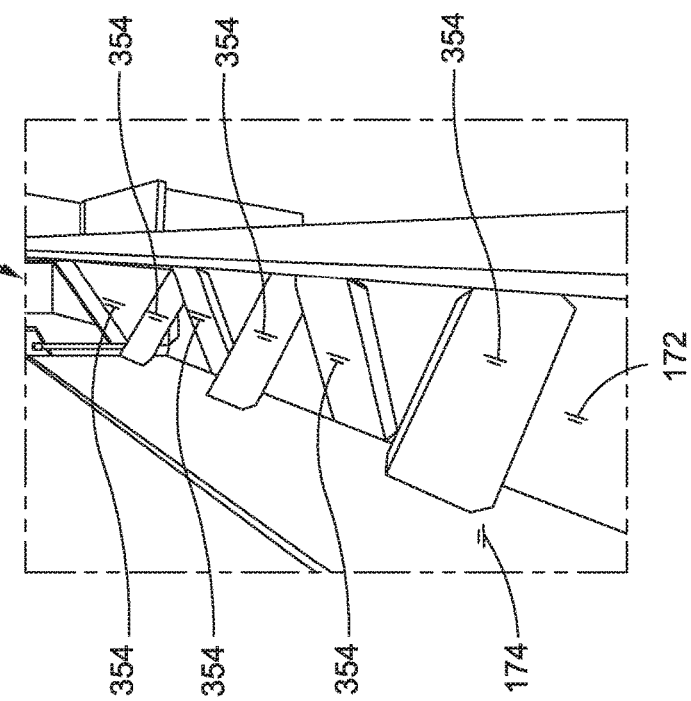
FIG. 40 is a perspective view of an example of a wire processing tray having a plurality of counter-opposing ramps.

FIG. 39 is a top view of an example of a wire processing tray 156 having a plurality of counter-opposing ramps 354 for aligning together the wires in a wire group. Although shown installed in the wire processing tray 156, ramps 354 may alternatively or additionally be installed in the long-wire supporting tray 166. FIG. 40 is a perspective view of a plurality of the counter-opposing ramps 354 mounted in the wire processing tray 156. In the example shown, the ramps 354 are arranged in series and are oriented in alternating and opposing angled relation toward one another. The angle orientation of each ramp 354 advantageously causes the portion of the wires supported on each ramp 354 to slide downward under the force of gravity toward a lower portion of the ramp 354. In this manner, gravity pulls the wires of a wire group together at the location of each ramp 354, and which results in a predictable path for the wires in a wire group. The predictable path for the wires advantageously promotes parallelism among the wires and thereby minimizes wire entanglement between the wires of a wire group.

FIG. 41 is a top view of an example of a wire processing machine 102 having separator devices 320 configured as wire clamping systems 358 for maintaining separation between wires and/or wire groups during wire processing and/or wire bundle removal. Although two (2) relatively short wire clamping systems 358 are shown installed at spaced intervals in the wire processing tray 156 and a relatively long wire clamping system 358 is shown installed in the long-wire supporting tray 166, wire clamping systems 358 of any length may be installed in any one of the trays. Furthermore, wire clamping systems 358 may be omitted from either tray. In some examples, the long-wire supporting tray 166 and/or the wire processing tray 156 may include a single wire clamping system 358 that extends along any portion of the length of the tray. For example, a single wire clamping system 358 may extend along a majority of the lengthwise direction of the wire processing tray 156, as shown in FIG. 41. One or more wire clamping systems 358 may be associated with any portion of a tray. For example, one or more wire clamping systems 358 may be supported on yet unfastened to a tray. In other examples, one or more wire clamping systems 358 may be mounted to, mechanically fastened to, and/or otherwise attached to a tray. Although shown positioned adjacent to one of the tray sides, the one or more wire clamping systems 358 may be positioned at any one or more locations on the tray In an embodiment, a wire clamping system 358 may include a plurality of clamping members 362 movable between a clamping position 382 and an open position 384. In one example, clamping members 362 in the open position 384 receive the first wires 200 and the second wires 204 from the wire feed system 106. In the clamping position 382, the clamping members 362 clamp together the one or more first wires 200 of the first wire group 202, and separately clamp together the one or more second wires 204 of the second wire group 206. In some examples described below, the clamping members 362 are pivotable about a pivot axis (e.g., FIGS. 41-63). In other examples also described below, the clamping members 362 are translatable (e.g., FIGS. 64-74). In this regard, clamping members 362 may be movable in any one a variety of different manners to separately clamp together the wires of different wire groups as a means to limit, reduce, or prevent movement of one or more wire groups during movement of another wire group such as during removal of a completed wire group (e.g., a wire bundle—see FIGS. 17-19) from the wire processing machine, as described in greater detail below.

A clamping member 362 may be configured as an elongate clamping bar 374 (not shown), as a generally planar clamping panel 372 (e.g., see FIGS. 51-54), or in other shapes. In the present disclosure, a clamping bar 374 may have a length (e.g., measured parallel to the pivot axis) to width (e.g., measured orthogonal to the pivot axis) aspect ratio of 1 or greater. A clamping panel 372 may have a length-to-width aspect ratio of less than 1. The long-wire supporting tray 166 and/or wire processing tray 156 may include one or more wire clamping systems 358 that may be mounted to the bottom and/or side wall of the tray.

Each one of the clamping members 362 in a wire clamping system 358 is movable between an open position 384 and a clamping position 382. In one example, one or more of the clamping members 362 may be manually moved between the open and clamping positions 382, 384. In other examples, one or more clamping members 362 may be moved between the open and clamping positions 382, 384 using automated means such as an electromechanical actuator (not shown) or other non-manual actuating means. In the open position 384, a clamping member 362 allows for unobstructed placement (e.g., using a loop puller mechanism) of a wire group on top of the tray surface or on top of another clamping member 362 (e.g., FIGS. 43 and 45). In the clamping position 382, a clamping member 362 clamps the wire group against the tray surface or against another clamping member 362 (e.g., FIGS. 44 and 46). In a further embodiment, one or more of the clamping members 362 may be mechanically biased (e.g., via a spring-loaded mechanism—not shown) toward the clamping position 382 such that the clamping members 362 clamp the corresponding wire groups in position.

FIG. 42 is a sectional view of an example of a wire clamping system 358 installed in the long-wire supporting tray 166 of FIG. 41 and illustrating three (3) clamping members 362 in the clamping position 382 for physically separating four (4) different wire groups including a first wire group 202, a second wire group 206, a third wire group 210, and a fourth wire group 214. However, a wire clamping system 358 may include any number of clamping members including a single clamping member. In the example shown, each one of the clamping members 362 is pivotable about an individual pivot axis. However, in other examples (FIGS. 50-63), the clamping members 362 of a wire clamping system 358 may be pivotable about a common pivot axis. In FIG. 42, each clamping member 362 has an upper surface 376 and a lower surface 378. In some examples, the upper surface 376 and the lower surface 378 of each clamping member 362 may be substantially parallel (e.g., within 20 degrees) to one another and/or to the upper surface 376 and/or the lower surface 378 of the remaining clamping members 362 in the wire clamping system 358 when the clamping members 362 are in the clamping position 382.

Figure 46:
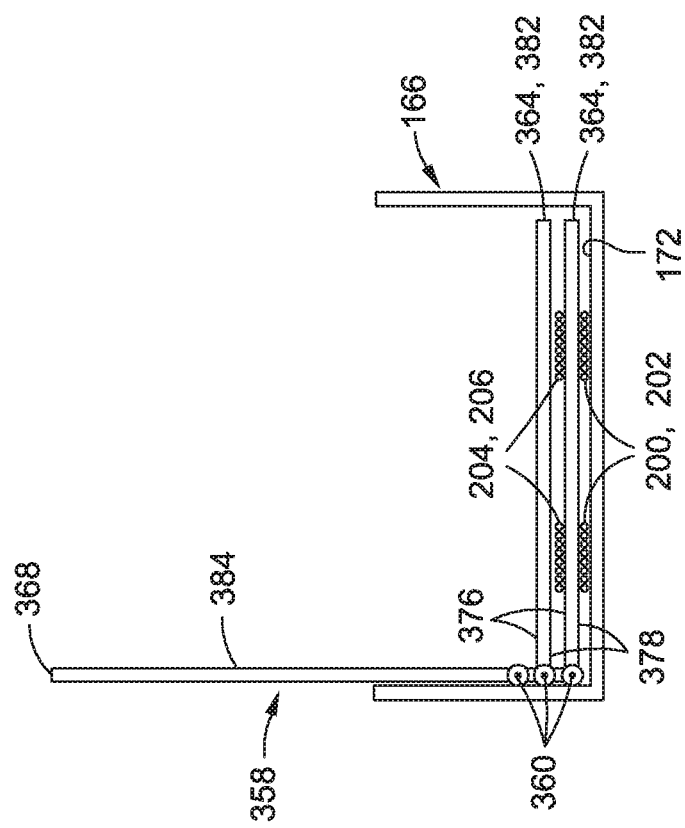

When in the clamping position 382, the clamping members 362 may be configured to accommodate the thickness of a wire group to be clamped. For example, referring to FIG. 44, when the first clamping member 364 is in the clamping position 382, a spacing between the tray surface and the lower surface 378 of the clamping member 364 may be substantially equivalent (e.g., ±0.20 inch) to the thickness or thickness range of the first wire group 202 such that the lower surface 378 of the first clamping member 364 is substantially (e.g., within 20 degrees) parallel to the tray bottom surface 172. Likewise, when the second clamping member 366 is in the clamping position 382 as shown in FIG. 46, the spacing between the lower surface 378 of the second clamping member 366 and the upper surface 376 of the first clamping member 364 may be substantially (e.g., up to 0.10 inch) equivalent to the thickness of the second wire group 206 such that the lower surface 378 of the second clamping member 366 is substantially parallel to the upper surface 376 of the first clamping member 364. The remaining clamping members of a wire clamping system 358 may be similarly configured to provide a spacing that accommodates the thickness or thickness range of the corresponding wire groups.

FIGS. 43-49 are sectional views of the wire clamping system 358 of FIG. 42 illustrating a sequence of operation of the clamping members 362 for clamping different wire groups. In any one of the examples disclosed herein, a wire clamping system 358 may be communicatively coupled to the wire feed system 106. A wire clamping system 358 may receive control signals from the wire feed system 106 for controlling the automated pivoting of the appropriate clamping member 362 between the open position 384 and the clamping position 382 in correspondence with the processing of the wires in the wire groups and/or in correspondence with the removal of the wire groups from the wire processing machine 102.

FIG. 43 illustrates all of the clamping members 362 in an open position 384. In the example shown, all of the clamping members 362 are oriented in an approximate vertical orientation. However, the open position 384 is not limited to a vertical orientation, and may be any orientation that allows for the wires of a wire group to be sequentially released or dropped (e.g., by the loop puller mechanism 150) into position onto the tray surface and/or onto a clamping member 362 in the clamping position 382. In FIG. 43, the wire lengths 216 on opposing sides of the wire loop 222 of the first wire group 202 are shown in cross section laying on the tray bottom surface 172 after the wire ends 218 of the first wires 200 have been processed by the wire processing modules 110 and inserted into the first connector 134.

Figure 45:
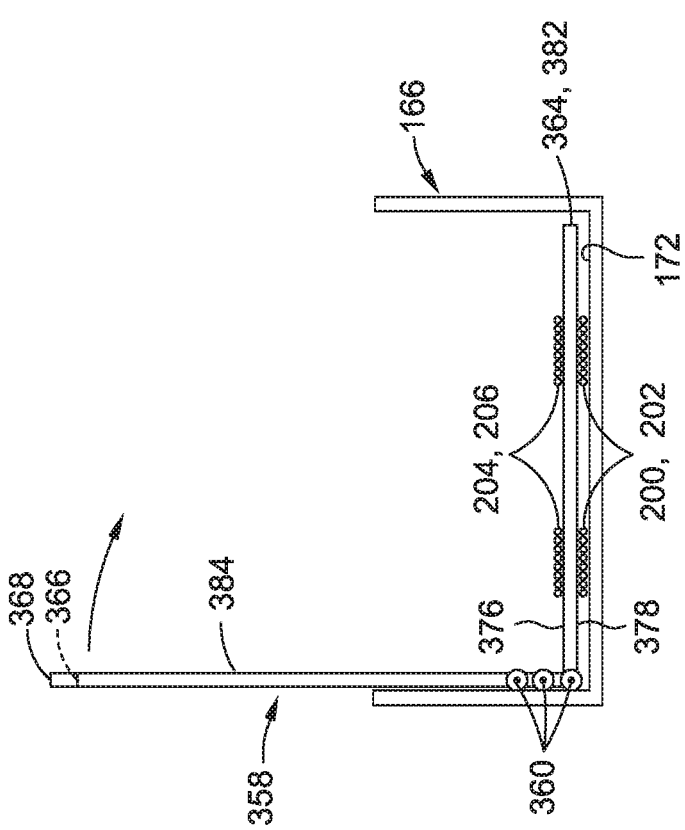

FIG. 44 illustrates a first clamping member 364 pivoted downwardly from the open position 384 to the clamping position 382 (e.g., an approximately horizontal orientation). The first clamping member 364 clamps the first wire group 202 against the tray bottom surface 172. The first clamping member 364 firmly holds the first wires 200 in position while simultaneously providing a barrier for the second wires 204 to be laid over the first clamping member 364. FIG. 45 illustrates the second wires 204 of a second wire group 206 laid over the top of the first clamping member 364. The wire processing modules 110 may process the wire ends 218 of the second wire group 206 with the first clamping member 364 in the open position 384. FIG. 46 illustrates a second clamping member 366 pivoted downwardly from the open position 384 to a clamping position 382 on top of the second wires 204 of the second wire group 206. As indicated above with regard to the first clamping member 364, the second clamping member 366 holds the second wires 204 in position while simultaneously providing a barrier for the third wires 208 to be laid over the second clamping member 366.

FIG. 47 illustrates the third wires 208 of a third wire group 210 laid over the top of the second clamping member 366 while the wire ends 218 of the third wires 208 are processed by the wire processing modules 110. FIG. 48 illustrates a third clamping member 368 pivoted downwardly from the open position 384 to the clamping position 382 on top of the third wire group 210 to provide a barrier for the fourth wires 212 to be laid on top of the third clamping member 368. FIG. 49 illustrates the fourth wire group 214 laid up over the top of the third clamping member 368. Although FIGS. 42-49 illustrate four (4) different wire groups and three (3) different clamping members 362, a wire clamping system 358 may include any number of clamping members 362 including a single clamping member 362. In the example of FIG. 42-49, the full complement of first wires 200 of the first wire group 202 are laid (e.g., via the loop puller mechanism) on the tray bottom surface 172 after which the first clamping member 364 is pivotably lowered from the open position 384 to the clamping position 382 on top of the first wire group 202, followed by laying of the full complement of second wires 204 on top of the first clamping member 364 after which the second clamping member 366 is pivotably lowered from the open position 384 to the clamping position 382 on top of the second wire group 206. The process may continue until all wire groups are laid down.

As described in greater detail below, when a connector pallet 132 is to be moved from the connector insertion position 162 (FIG. 15) to the connector unloading position 164 (FIG. 16), the clamping members 362 may be slightly loosened (e.g., pivoted slightly upwardly) from the clamping position 382 by a minimum amount necessary to release clamping pressure on the wire groups. The loosened clamping members 362 allow the wire groups to slide while the clamping members 362 maintain physical separation of the wire groups at least at the location of the clamping members 362. After a connector pallet 132 is moved from the connector insertion position 162 to the connector unloading position 164, the clamping members 362 may be tightened again (e.g., clamped) to prevent movement of the wire groups. Once the connector pallet 132 is in the connector unloading position 164, the last connector that was processed (e.g., the connector whose wires are laying on top of the uppermost clamping member) may be removed from the connector pallet 132 and the wires (e.g., the fourth wire group 214 in FIG. 49) may be pulled out of the wire processing tray 156 (FIGS. 18-19). The uppermost clamping member (e.g., the fourth clamping member 370 in FIG. 49) may then be moved from the clamping position 382 to the open position 384 to allow for removal of the wire group laying on top of the now-uppermost clamping member (e.g., the third wire group 210 in FIG. 49) from the wire processing tray 156 along with removal of the associated connector from the connector pallet 132. The wire removal process may be performed in the above-described first-in/last-out manner until all of the connectors are removed from the connector pallet 132 and the wire groups are pulled from the trays.

FIG. 50 is perspective of an example configuration of a wire clamping system 358 wherein each one of the clamping members 362 is configured as a clamping panel 372. The clamping panels 372 are arranged in a stacked configuration 386. The clamping members 362 may be pivotable about a common pivot pin 360 between an open position 384 and a clamping position 382. As indicated above, the clamping members 362 may be configured such that in the clamping position 382, the upper surfaces 376 and lower surfaces 378 of the clamping members 362 are substantially parallel with one another and parallel to the tray surface.

FIG. 51 is a sectional view of a clamping member 362 having an elastomeric material 380 applied to a lower surface 378 of the clamping member 362. In any one of the wire clamping systems 358 disclosed herein, the clamping members 362 (e.g., clamping bars 374 or clamping panels 372) may be formed of a relatively hard material such as metallic material (e.g., aluminum) or a polymeric material (e.g., moldable plastic material). As a means to prevent damage to the insulation layer covering the wire core and/or to prevent damage to the core and/or to accommodate differences in the thicknesses of wire groups, the upper surface 376 and/or the lower surface 378 of at least one of the clamping members 362 may be covered with a resiliently compliant elastomeric material 380. The elastomeric material 380 may be any relatively soft composition including, but not limited to, rubber, foam, and any other resiliently compliant material capable of providing cushioning for the wires being clamped. In still further examples, one or more of the clamping members 362 may include force feedback for limiting the amount of clamping force exerted on the wires in order to avoid damage to the wires when clamped by the clamping members 362.

Figure 52:
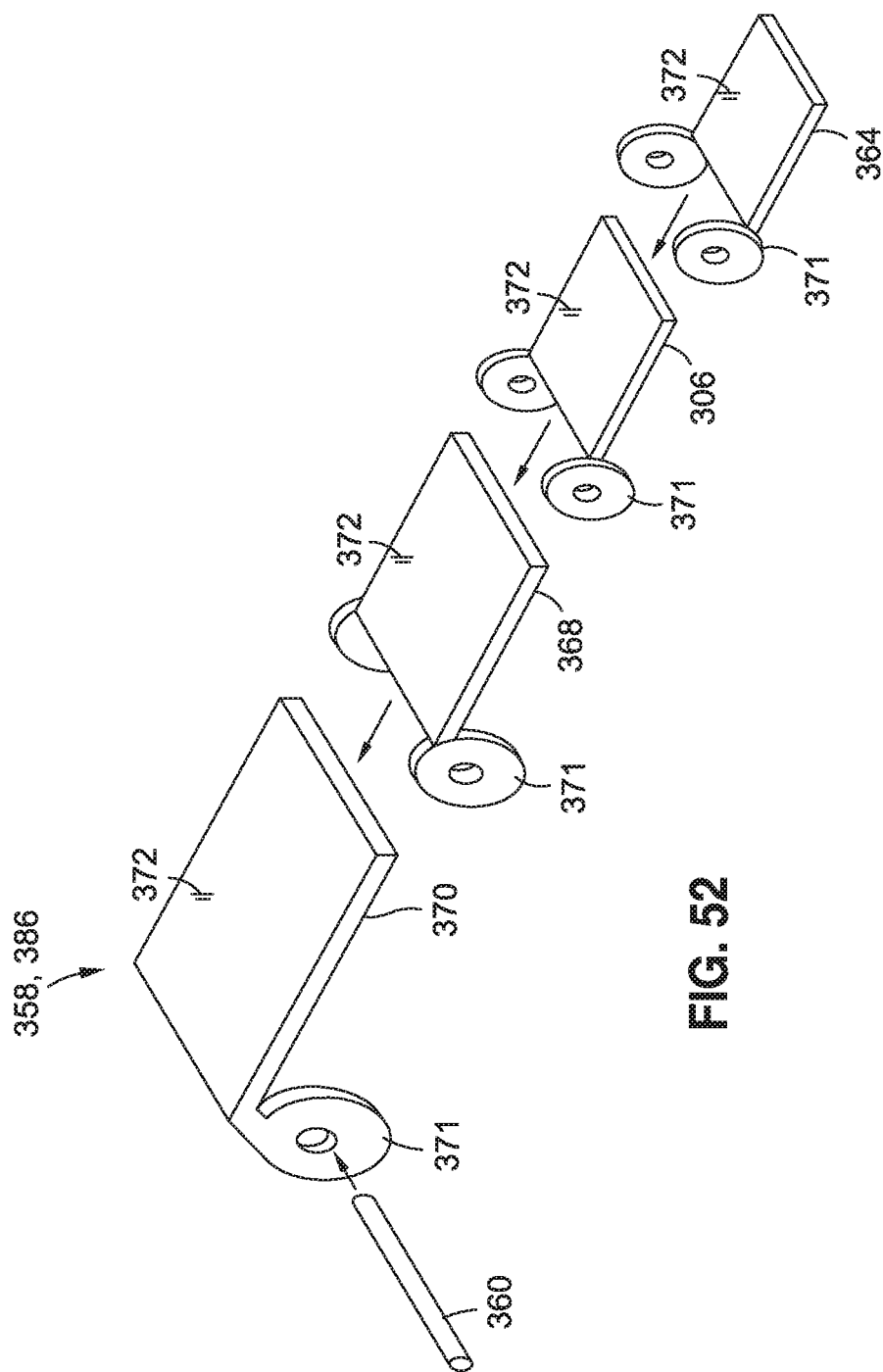
FIG. 52 is an exploded perspective view of an example of a plurality of clamping panels in the stacked configuration.

FIG. 52 is an exploded perspective view of an example of a wire clamping system 358 showing a plurality of clamping panels 372. The clamping members 362 are arranged in a stacked configuration 386 such that the clamping members 362 are axially aligned with one another. Each one of the clamping panels 372 may include ears 371 mounted on opposite ends of the clamping panel 372. The ears 371 of the stacked clamping panels 372 may be sized and configured to be pivotably coupled together by a common pivot pin 360 extending through the ears 371.

Figure 53:
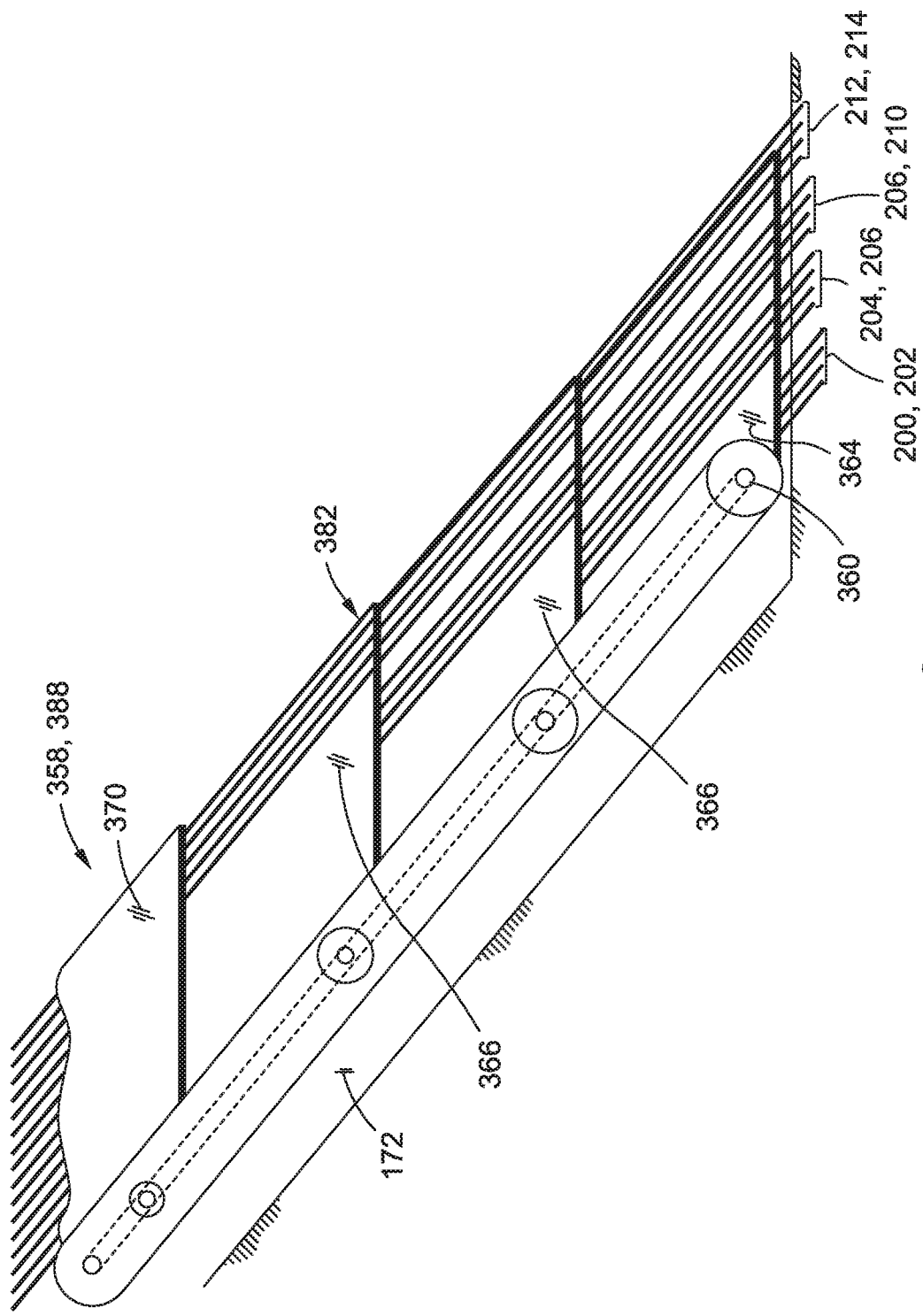
FIG. 53 is a perspective view of an example of a wire clamping system having a plurality of clamping panels arranged in an offset configuration.

FIG. 53 is a perspective view of an example of a wire clamping system 358 having an offset configuration 388 of clamping panels 372 including a first, second, and third, and fourth clamping panel. Also shown are a plurality of wire groups including a first, second, third, and fourth wire group 202, 206, 210, 214 and which are physically separated by the first, second, third, and fourth clamping panels 372 in a manner similar to the separation of wire groups shown in FIG. 50. In one embodiment of the offset configuration 388, at least a portion of one or more of each of the clamping panels 372 may be axially offset with one another. For example, the axially forward edge of one clamping panel 372 may be axially aligned with the axially aft edge of an immediately adjacent clamping panel 372 (e.g., FIG. 53). In another embodiment of the offset configuration 388 not shown, a portion of one clamping panel 372 may overlap a portion of an immediately adjacent clamping panel 372.

Figure 54:
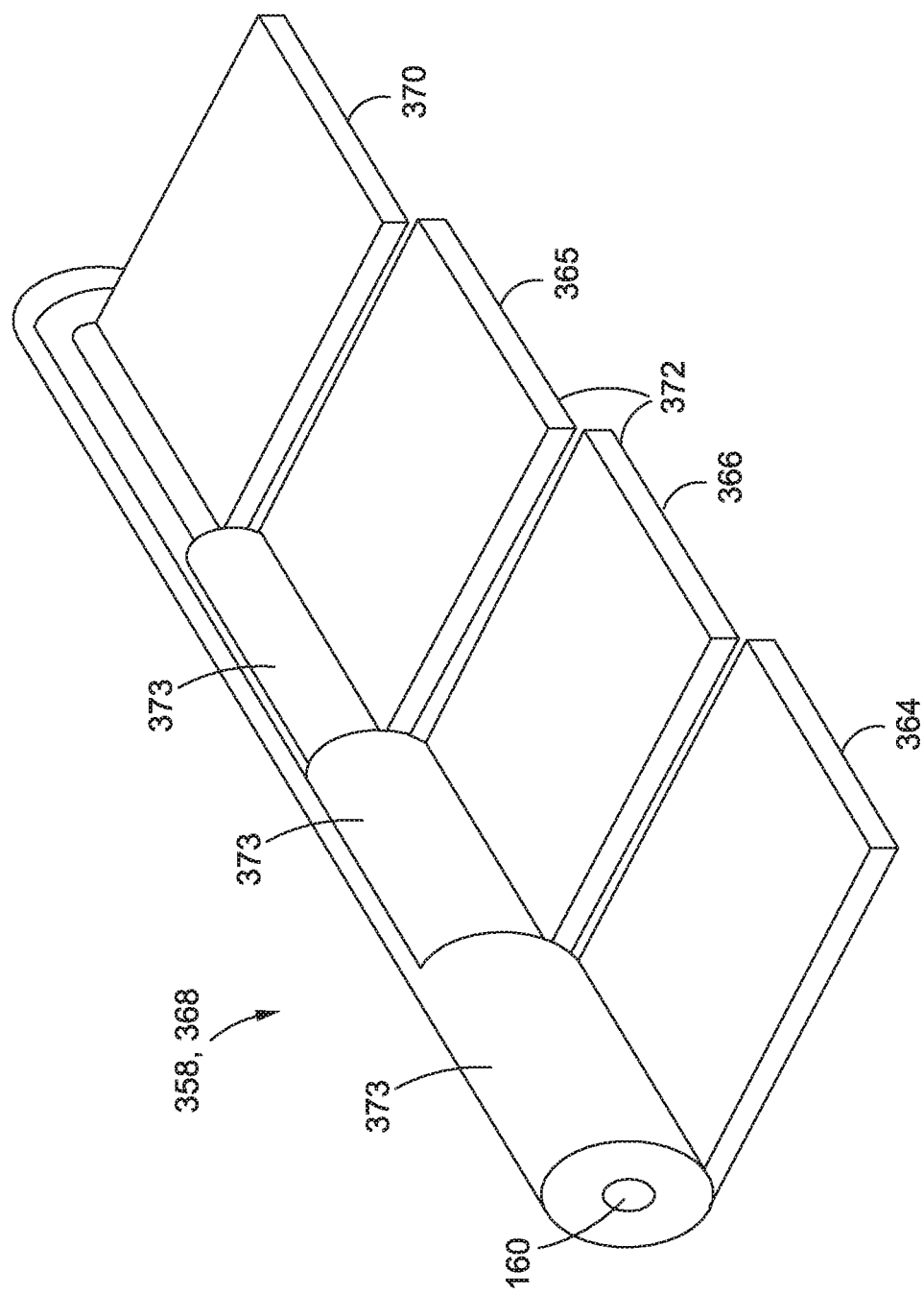
FIG. 54 is a perspective view of an examples of a plurality of nested clamping panels in the offset configuration.

FIG. 54 is a perspective view of an example of the construction of a wire clamping system 358 in the offset configuration 388 showing a plurality of clamping panels 372. In the example shown, the clamping panels 372 may each include a cylindrical hinge portion 373. The cylindrical hinge portions 373 of the clamping panels 372 may be nested with one another and may be pivotably coupled together by a common pivot pin 360 extending through the hinge portions 373. As may be appreciated, the wire processing machine 102 may be provided with one or more wire clamping systems 358 having any one of a variety of different sizes, shapes, and configurations, and are not limited to the above-described examples of the wire clamping systems 358 illustrated in the figures. The wire clamping system 358 shown in FIG. 55 may be positioned at any one or more locations along one or more trays of a wire processing machine.

Figure 55:
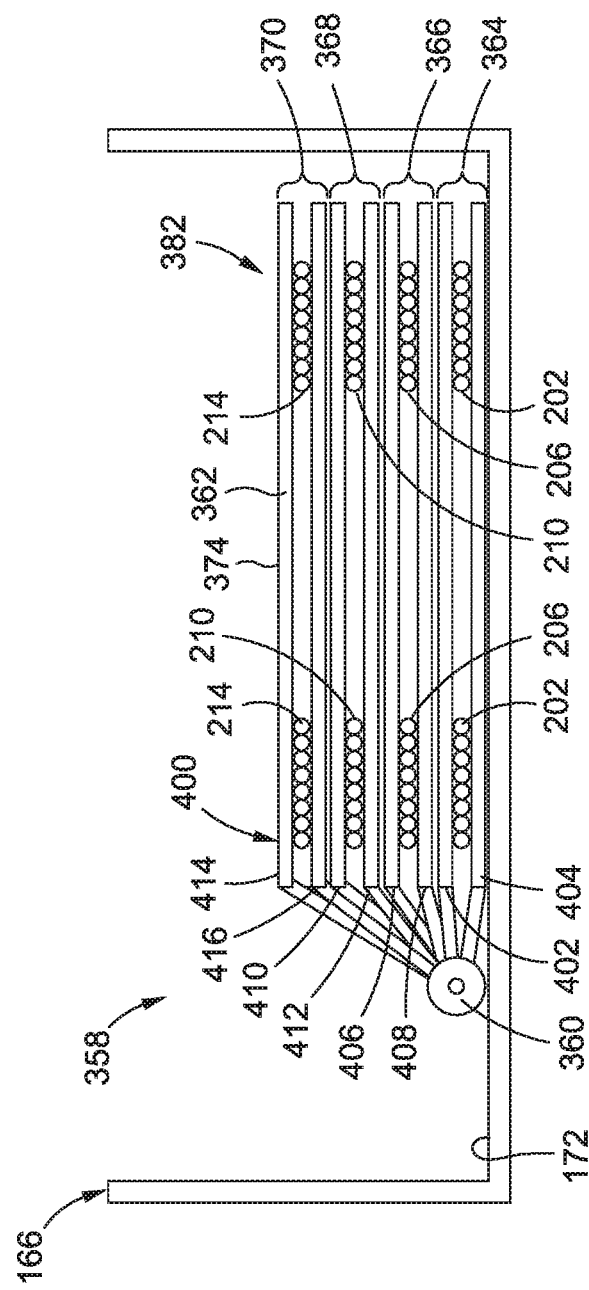
FIG. 55 is a sectional view of an alternative embodiment of a wire clamping system having a plurality of clamping members each having a two-arm configuration.

FIG. 55 is a sectional view of an alternative embodiment of a wire clamping system 358 having a plurality of clamping members 362 each having a two-arm configuration 400 including a top arm and a bottom arm. For example, the first clamping member 364 may include a first top arm 402 and a first bottom arm 404. The second clamping member 366 may include a second top arm 406 and a second bottom arm 408. The third clamping member 368 may include a third top arm 410 and a third bottom arm 412. The fourth clamping member 370 may include a fourth top arm 414 and a fourth bottom arm 416. Each one of the clamping arms may be pivotable about a pivot pin 360. Although FIG. 55 shows a common pivot pin 360 for the top and bottom arms of the clamping members, a wire clamping system 358 may include separate pivot pins (not shown) for each one of the clamping members. The clamping members shown in FIG. 55 may be provided in a stacked configuration 386 or an offset configuration 388 in a manner similar to the configurations described above with regard to FIGS. 42-54. The top arm and the bottom arm of each clamping member may be independently pivotable between the clamping position 382 and the open position 384. The first clamping member 364 in the clamping position 382 may clamp the first wire group 202 between the first top arm 402 and the first bottom arm 404. The second clamping member 366 in the clamping position 382 may clamp the second wire group 206 between the second top arm 406 and the second bottom arm 408, and so on as described below.

Figure 56:
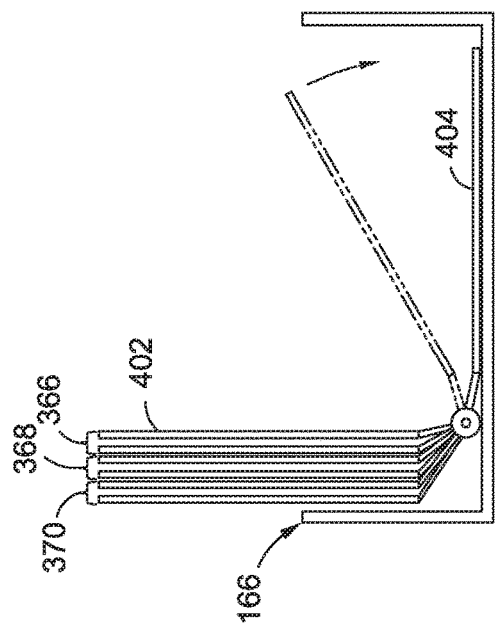
Figure 57:
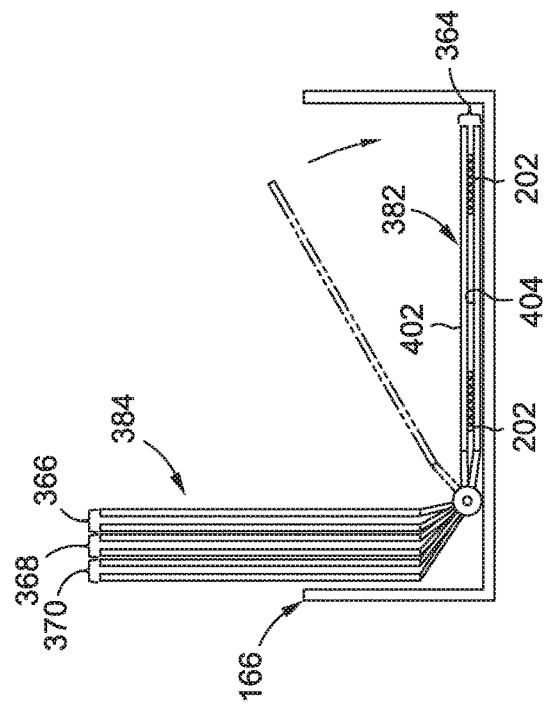
Figure 58:
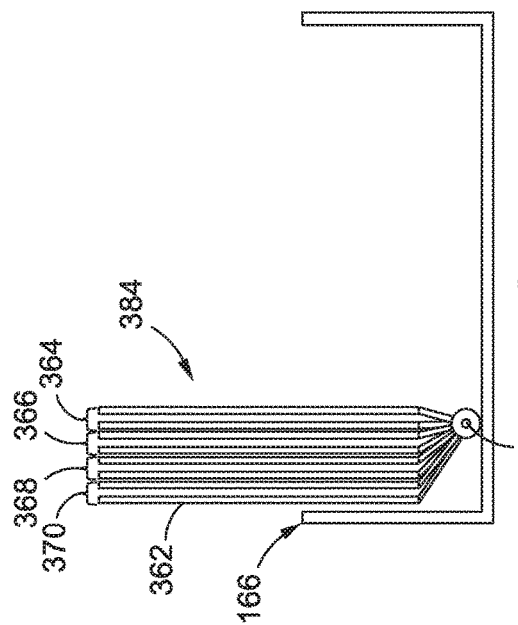
Figure 59:
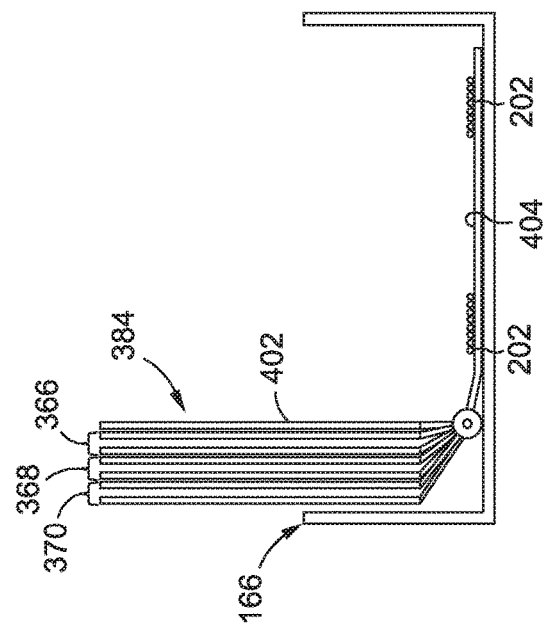

FIGS. 56-62 are sectional views of a wire clamping system 358 illustrating a sequence of steps of a process of sequentially clamping wire groups between top and bottom arms of two-arm configuration 400 clamping members. FIG. 56 illustrates the first, second, third, and fourth clamping members 364, 366, 368, 370 in the open position 384. Although shown as being generally vertically oriented, the clamping members in the open position 384 may assume any orientation including a non-vertical orientation. Preferably, the clamping members in the open position 384 avoid interfering with the automated placement of the wire groups by a loop puller mechanism 150. FIG. 57 illustrates the pivoting of the first bottom arm 404 from the open position 384 to the clamping position 382 wherein the first bottom arm 404 may rest on the tray bottom surface. FIG. 58 illustrates one or more first wires of the first wire group 202 laid on top of the first bottom arm 404. FIG. 59 illustrates the pivoting of the first top arm 402 from the open position 384 to the clamping position 382 such that the first wire group 202 is clamped between the first top arm 402 and the first bottom arm 404.

FIG. 60 illustrates the pivoting of the second bottom arm 408 from the open position 384 to the clamping position 382 wherein the second bottom arm or may rest on top of the first top arm 402. FIG. 61 illustrates one or more second wires of the second wire group 206 laid on top of the second bottom arm 408. FIG. 62 illustrates the pivoting of the second top arm 406 from the open position 384 to the clamping position 382 such that the second wire group 206 is clamped between the second top arm 406 and the second bottom arm 408. A similar process continues for the third top and bottom arms 410, 412 of the third clamping member 368 and the fourth top and bottom arms 414, 416 of the fourth clamping member 370 to respectively clamp the third wire group 210 and the fourth wire group 214. The top and bottom arms of the clamping members may be sized and configured to accommodate the thickness of the respective wire groups to be clamped, similar to the above-described arrangement for the wire clamping system 358 shown in FIGS. 42-51, and may optionally include an elastomeric material for protection of the wires during clamping.

For a wire processing system 100 having multiple wire clamping systems 358 installed in one or more of the trays, the individual clamping members of the different wire clamping systems 358 may be simultaneously actuated between the open position 384 to the clamping position 382 in a coordinated manner. Furthermore, as mentioned above with regard to the wire clamping system 358 example of FIGS. 42-49, the wire clamping system(s) 358 in FIGS. 55-63 may receive control signals from a control system (not shown) of the wire processing machine 102 for controlling the automated movement (e.g., pivoting) of the clamping member 362 between the open position 384 and the clamping position 382 in correspondence with the drawing of wire from the wire feed system 106, the laying of the wires of each wire group, and/or the removal of the wire groups from the wire processing machine 102.

FIG. 63 is a sectional view showing the independently pivotable nature of the clamping members of FIGS. 55-62. Advantageously, the independently pivotable nature of the top and bottom arms of each clamping member allows control over the order in which each wire group is removed from the wire clamping system 358, and is not limited to removal of the wire groups on a first-in/last-out basis. For example, after all the wire groups are clamped between the respective first, second, third, and fourth clamping members 364, 366, 368, 370 as shown in FIG. 55, removal of the first wire group 202 prior to removing the second wire group 206, third wire group 210 and fourth wire group 214 may be affected by first pivoting at least partially upwardly the second, third, and fourth clamping members 364, 366, 368, 370 to an extent allowing the first top arm 402 and first bottom arm 404 to be moved at least slightly apart to unclamp the first wire group 202 to thereby allow for movement and/or removal of the first wire group 202 from between the first top arm 402 and first bottom arm 404. Removal of any one wire group may be performed in a similar manner.

FIG. 64 is a top view of a further example of a wire clamping system 358 having linear actuators 420 installed in a tray of the wire processing machine 102 for vertically translating corresponding clamping members. Although a pair of wire clamping systems 358 are shown installed in the long-wire supporting tray 166, one or more of the wire clamping systems 358 may be installed in the long-wire supporting tray 166 and/or one or more of the wire clamping systems 358 may be installed in the wire processing tray. In the example shown, the wire clamping system 358 includes a first clamping member 364, a second clamping member 366, and a third clamping each being vertically translatable between any one of a variety of vertical positions including a clamping position 382 and an open position 384. The first, second, and third clamping member 368s in the respective open position 384 may respectively receive one or more first wires, one or more second wires, and one or more third wires from the wire feed system 106 (e.g., via the loop puller mechanism 150). In the clamping position 382, the first clamping member 364 and the second clamping member 366 may clamp the first wire group 202 therebetween. Likewise, the second clamping member 366 and the third clamping member 368 in the clamping position 382 may clamp the first wire group 202 therebetween. Although each wire clamping system 358 is shown having three independent linear actuators 420 for respectively vertically translating a first, second, and third clamping member 368, the wire clamping system 358 may include any number of linear actuators 420 and corresponding clamping members.

The linear actuators 420 of the wire clamping system 358 of FIG. 64 may be associated with any portion of a tray. For example, the linear actuators 420 may be supported on any location of a tray (e.g., and unfastened to a tray). In other examples, the linear actuators 420 may be mounted to, mechanically fastened to, and/or otherwise attached to a tray. In addition, although shown positioned adjacent to one of the tray sides, the linear actuators 420 may be positioned at any one or more locations of one or more trays.

FIG. 65 is a sectional view of the installation of the wire clamping system 358 of FIG. 64 located in the long-wire supporting tray 166 and showing the first, second, and third clamping members 364, 366, 368 vertically movable via the respective linear actuators 420. In the example shown, the linear actuators 420 may be configured to allow for vertical movement of the first, second, and third clamping members 364, 366, 368 to an extent that provides spacing between two of the clamping members to accommodate the loop puller mechanism 150 during movement along a lengthwise direction of the tray as the loop puller mechanism 150 sequentially draws wires from the wire feed system 106 and places the wire on a clamping member, as described below.

FIG. 66 is a side view of the wire clamping system 358 of FIG. 65 and illustrating the first, second, and third clamping members 364, 366, 368 respectively coupled to a linear actuator 420. Each one of the clamping members may be operatively coupled to a carriage of a dedicated linear actuator 420. The linear actuators 420 may be provided in any one a variety of different configurations including electromechanical, hydraulic, pneumatic, or any combination thereof. In addition, the linear actuators 420 may be located at any spacing relative to one another, are not limited to the spacing shown.

FIG. 67 is a perspective view of the wire clamping system 358 of FIG. 66 showing a first wire group 202 supported on the first clamping member 364 prior to being clamped between the first clamping member 364 and second clamping member 366. The first clamping member 364 and the third clamping member 368 may each have a Z shape. The second clamping member 366 is shown having a generally straight shape. Regardless of their particular configuration, the first, second, and third clamping members 364, 366, 368 may be configured such that at least a portion of the clamping members are vertically aligned to allow for clamping of wire groups between the first, second, and third clamping members 364, 366, 368.

Figure 68:
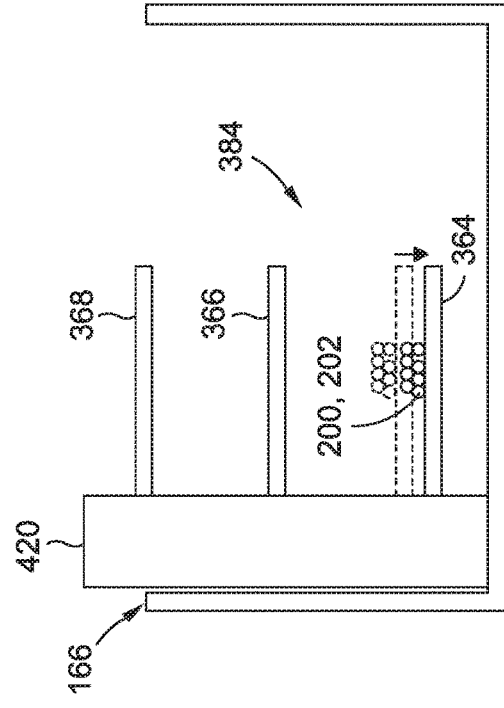
FIGS. 68-74 are sectional views of the wire clamping system of FIGS. 64-67 and illustrating a sequence of steps of sequentially clamping wire groups between the top and bottom arms of the clamping members.
Figure 69:
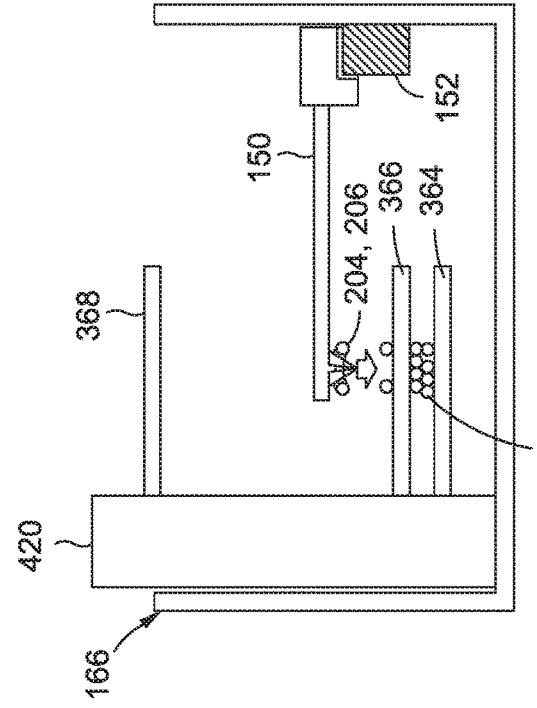
Figure 70:
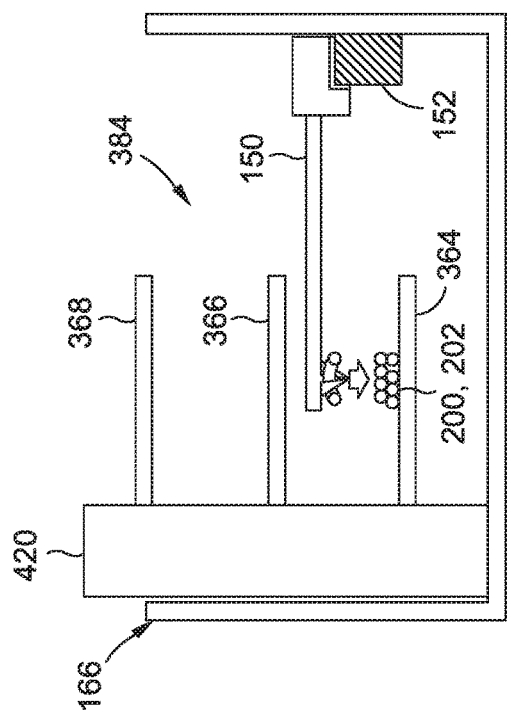
Figure 71:
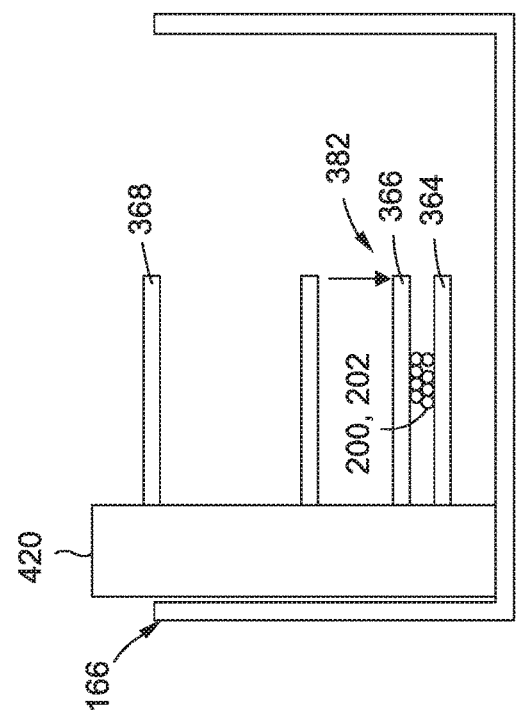
Figure 73:
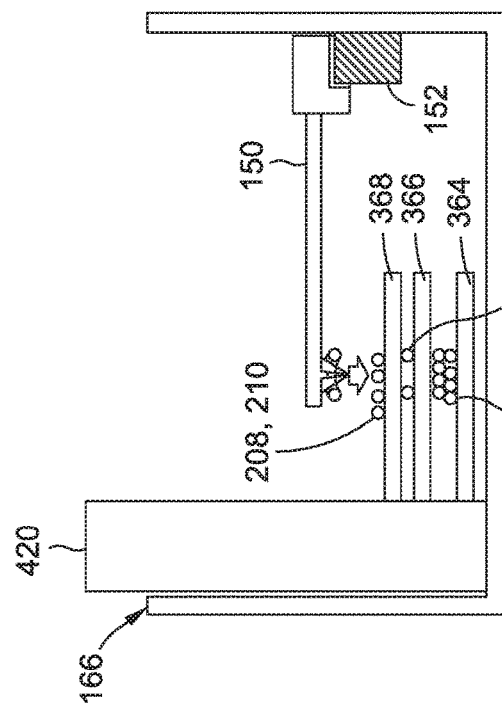

FIGS. 68-74 are sectional views of the wire clamping system 358 of FIGS. 64-67, and illustrating a sequence of steps for sequentially clamping wire groups between the clamping members. In FIG. 68, one or more first wires 200 of the first wire group 202 may be laid on top of the first clamping member 364 such as by using the loop puller mechanism 150. FIG. 69 illustrates actuation of the linear actuator 420 of the first clamping member 364 to vertically translate the first clamping member 364 downwardly by an amount such that the second clamping member 366 may then be vertically translated downwardly to the original position of the first clamping member 364 as shown in FIG. 70, and such that the first wire group 202 may be clamped between the first clamping member 364 and the second clamping member 366. FIG. 71 illustrates one or more second wires 204 of the second wire group 206 laid on top of the second clamping member 366 such as by using the loop puller mechanism 150.

Figure 72:
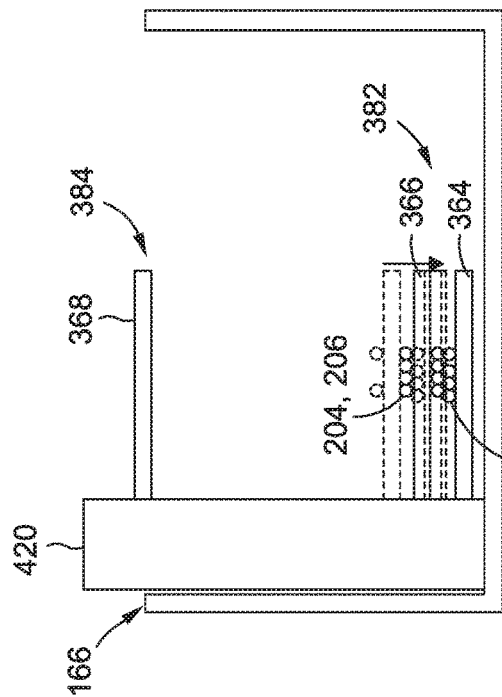
Figure 74:
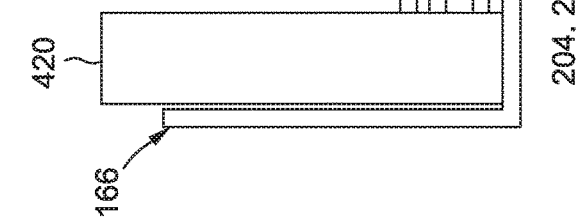

FIG. 72 illustrates actuation (e.g., simultaneous) of the linear actuators 420 of the first clamping member 364 and second clamping member 366 to vertically translate the first clamping member 364 and second clamping member 366 downwardly by an amount such that the third clamping member 368 is translated downwardly to the original position of the first clamping member 364, and such that the second wire group 206 may be clamped between the second clamping member 366 and third clamping member 368. Although not shown, any number of additional clamping members may be provided for clamping additional wire groups. Advantageously, the wire clamping system 358 of FIGS. 67-74 allows for clamping the wire groups in a manner preventing relative movement of the wire groups during wire processing, thereby minimizing wire entanglement. Wire groups may be removed from the wire clamping system 358 of FIG. 67-74 by vertically translating any one of the clamping members to unclamp a wire group to be removed, while clamping force on the remaining wire groups prevents movement of such remaining wire groups.

Figure 75:
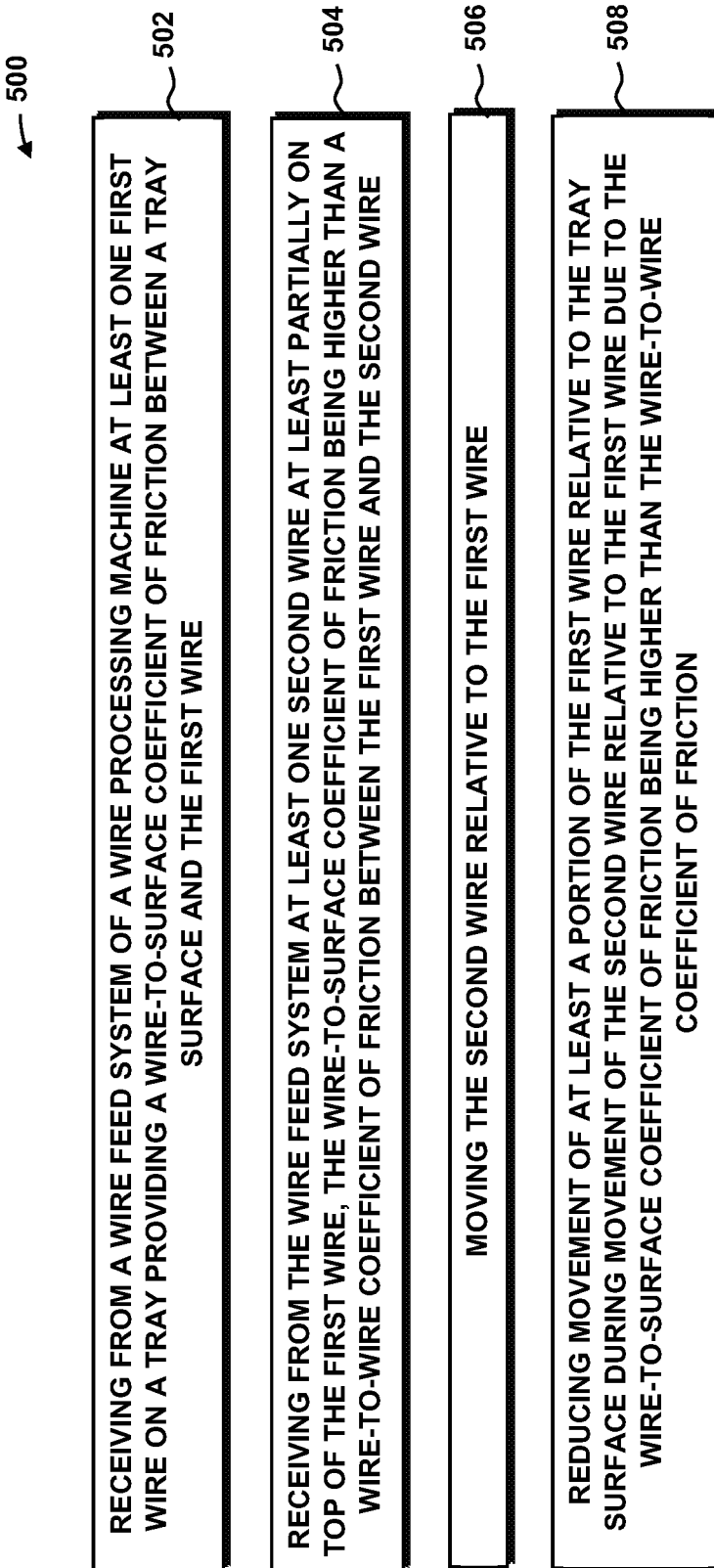
FIG. 75 is a flowchart having one or more operations that may be included in a method of reducing entanglement of wires such during processing on a wire processing machine by providing a wire-to-surface coefficient of friction between a tray surface and a first wire higher than a wire-to-wire coefficient of friction between the first wire and a second wire.

FIG. 75 is a flowchart having one or more operations that may be included in a method 500 of reducing entanglement of wires in a wire processing machine 102 through the use of friction. Step 502 of the method 500 includes receiving from a wire feed system 106 of a wire processing machine 102 at least one first wire 200 on a tray providing a wire-to-surface coefficient of friction between a tray surface and the first wire 200. For example, the above-described FIGS. 5-13 illustrate a single first wire 200 of the first wire group 202 being pulled to the appropriate length by a loop puller mechanism 150. In addition, the figures illustrate one of the wire ends 218 of the first wire 200 being processed by the wire processing modules 110 to crimp on an end fitting 220 and insert the end fitting 220 into a first connector 134 as shown in FIGS. 11-13 and described above.

Step 504 of the method 500 includes receiving from the wire feed system 106 at least one second wire 204 at least partially on top of the first wire 200 as shown in FIG. 15. The second wire 204 may be pulled to a predetermined length by the loop puller mechanism 150. Advantageously, in an embodiment, the wire processing machine 102 is configured to provide a wire-to-surface coefficient of friction between at least one tray surface and a first wire 200 higher than a wire-to-wire coefficient of friction between the first wire 200 and the second wire 204 laying on top of the first wire 200. As described above, one or more of the trays surfaces of the long-wire supporting tray 166 and/or the wire processing tray 156 may include a surface feature 300 to provide the relatively high wire-to-surface coefficient of friction. For example, as indicated above, the surface feature 300 may include a material layer 302 and/or a material coating 304 applied over one or more tray surfaces to provide a wire-to-surface coefficient of friction higher than the wire-to-wire coefficient of friction. The material layer 302 may include metal, rubber, plastic, foam, fabric, cloth impregnated with a rubber-based adhesive, or any type of material layer 302 applied to one or more tray surfaces and/or one or more separator devices. Alternatively or additionally, the surface feature 300 may comprise a material coating 304 such as material that is sprayed onto one or more tray surfaces and/or one or more separator devices.

In some examples, the surface feature 300 may comprise a surface texture 306 to provide a higher level of friction between the wire and tray relative to the friction between adjacent wires. For example, the surface texture 306 may comprise a pattern of surface features 310. In such examples, the step of receiving the wire on the tray may include contacting the first wire 200 at two discrete contact patches (FIG. 23) between the first wire 200 and an adjacent pair of the surface features 310 when the first wire 200 is viewed in cross-section. The surface texture 306 (e.g., the above-described surface features 310) may provide a higher level of friction which may utilize gravity to aid in straightening out the wires by tending to comb the wires and thereby promote linearity and parallelism in the wires.

Figure 76:
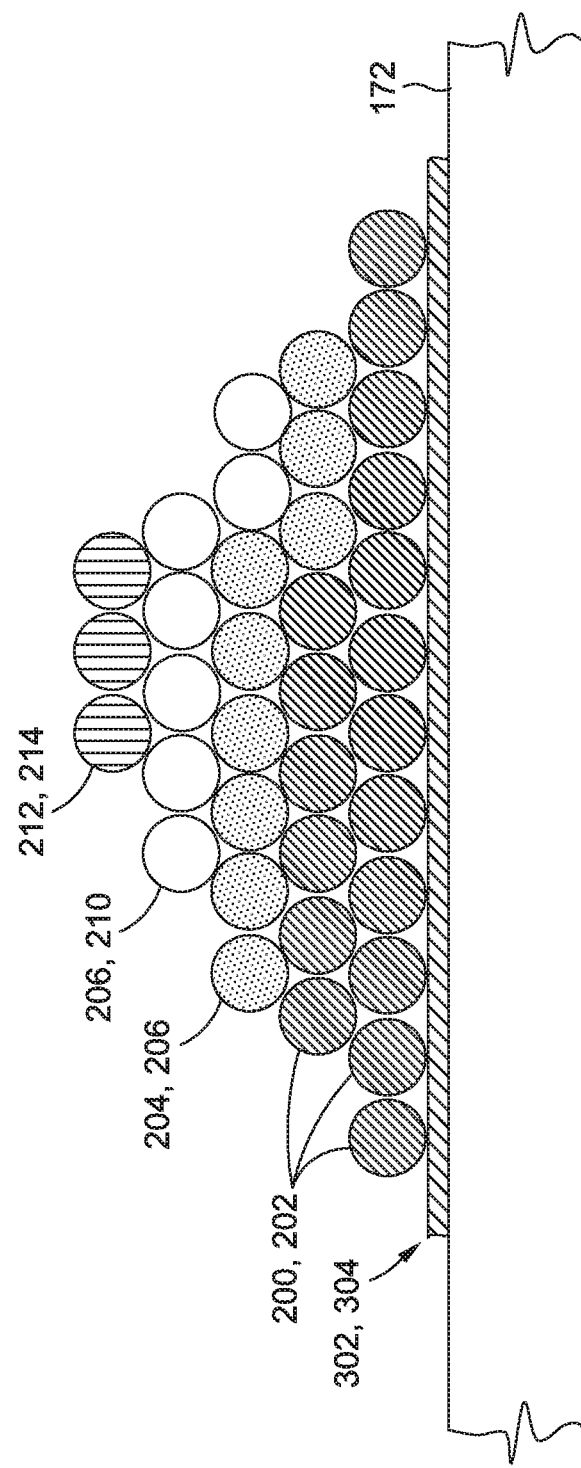
FIG. 76 is a sectional view of a plurality of wire groups stacked on top of one another with the largest wire group on the bottom of the stack and the smallest wire group on top of the stack.

Referring briefly to FIG. 76, shown is a sectional view of a plurality of wire groups including a first wire group 202 containing wires represented by 45°-angled-line fill pattern, a second wire group 206 containing wires represented by a dotted fill pattern, a third wire group 210 with no fill pattern, and a fourth wire group 214 containing wires represented by a vertical line fill pattern. When several different wire groups are processed, any one of the presently-disclosed methods may include stacking the wire groups starting with the largest wire group (e.g., the first wire group 202 in FIG. 76) and stacking progressively smaller wire groups toward the top of the stack with the smallest wire group (e.g., the fourth group in FIG. 76) preferably being the uppermost wire group of the stack, and unloading or removing such wire groups (e.g., the assembled wire bundles) from the wire processing machine 102 in reverse order (e.g., last-in/first-out basis). Stacking the wire groups in such manner keeps the larger wire groups on the bottom of the stack in frictional engagement with the tray bottom surface and with other relatively large wire groups. The relatively smaller wire groups will be on top of the stack and will be pulled off from the top. In the present disclosure, a relatively large wire group may be described as having a larger quantity of wires than the wires in other wire groups and/or containing wires having a relatively larger diameter than the wires in other wire groups.

Advantageously, processing wire groups such that the larger wire groups are at the bottom of the stack will provide a relatively larger frictional force between the large wire groups and the stationary tray bottom surface, and with other relatively large groups of wires that are not being pulled during wire processing and/or wire bundle removal. In this manner, such large wire groups are less likely to be pulled along by relatively small wire groups located adjacent to or at the top of the stack. Relatively large wire groups will have more surface area in contact with the tray surface and are thus less likely to move without bringing along all the wires of wire groups adjacent to such relatively large wire group. In this regard, processing the wire groups such that the relatively small wire groups are located adjacent to or at the top of the stack will reduce the likelihood of the smaller wire groups bringing along other wires from other wire groups due to the reduced amount of surface area of such small wire groups. In addition, relatively large diameter wires contained in relatively large wire groups will have greater mass and will therefore require a greater amount of pulling force 394 (FIG. 26) to break the static friction holding such large diameter wires in place on the tray bottom surface 172. In this regard, any one of the presently-disclosed methods may place such large diameter wires on the bottom of the stack due to the greater amount of pulling force 394 required to move such large diameter wires. Wires in relatively small wire groups may be pulled off the top of the stack and are thus less likely to entrain the larger diameter and therefore heavier wires below.

Step 506 of the method 500 includes moving the second wires 204 relative to the first wire 200. For example, after the second wires 204 have been inserted into the second connector 136, the connector pallet 132 is moved from the connector insertion position 162 to the connector unloading position 164. As shown in FIG. 18, the second connector 136 is removed from the connector pallet 132 and the second wires 204 are then pulled along a lengthwise direction relative to the first wires 200 as the second wires 204 are coiled into a wire coil 392 as shown in FIGS. 18-19.

Step 508 of the method 500 includes reducing movement of at least a portion of one or more of the first wires 200 relative to the tray surface during movement of one or more of the second wires 204 relative to the first wires 200 due to the wire-to-surface coefficient of friction being higher than the wire-to-wire coefficient of friction. In addition, the relatively high wire-to-surface coefficient of friction advantageously induces tension in each wire during wire movement and thereby promotes linearity and/or parallelism of the wires during movement, as shown in FIGS. 24-25. Furthermore, the relatively high wire-to-surface coefficient of friction aids in keeping the wires straight and more parallel to one another, thereby reducing cross-over of adjacent wires and minimizing wire entanglement.

In some examples, the method 500 may include physically separating at least portions (e.g., wire lengths 216) of the wires using a separator device 320 associated with (e.g., resting on or mechanically attached to) the tray. For example, referring to FIGS. 26-38, the method may include using at least one separator device 320 to separate a first wire 200 from a second wire 204 to minimize wire entanglement. In addition, the method may include using one or more separator devices 320 to keep the wire lengths 216 of the wires in the same wire group from coming into contact with one another. Furthermore, the method may include using a separator device 320 to separate the wire length 216 on one side of a separator device 320 from the wire length 216 on the opposite side of the separator device 320. The method of reducing wire entanglement using a relatively high wire-to-surface coefficient of friction may be implemented in combination with any one or more of the separator device embodiments disclosed herein.

In one example, the separator device 320 may be configured as a separator post extending upwardly (e.g., vertically on non-vertically) from the tray as shown in FIG. 28. In an embodiment, the separator post may be located at a tray end 170 of the long-wire supporting tray 166 opposite the tray end 170 that is located adjacent to the wire feeder system. However, one or more separator posts may be located at a position along the long-wire supporting tray 166. The step of physically separating the wire lengths 216 may include sequentially pulling (e.g., using a loop puller mechanism 150) a midpoint 154 of the first wire 200 and the second wire 204 from the wire feed system 106 while respectively holding the wire end 218 of the first wire 200 and the second wire 204 in fixed position. The method may additionally include wrapping the first wire and/or the second wire 180 degrees around a separator post such that at least the first wire 200 and/or the second wire 204 forms a wire loop 222 having a U-shape. The method may additionally include maintaining physical separation of the portions of wire lengths 216 of the first wire 200 on opposite sides of one or more separator posts, maintaining physical separation of portions of the wire lengths 216 of the second wire 204 on opposite sides of one or more separator posts, and/or maintaining physical separation of portions of wire lengths 216 of the first wire 200 from portions of wire lengths 216 of the second wire 204 on opposite sides separator post. The separator posts may help keep the wires straight and more parallel to one another thereby reducing overlapping of wires in the tray and reducing or preventing entanglement.

In any one of the presently-disclosed methods, the wire processing machine 102 may be provided with multiple separator posts in at least one of the trays. For example, as shown in FIG. 27, the wire processing machine 102 may be provided with a first separator post 324 and a second separator post 326 in the long-wire supporting tray 166. The first separator post 324 and the second separator post 326 may be positioned at spaced locations along a lengthwise direction 168 of the long-wire supporting tray 166 in correspondence with the lengths of the wires. The first wire group 202 may be wrapped around the first separator post 324, and the second wire group 206 may be wrapped around the second separator post 326 after wrapping the first wire group 202 around the first separator post 324. As mentioned above, the first separator post 324 and the second separator post 326 may maintain separation of the wire lengths 216 of the first wires 200 and the second wires 204 on opposite side of the separator posts, thereby minimizing wire entanglement during wire processing and/or wire bundle unloading.

In any one of the presently-disclosed methods, the wire processing machine 102 may be provided with separator posts that are rotatable, as shown in FIG. 30-31 and described above. In embodiments wherein the wire processing machine 102 is used to assemble one or more wire groups (e.g., wire bundles), removal of the wire groups from the wire processing machine 102 may include pulling the wire ends 218 of the wires during removal from the tray while rotating at least one of the separator posts about a vertical post axis 322 when pulling the wire ends 218. Advantageously, rotation of the separator posts may facilitate removal of the wires from the trays. As mentioned above, in some examples, one or more of the separator posts may be cone shaped to provide a larger diameter for providing further distance between the wire lengths 216 on opposite sides of the wire loop 222 as shown in FIG. 32. In addition, the cone-shaped separator post may have a relatively smaller diameter at the top end to facilitate the loop puller mechanism 150 in placing the wire over the separator post.

Referring to FIGS. 32-36, as mentioned above, one or more of the separator posts may be laterally movable to facilitate physical separation of the wires in the wire groups. For example, in any one of the presently-disclosed methods, a wire processing machine 102 may be provided with at least two separator posts arranged in a post set 338. In this regard, FIG. 33 illustrates a post set 338 including a first separator post 324, a second separator post 326, and a third separator post 328 located at a tray end 170 of the long-wire supporting tray 166. The separator posts in a post set 338 may be initially laterally spaced apart from one another and may be located at approximately the same position along the tray lengthwise direction. In the example shown, the first separator post 324 and the second separator post 326 may be individually laterally movable relative to one another. In such an arrangement, the method may include moving the first separator post 324 to the approximate widthwise center of the long-wire supporting tray 166, and pulling the first wire 200 to the appropriate length using a loop puller mechanism (not shown). The method may additionally include wrapping the first wire 200 around the first separator post 324 to form a wire loop 222 as shown in FIG. 34, and then laterally moving the first separator post 324 toward the tray side wall and away from the second separator post 326 (e.g., FIG. 35) which may be held stationary while the first separator post 324 is laterally moved.

Referring to FIGS. 35-36, the method may additionally include moving the second separator post 326 laterally toward the widthwise center of the long-wire supporting tray 166, and wrapping (e.g., using the loop puller mechanism 150) the second wire 204 around the second separator post 326 to form a wire loop 222 as shown in FIG. 36. In addition, additional laterally movable separator post may be provided at other locations along the long-wire supporting tray 166 such as at the juncture (e.g., the radiused corner) of the long-wire supporting tray 166 and the wire processing tray 156. For example, a fourth, fifth, and sixth separator post 330, 334, 336 may be located at the juncture, and may be laterally moved in coordination with the movement of the first, second, and third separator posts 324, 326, 328, as shown in FIGS. 32-36. Advantageously, the movable separator posts maintain physical separation of the wires of the different wire groups and prevent overlapping and/or wire entanglement. In addition, the laterally movable separator posts allow the loop puller mechanism 150 to operate in a simple linear path moving along the track 152 (e.g., FIG. 27) while drawing each wire out to the appropriate length and dropping the wires one-by-one over the appropriate separator posts.

Referring to FIGS. 39-40, any one of the presently-disclosed methods may include the use of a series of ramps 354 on at least one of the trays in order to provide predictable wire group paths as a means to minimize wire entanglement. For example, as shown in FIGS. 39-40, the method may include sequentially laying a plurality of first wires 200 on a plurality of counter-opposing ramps 354. The ramps 354 may be mounted in series on a tray such as the wire processing tray 156 illustrated in FIG. 40. The ramps 354 may be positioned at spaced intervals along a lengthwise direction 158 of the wire processing tray 156, and may be oriented in alternating opposing angled relation toward one another on the ramp 354. The method may include aligning a plurality of first wires 200 with one another in response to laying the plurality of first wires 200 on the plurality of counter-opposing ramps 354. As shown in FIG. 40, the angled relation of the ramps 354 on one side of the tray toward an opposite side of the tray causes localized portions of a wire to slide partially down each ramp 354 under the force of gravity toward a bottom of the ramp 354, which facilitates bunching together of the wire groups and providing predictable wire group paths.

Figure 77:
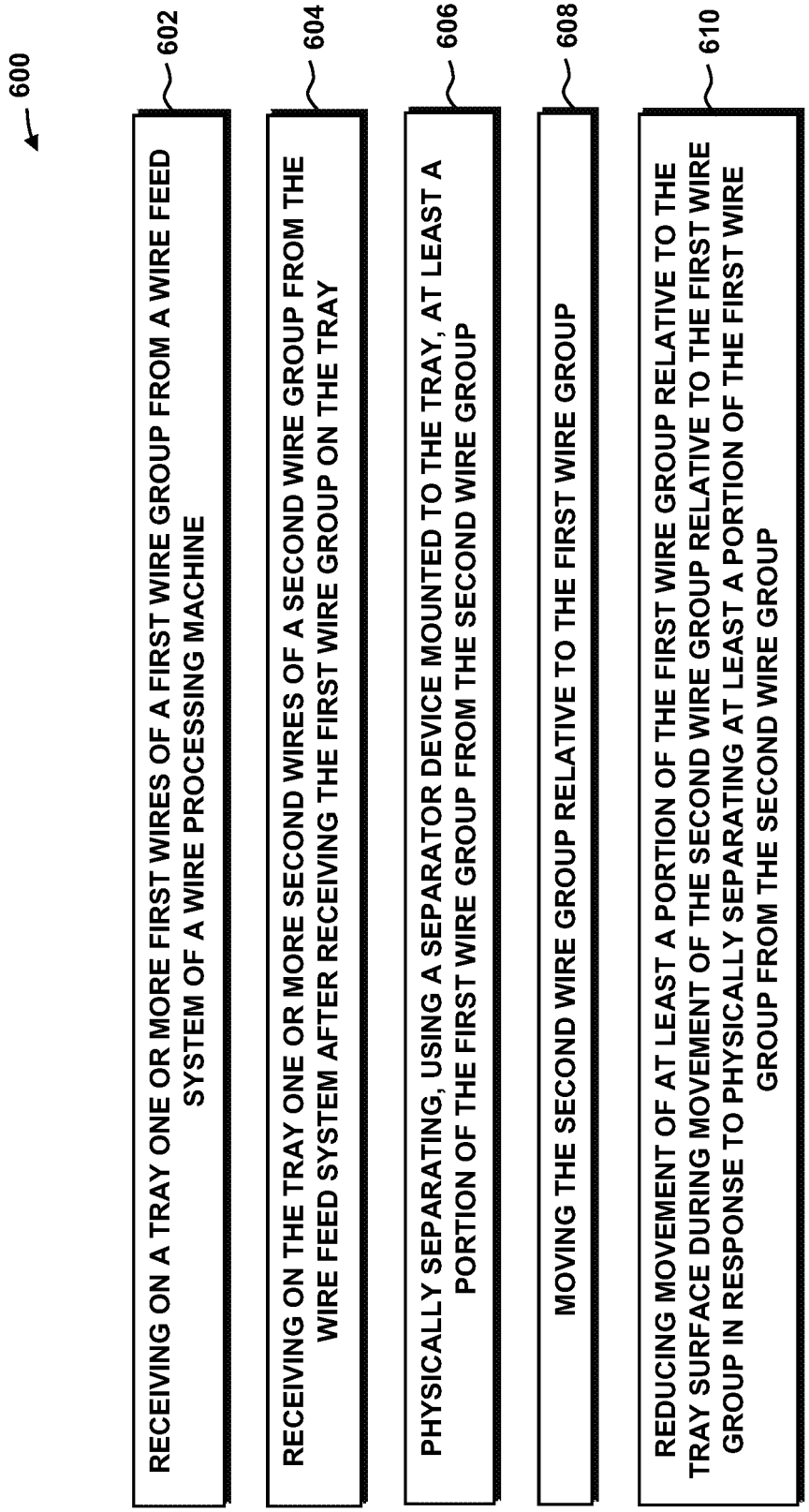
FIG. 77 is a flowchart having one or more operations that may be included in a method of reducing entanglement of wires by including at least one separator device associated with a tray to physically separate at least portions of the wires.

FIG. 77 is a flowchart having one or more operations that may be included in a further method 600 of reducing entanglement of wires such as in a wire processing machine 102. With reference to FIGS. 26-74, the method 600 may implement the use of one or more separator devices 320 mounted to one or more trays as a means to physically separate at least a portion of the wires and/or wire groups. Step 602 of the method 600 includes receiving, at or on one or more trays, one or more first wires 200 of a first wire group 202 from a wire feed system 106 of a wire processing machine 102. As was similarly described above in Step 502 of the method 500, in Step 602 the first wires 200 of the first wire group 202 are sequentially pulled to the appropriate length by a loop puller mechanism 150. One or both of the wire ends 218 of one or more of the first wires 200 may be processed by one or more of the wire processing modules 110. For example, the wire processing modules 110 may be implemented to crimp on an end fitting 220 on each one of the wire ends 218, and sequentially insert the end fittings 220 into the first connector 134 as shown in FIGS. 11-13 and described above. Alternatively, the wire ends of a wire group may be taped together.

Step 604 of the method 600 includes receiving on the tray one or more second wires 204 of a second wire group 206 from the wire feed system 106 after receiving the first wire group 202 on the tray. As described above with regard to Step 504, Step 604 may include pulling the second wires 204 of the second wire group 206 to the appropriate length. In an embodiment, the second wires 204 of the second wire group 206 may be sequentially drawn from the wire feed system 106 of the wire processing machine 102 using a loop puller mechanism 150 as illustrated in FIG. 27 and described above.

Step 606 includes physically separating, using at least one separator device 320 associated with the tray, at least a portion of the first wire group 202 from at least a portion of the second wire group 206. As described above with regard to the method 500, the method 600 may include using at least one separator device 320 to separate the first wires 200 from the second wires 204 to minimize wire entanglement. In addition, as described above, the method 600 may include using one or more separator devices 320 to keep at least a portion of the wire lengths 216 of the wires in the same wire group from coming into contact with one another to thereby minimize wire entanglement. For example, referring to FIG. 27, the method may include using a separator device 320 to separate the wire lengths 216 of one or more wires on one side of the separator device 320 from the wire lengths 216 of one or more of the wires on the opposite side of the separator device 320. The wire lengths 216 on opposite sides of the one or more of the separator devices 320 may belong to the same wire group or different wire groups.

Step 608 of the method 600 includes moving the second wire group 206 relative to the first wire group 202. In an example, the method 600 may include moving the second wire group 206 along a lengthwise direction relative to a lengthwise movement of the first wire group 202, as shown in FIG. 18. As described above with regard to Step 508, after the second wires 204 of the second wire group 206 have been processed (e.g., taped together or inserted into the second connector 136), the connector pallet 132 is moved to the connector unloading position 164, and the second connector 136 is removed (e.g., manually) from the connector pallet 132 and the second wires 204 are pulled along a lengthwise direction relative to the first wires 200 as shown in FIGS. 17-19.

Step 610 of the method 600 includes reducing movement of at least a portion of the first wire group 202 relative to the tray surface during movement of the second wire group 206 relative to the first wire group 202 as a result of physically separating at least a portion of the first wire group 202 from at least a portion of the second wire group 206. By physically separating at least a portion of the first wire group 202 from the second wire group 206, frictional engagement of the second wire group 206 with first wire group 202 is minimized which may thereby reduce or prevent movement of the portions of the first wire group 202 during movement of the second wire group 206 such as during wire bundle removal.

As illustrated in FIG. 26-27 and described above, in an example, a separator device 320 may be configured as a separator post extending upwardly from one or more trays. The method may include wrapping the first wire and/or the second wire 180 degrees around respective separator posts such that a U-shaped wire loop 222 is formed in the first wire 200 and/or the second wire 204 when viewed from above. The method may include maintaining physical separation of the portions of wire lengths 216 of the first wire 200 and/or the second wire 204 on opposite sides of the separator post which may promote linearity and parallelism among the wire lengths 216, thus reducing overlapping of the wire lengths 216 and thereby reducing or preventing entanglement.

As mentioned above, in an example, one or more of the trays of the wire processing machine 102 may be provided with a plurality of separator posts including a first separator post 324 and a second separator post 326 positioned at spaced locations along a tray lengthwise direction. The step of wrapping the first wire group 202 and the second wire group 206 around the separator post may include sequentially wrapping each one of the first wires 200 in the first wire group 202 around a first separator post 324, followed by sequentially wrapping each one of the second wires 204 and the second wire group 206 around the second separator post 326 after wrapping the first wire group 202 around the first separator post 324, as shown in the non-limiting exemplary illustrations of FIGS. 26, 28, and 30.

In the example illustrated in FIGS. 17 and 30-31, the method 600 may include pulling a wire end 218 of the second wire 204 during removal from the tray (FIG. 18), and rotating one or more of the separator posts about a vertical post axis 322 (FIG. 28) when pulling the wire end 218 of the second wire 204, as described above in the method 500. Advantageously, rotation of the separator posts may facilitate removal of the wires from the tray. As mentioned above with regard to FIG. 31, in some examples, one or more of the separator posts may be cone-shaped to provide a larger diameter at the bottom of the separator post for separating the wire lengths 216 on opposite sides of the wire loop 222, and to facilitate the loop puller mechanism 150 in placing the wire over a small diner at the top of the cone-shaped separator post.

In the example illustrated in FIGS. 32-36, the method 600 may additionally include wrapping the first wire 200 around a first separator post 324 to form a wire loop 222 and the first wire 200, and laterally moving the first separator post 324 away from the second separator post 326 which may be stationary while laterally moving the first separator post 324. The method may further include wrapping the second wire 204 around the second separator post 326 such that a wire loop 222 is formed in the second wire 204. Additional wire groups may be wrapped around corresponding additional separator posts that are also laterally movable as a means to maintain physical separation of different wire groups, thereby preventing overlapping and/or wire entanglement.

The method 600 may further include maintaining physical separation wire groups by using one or more separator devices 320 configured as wire clamping systems 358, as described above. A wire clamping systems 358 may include one or more clamping members that are movable between a clamping position and an open position. The method may include sequentially receiving, with the clamping members in the open position, the one or more first wires and the one or more second wires from the wire feed system. The method may additionally include clamping together, with the clamping members in the clamping position, the one or more first wires of the first wire group, and clamping together the one or more second wires of the second wire group separate from the first wire group.

For example, as illustrated in FIGS. 43-49, the method 600 may include clamping, using a first clamping member, at least a portion of the first wire group to a tray surface after receiving the first wire group at or on the tray (e.g., FIG. 44), and then laying at least a portion of a second wire group over the first clamping member when receiving the second wire group at or on the tray (e.g., FIG. 45). In further embodiments, the method 600 may include clamping at least a portion of the second wire group 206 between the first clamping member 364 and the second clamping member 366 after laying at least a portion of the second wire group 206 over the first clamping member 364 as shown in FIG. 46, and prior to receiving subsequent wire groups from the wire feed system.

In some examples, the process of clamping the wire groups may include pivoting the first clamping member 364 about a pivot axis into an open position 384 prior to receiving the first wire group 202 on the tray. For example, as shown in FIG. 45, a clamping member 362 in the open position 384 may be oriented in an approximately vertical orientation although non-vertical orientations are contemplated for the open position. The clamping members 362 may be rotated through approximately 90 degrees when pivoted between the clamping position 382 and the open position 384, although the clamping member 362 may be pivoted within any angular range between the clamping position 382 and open position 384. The method 600 may include pivoting the first clamping member 364 about the pivot axis into a clamping position 382 having an approximately horizontal orientation, as shown in FIG. 45. Any number of clamping members 362 may be provided in a wire clamping system 358.

As mentioned above with regard to FIGS. 55-63, a wire clamping system 358 may include one or more clamping members 362 having a two-arm configuration 400. For example, a wire clamping system 358 may include a first clamping member 364 and a second clamping member 366 each having a two-arm configuration 400 including a top arm and a bottom arm. The top arm and the bottom arm of each clamping member may be independently pivotable between the clamping position 382 and the open position 384. In such examples (FIGS. 55-63), the method may include clamping, using the first clamping member 364 in the clamping position 382, the first wire group 202 between a first top arm 402 and a first bottom arm 404, and clamping, using the second clamping member 366 in the clamping position 382, the second wire group 206 between a second top arm 406 and a second bottom arm 408. Additional clamping members may be provided in the two-arm configuration 400.

As mentioned above with regard to FIGS. 64-74, a wire clamping system 358 may include clamping members 362 that are independently translatable using linear actuators 420. For example, as shown in FIG. 64-74, a wire clamping system 358 may include at least a first clamping member 364, a second clamping member 366, and a third clamping member 368 each being vertically translatable between the clamping position 382 and the open position 384. In such an embodiment, the method may include respectively receiving, with the first, second, and third clamping members 364, 366, 368 in the respective open position 384, one or more first wires 200, one or more second wires 204, and one or more third wires 208 from the wire feed system 106. The method may additionally include clamping the first wire group 202 between the first clamping member 364 and the second clamping member 366 in the clamping position 382, and clamping the second wire group 206 between the second clamping member 366 and the third clamping member 368 in the clamping position 382.

As mentioned above, the clamping members 362 of any one of the presently-disclosed examples may be manually actuated or mechanically actuated to apply a clamping force onto each wire group. The clamping pressure exerted by the clamping members 362 the wire groups may be temporarily reduced to enable wire movement. For example, clamping pressure exerted by the clamping members 362 may be temporarily reduced to enable movement of a connector pallet 132 from the connector insertion position 162 to the connector unloading position 164, after which the clamping members 362 may re-apply the clamping force on the wire groups to prevent movement. Clamping pressure exerted by the clamping members 362 may also be temporarily reduced to enable removal of a wire group from the wire processing machine 102. As described above, the clamping members 362 may be sequentially moved to the open position 384 to allow the wire groups to be removed from the trays of the wire processing machine 102 on a first-in/last-out basis. However, as mentioned above, a wire clamping system 358 may be provided in an embodiment (e.g., FIGS. 55-63 or FIGS. 64-74) that is not limited to removal of wire groups on a first-in/last-out basis, and instead allows for the removal of wire groups in any order.

The method 600 of reducing wire entanglement may also be implemented using a separator device 320 configured as a vertical conveyor system 342 (e.g., FIGS. 37-38) mounted to one or more of the trays. As mentioned above, the vertical conveyor system 342 may include a plurality of baskets 346 including at least a first basket 348 and a second basket 350 coupled to a vertically-oriented conveyor belt 344. For such embodiment, the method may include sequentially positioning, by moving the conveyor belt 344, the first basket 348 at an uppermost position on the conveyor belt 344, receiving the first wire group 202 in the first basket 348, moving the conveyor belt 344 in a manner rotating the second basket 350 into position above the first basket 348, and receiving the second wire group 206 in the second basket 350. The method may additionally include moving the conveyor belt 344 in a manner causing the first basket 348 and the second basket 350 to sequentially drop the first wire group 202 and the second wire group 206 onto a tray surface.

In an embodiment, the method 600 may include movement of baskets (FIGS. 37-38) or clamping members 362 in correspondence with the drawing of wires (e.g., via the loop puller mechanism) from the wire feed system 106. In some examples, the wire clamping system 358 may be communicatively coupled to the wire feed system 106 and may receive a control signal from the wire feed system 106 to allow for controlling the movement of baskets 346 and/or wire clamping members 362 in correspondence with the drawing of the different wire groups from the wire feed system 106.

In the present disclosure, any aspects (e.g., components, structural arrangement, and/or method steps) of any of the examples disclosed herein may be used, in whole or in part, in combination with one another. Additional modifications and improvements of the present disclosure may be apparent to those of ordinary skill in the art. Thus, the particular combination of parts described and illustrated herein is intended to represent only certain embodiments of the present disclosure and is not intended to serve as limitations of alternative embodiments or devices within the spirit and scope of the disclosure.

What is claimed is:

1. A method of reducing entanglement of wires, comprising:
   receiving, at a tray, one or more first wires of a first wire group from a wire feed system of a wire processing machine;
   receiving, at the tray, one or more second wires of a second wire group from the wire feed system after receiving the one or more first wires of the first wire group at the tray;
   physically separating, using a separator device associated with the tray, the first wire group and/or the second wire group, according to at least one of the following:
      physically separating at least a portion of the one or more first wires of the first wire group from at least a portion of the one or more second wires of the second wire group;
      physically separating at least a portion of a wire length of the one or more first wires from each other; and
      physically separating at least a portion of a wire length of the one or more second wires from each other;
   moving the second wire group relative to the first wire group; and
   reducing movement of at least a portion of the one or more first wires of the first wire group relative to a tray surface during movement of the one or more second wires of the second wire group relative to the one or more first wires of the first wire group.

2. The method of claim 1, wherein the separator device comprises one or more clamping members of a wire clamping system, the one or more clamping members movable between a clamping position and an open position, the steps of receiving the one or more first wires, receiving the one or more second wires, and physically separating the first wire group and/or the second wire group including:
   sequentially receiving, with the one or more clamping members in the open position, the one or more first wires and the one or more second wires from the wire feed system;
   clamping together, with the one or more clamping members in the clamping position, the one or more first wires of the first wire group; and
   clamping together the one or more second wires of the second wire group separate from the first wire group.

3. The method of claim 2, wherein the one or more clamping members include a first clamping member, the step of clamping together the one or more first wires including:
   clamping, using the first clamping member, at least a portion of the one or more first wires of the first wire group to the tray surface after receiving the first wire group at the tray; and
   laying at least a portion of the one or more second wires of the second wire group over the first clamping member when receiving the second wire group on the tray.

4. The method of claim 3, wherein the one or more clamping members include the first clamping member and a second clamping member, the method further including:
   clamping at least a portion of the one or more second wires of the second wire group between the first clamping member and the second clamping member after laying at least a portion of the one or more second wires of the second wire group over the first clamping member and prior to receiving subsequent wire groups from the wire feed system.

5. The method of claim 3, wherein the step of clamping at least a portion of the one or more first wires of the first wire group to the tray surface includes:
   pivoting the first clamping member about a pivot axis into an open position prior to receiving the first wire group at the tray; and
   pivoting the first clamping member about the pivot axis into a clamping position to clamp the first wire group to the tray surface.

6. The method of claim 2, wherein the one or more clamping members include a first clamping member and a second clamping member each having a two-arm configuration including a top arm and a bottom arm, the top arm and the bottom arm of each clamping member being independently pivotable between the clamping position and the open position, the method further including:
   clamping, using the first clamping member in the clamping position, the first wire group between a first top arm and a first bottom arm; and
   clamping, using the second clamping member in the clamping position, the second wire group between a second top arm and a second bottom arm.

7. The method of claim 2, wherein the one or more clamping members include at least a first clamping member, a second clamping member, and a third clamping member each being vertically translatable between the clamping position and the open position, the method further including:
   respectively receiving, with the first, second, and third clamping members in the respective open position, the one or more first wires of the first wire group, the one or more second wires of the second wire group, and one or more third wires of a third wire group from the wire feed system; and
   clamping the first wire group between the first clamping member and the second clamping member in the clamping position; and
   clamping the second wire group between the second clamping member and the third clamping member in the clamping position.

8. The method of claim 1, wherein the separator device comprises a separator wall extending upwardly from the tray and extending extend at least partially along a tray lengthwise direction, the step of physically separating the first wire group and/or the second wire group comprising at least one of the following:
maintaining physical separation of portions of the wire lengths of one or more first wires on one side of the separator wall from portions of the wire lengths of one or more first wires on an opposite side of the separator wall;
maintaining physical separation of portions of the wire lengths of one or more second wires on one side of the separator wall from portions of the wire lengths of one or more second wires on an opposite side of the separator wall; and
maintaining physical separation of portions of the wire lengths of one or more first wires on one side of the separator wall from portions of the wire lengths of one or more second wires on an opposite side of the separator wall.

9. The method of claim 1, wherein the separator device comprises at least one separator post extending upwardly from the tray, the step of physically separating the first wire group and/or the second wire group comprising:
wrapping at least one of the first wire group and the second wire group around the at least one separator post such that at least one of the first wire group and the second wire group has a U-shape; and
performing at least one of the following:
maintaining physical separation of portions of the wire lengths of one or more first wires on one side of the at least one separator post from portions of the wire lengths of one or more first wires on an opposite side of the at least one separator post;
maintaining physical separation of portions of the wire lengths of one or more second wires on one side of the at least one separator post from portions of the wire lengths of one or more second wires on an opposite side of the at least one separator post; and
maintaining physical separation of portions of the wire lengths of one or more first wires on one side of the at least one separator post from portions of the wire lengths of one or more second wires on an opposite side of the at least one separator post.

10. The method of claim 9, wherein the at least one separator post comprises a plurality of separator posts including a first separator post and a second separator post positioned at spaced locations along a tray lengthwise direction, the step of wrapping the first wire group and the second wire group around the at least one separator post including:
wrapping the first wire group around the first separator post; and
wrapping the second wire group around the second separator post after wrapping the first wire group around the first separator post.

11. The method of claim 9, further including:
pulling free ends of the one or more first wires of the first wire group and the one or more second wires of the second wire group during removal from the tray; and
rotating the at least one separator post about a vertical post axis when pulling the free ends.

12. The method of claim 9, wherein:
the at least one separator post is cone-shaped.

13. The method of claim 12, wherein:
the at least one separator post has at least one of a material layer, a material coating, and a surface texture providing a higher wire-to-surface coefficient of friction between the at least one separator post and the one or more first wires than a wire-to-wire coefficient of friction between the first wire group and the second wire group.

14. The method of claim 9, wherein the at least one separator post comprises at least two separator posts including a first separator post and a second separator post arranged in a post set and located at approximately a same position along a tray lengthwise direction, the method further including:
wrapping the first wire group around the first separator post such that the first wire group has a U-shape; and
wrapping the second wire group around the second separator post such that the second wire group has a U-shape.

15. The method of claim 14, further including:
laterally moving the first separator post toward a tray side after wrapping the first wire group into the U-shape around the first separator and prior to wrapping the second wire group into the U-shape around the second separator post.

16. The method of claim 1, wherein the separator device comprises a vertical conveyor system mounted to the tray and having a plurality of baskets including a first basket and a second basket coupled to a vertically-oriented conveyor belt, the steps of receiving the one or more first wires, receiving the one or more second wire, and physically separating the first wire group and/or the second wire group comprising:
sequentially positioning, by moving the conveyor belt, the first basket at an uppermost position on the conveyor belt;
receiving the first wire group in the first basket;
moving the conveyor belt in a manner rotating the second basket into position above the first basket; and
receiving the second wire group in the second basket; and
moving the conveyor belt in a manner causing the first basket and the second basket to sequentially drop the first wire group and the second wire group onto a tray surface.

17. The method of claim 1, wherein receiving the one or more first wires comprises:
receiving the one or more first wires onto the tray surface having at least one of a material layer, a material coating, and a surface texture providing a wire-to-surface coefficient of friction higher than a wire-to-wire coefficient of friction between the first wire group and the second wire group.

18. The method of claim 17, wherein the step of receiving the one or more first wires onto the tray surface having at least one of a material layer, a material coating, and a surface texture, comprises:
receiving the one or more first wires onto the tray surface having a material layer comprising at least one of metal, rubber, plastic, foam, fabric, and cloth impregnated with a rubber-based adhesive.

19. The method of claim 17, wherein the step of receiving the one or more first wires onto the tray surface having at least one of a material layer, a material coating, and a surface texture, comprises:
receiving the one or more first wires onto the tray surface having a surface texture providing a higher level of friction between the first wires and the tray, relative to the level of friction between adjacent first wires.

20. The method of claim 17, wherein the step of receiving the one or more first wires onto the tray surface having at least one of a material layer, a material coating, and a surface texture, comprises:

receiving the one or more first wires onto the tray surface having a surface texture comprising a pattern of surface features.

\* \* \* \* \*